United States Patent
Kotra et al.

(10) Patent No.: US 11,102,482 B2
(45) Date of Patent: Aug. 24, 2021

(54) APPARATUS AND METHOD FOR PERFORMING DEBLOCKING

(71) Applicant: HUAWEI TECHNOLOGIES CO., LTD., Shenzhen (CN)

(72) Inventors: Anand Meher Kotra, Munich (DE); Jianle Chen, Santa Clara, CA (US); Semih Esenlik, Munich (DE); Biao Wang, Munich (DE); Han Gao, Munich (DE); Zhijie Zhao, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/994,266

(22) Filed: Aug. 14, 2020

(65) Prior Publication Data
US 2020/0382775 A1 Dec. 3, 2020

Related U.S. Application Data

(63) Continuation of application No. PCT/CN2019/100273, filed on Aug. 12, 2019.

(60) Provisional application No. 62/717,029, filed on Aug. 10, 2018, provisional application No. 62/723,453, filed on Aug. 27, 2018.

(51) Int. Cl.
| *H04N 19/117* | (2014.01) |
| *H04N 19/176* | (2014.01) |
| *H04N 19/105* | (2014.01) |
| *H04N 19/132* | (2014.01) |

(52) U.S. Cl.
CPC ......... *H04N 19/117* (2014.11); *H04N 19/105* (2014.11); *H04N 19/132* (2014.11); *H04N 19/176* (2014.11)

(58) Field of Classification Search
CPC .. H04N 19/117; H04N 19/105; H04N 19/132; H04N 19/176; H04N 19/86
See application file for complete search history.

(56) References Cited

U.S. PATENT DOCUMENTS

2020/0014921 A1 * 1/2020 Ikeda ............... H04N 19/82

FOREIGN PATENT DOCUMENTS

| CN | 101754015 A | 6/2010 |
| CN | 103957425 A | 7/2014 |
| CN | 105530519 A | 4/2016 |
| CN | 105681814 A | 6/2016 |
| WO | 2012096614 A2 | 7/2012 |
| WO | 2013063117 A1 | 5/2013 |
| WO | 2013104298 A1 | 7/2013 |

* cited by examiner

*Primary Examiner* — Joseph W Becker

(57) ABSTRACT

Embodiments of the present invention relate to the field of picture processing. Especially, the embodiments are directed to improving the deblocking filter of an image coding device. During the deblocking, at most a number MA of sample values of the first coding block adjacent to the block edge are modified and at most a number MB of sample values of the second coding block adjacent to the block edge are modified; or at most a number MA of sample values of the second coding block adjacent to the block edge are modified and at most a number MB of sample values of the first coding block adjacent to the block edge are modified, MA≠MB.

29 Claims, 20 Drawing Sheets

(b) sub-block with the size 8x8

(a) sub-block with the size 4x4

APPARATUS AND METHOD FOR PERFORMING DEBLOCKING

CROSS-REFERENCE TO RELATED APPLICATIONS

This application is a continuation of International Application No. PCT/CN2019/100273, filed on Aug. 12, 2019, which claims the priority to U.S. Provisional Patent Application No. 62/717,029, filed Aug. 10, 2018 and U.S. Provisional Patent Application No. 62/723,453, filed Aug. 27, 2018. All of the aforementioned patent applications are hereby incorporated by reference in their entireties.

TECHNICAL FIELD

Embodiments of the present invention relate to the field of picture processing, for example still picture and/or video picture coding. Especially, embodiments of the invention deal with improvements of the deblocking filter.

BACKGROUND

Image coding (encoding and decoding) is used in a wide range of digital image applications, for example broadcast digital TV, video transmission over internet and mobile networks, real-time conversational applications such as video chat, video conferencing, DVD and Blu-ray discs, video content acquisition and editing systems, and camcorders of security applications.

Since the development of the block-based hybrid video coding approach in the H.261 standard in 1990, new video coding techniques and tools were developed and formed the basis for new video coding standards. One of the goals of most of the video coding standards was to achieve a bitrate reduction compared to its predecessor without sacrificing picture quality. Further video coding standards comprise MPEG-1 video, MPEG-2 video, ITU-T H.262/MPEG-2, ITU-T H.263, ITU-T H.264/MPEG-4, Part 10, Advanced Video Coding (AVC), ITU-T H.265, High Efficiency Video Coding (HEVC), ITU-T H.266/Versatile video coding (VVC) and extensions, e.g. scalability and/or three-dimensional (3D) extensions, of these standards.

Block-based image coding schemes have in common that along the block edges, edge artifacts can appear. These artifacts are due to the independent coding of the coding blocks. These edge artifacts are often readily visible to a user. A goal in block-based image coding is to reduce edge artifacts below a visibility threshold. This is done by performing deblocking filtering. Such a deblocking filtering is on the one hand performed on decoding side in order to remove the visible edge artifacts, but also on encoding side, in order to prevent the edge artifacts from being encoded into the image at all. Especially for an image block (such as a transform unit (TU), a prediction unit (PU), a coding unit (CU)) which uses sub-block tools, the deblocking filtering can be challenging.

SUMMARY

In view of the above-mentioned challenges, embodiments of the present invention aim to improve the conventional deblocking filtering. Embodiments of the present invention have the objective to provide a deblocking filter apparatus, an encoder, a decoder and corresponding methods that can perform deblocking filtering with reduced processing time. Further, the deblocking should be efficient and accurate.

Embodiments of the invention are defined by the features of the independent claims, and further advantageous implementations of the embodiments by the features of the dependent claims.

Particular embodiments are outlined in the attached independent claims, with other embodiments in the dependent claims.

According to a first aspect of the invention, a deblocking filter apparatus is provided. The deblocking filter apparatus is intended for use in an image encoder and/or an image decoder. The deblocking filter apparatus comprises:

an edge locating unit, configured to determine edges between blocks, wherein the edges between blocks comprises a block edge (e.g. CU edge or CU boundary or TU boundary) between a first coding block P and a second coding block Q and a sub-block edge between sub blocks of the first coding block P or the second coding block Q (i.e. the first coding block P or the second coding block Q has sub-blocks, or the first coding block P or the second coding block Q uses sub-block tools), wherein the first coding block P has a block size being M×N samples or N×M samples, the second coding block Q has a block size being L×T samples or T×L samples (the block size of any of the two coding blocks may also be represented by W*H, wherein W and H indicate the width and height of the respective coding block), for example, N or T being an even integer $2^n$ (i.e. of an integer power of two with n being an integer) and larger than a threshold (e.g. a value being 8 or 16, etc.);

a deblocking determination unit, configured to determine whether the block edge between the first coding block P and the second coding block Q is to be filtered by applying a first filter (i.e. a longer tap filter or an asymmetric filter or an asymmetric tap filter or an asymmetric long filter); and a deblocking filtering unit, configured to apply the first filter (i.e. a longer tap filter or an asymmetric filter or an asymmetric tap filter or an asymmetric long filter) to values of samples near the block edge between the first coding block P and the second coding block Q, when it is determined that the block edge between the first coding block P and the second coding block Q is to be filtered by applying the first filter, wherein at most a number MA of sample values of the first coding block perpendicular to and adjacent to the block edge per line are modified and at most a number MB of sample values of the second coding block perpendicular to and adjacent to the block edge per line are modified; or at most a number MA of sample values of the second coding block adjacent to the block edge per line are modified and at most a number MB of sample values of the first coding block adjacent to the block edge per line are modified, MA MB, particularly MA<MB, such as MA<MB=7. For example, MA=3 and MB=7; or MA=4 and MB=7; or MA=5 and MB=7, etc. It can be understood that the value of MA or MB depends on the value of N or T.

If the second image block is a current block which has sub-blocks or uses sub-block tools and the first image block P is a neighboring block of the current block, correspondingly in the second coding block, for each line of input samples which are perpendicular and adjacent to the block edge, at most MA number of samples are modified to generate the output filtered samples; in the first coding block, for each line of input samples which are perpendicular and adjacent to the block edge, at most MB number of samples are modified to generate the output filtered samples. In an example, N or T being an even integer $2^n$ larger than 8, M or L being an even integer $2^n$ larger than 2 (e.g. M or L may have the following values 4, 8, 16 or 32, . . . ), M is different from N or M is the same with N; or, L is different from T or L is the same with T; M×N where N>8 applies for horizontal edges and N×M where N>8 applies for vertical edges. In another example, N or T is an even integer $2^n$ larger than 16, M×N where N>16 applies for horizontal edges and N×M where N>16 applies for vertical edges.

The difference between block edge and sub-block edges is described in the further description. A sub-block edge is an edge which is internal to the block which uses sub-block tools which include sub-pu tools like Affine or advanced temporal motion vector prediction (ATMVP), and a block edge (i.e. a coding unit (CU) edge or a coding block edge or CU boundary) is an edge shared between two coding units or two coding blocks or two transform blocks. The sub-block tools also may include tools such as Intra sub-partition (ISP) and Sub-block transform (SBT) tools.

It is noted that the term "block", "coding block" or "image block" is used in the present disclosure which can be applied for transform units (TUs), prediction units (PUs), coding units (CUs), etc. In VVC in general transform units and coding units are mostly aligned except in few scenarios when TU tiling or sub block transform (SBT) is used. It can be understood that the terms "block/image block/coding block/transform block", and "block size/transform block size" may be exchanged with each other in the present disclosure. The terms "sample/pixel" may be exchanged with each other in the present disclosure.

Embodiments of the invention apply to both vertical and horizontal edges. For vertical edges, the width of the first or second coding block is checked whether the width is larger than 8 samples (e.g. 16 or 32). For horizontal edges, the height of the first or second coding block is checked whether the height is larger than 8 samples (e.g. 16 or 32). For vertical edges the width of the block is considered, only for blocks with a width >=16 or a width >16, a longer tap filter (namely a long filter) is applied. For horizontal edges the height of the block is considered, only for blocks with a height >=16 or a height >16, a longer tap filter (namely a long filter) is applied.

It is noted that the first filter (i.e. a longer tap filter or an asymmetric filter or an asymmetric tap filter or an asymmetric long filter) is a filter which uses DA samples for a filter decision on one side of the block edge and uses DB samples for a filter decision on other side of the block edge, and MB samples are modified on the one side of the block edge (CU edge or TU edge) while MA samples are modified on the other side of the block edge (CU edge or TU edge), wherein MA≠MB, particularly MA<MB, such as MA<MB=7, for example, MA=3 and MB=7, or MA=4 and MB=7, or MA=5 and MB=7. In general, DA=MA+1 and DB=MB+1. The first filter may be an asymmetric filter which modifies a different number of samples on either side of the block edge (e.g. CU edge or TU edge).

This allows for differently handling the two sides of a block edge, and therefore the method can avoid filtering overlaps between a block edge and a sub-block edge, and thus can ensure that the deblocking can be performed in parallel. Thus, the processing time for the deblocking filtering is significantly reduced.

It should be noted that the filter apparatus may include a processor configured to carry out the filtering and modifying. Further, this also may ensure that especially edges between blocks in which either of the blocks uses the sub-block tools can be deblocked in parallel.

In a possible implementation form of the method according to the first aspect as such, wherein a sub-block edge between sub blocks exists inside the first coding block and a sub-block edge between sub blocks exists inside the second coding block (i.e. the first coding block and the second coding block have sub-blocks), the deblocking determination unit is further configured to determine the block edge between the first coding block and the second coding block is to be filtered by applying a second filter (e.g. HEVC strong filter); and the deblocking filtering unit is further configured to apply the second filter (e.g. HEVC strong filter) to values of samples near the block edge, when it is determined that the block edge between the first coding block and the second coding block is to be filtered by applying a second filter (e.g. HEVC strong filter), wherein a number MA' of sample values of the first coding block adjacent to the block edge are modified and a number MB' of sample values of the second coding block adjacent to the block edge are modified, MA'=MB', such as MA'=MB'<7, for example, MA'=MB'=3. or MA'=MB'=5.

It is noted that a second filter may be an HEVC strong filter in which MA' (such as 3) samples are modified on one side of the block edge (CU edge) while MB' (such as 3) samples are modified on the other side of the block edge (CU edge). In another example, the second filter is a strong filter that can modify at most three samples on both sides of an edge. In HEVC two filters are defined as a deblocking filter: the normal filter and the strong filter. The normal filter modifies at most two samples on both sides of an edge. In the strong filter, three additional checkings between the samples along the edge are performed.

In a possible implementation form of the method according to the first aspect as such, wherein when no sub-block edge between sub blocks exists inside the second coding block but a sub-block edge between sub blocks exists inside the first coding block (i.e. when the first coding block has sub-blocks), at most a number MA of sample values of the first coding block adjacent to the block edge per line are modified and at most a number MB of sample values of the second coding block adjacent to the block edge per line are modified, for example, MA=3 and MB=7, or MA=4 and MB=7, or MA=5 and MB=7;

or when no sub-block edge between sub blocks exists inside the first coding block but a sub-block edge between sub blocks exists inside the second coding block (i.e. when the second coding block has sub-blocks), at most a number MA of sample values of the second coding block adjacent to the block edge per line are modified and at most a number MB of sample values of the first coding block adjacent to the block edge per line are modified, for example, MA=3 and MB=7, or MA=4 and MB=7, or MA=5 and MB=7.

In a possible implementation form of the method according to any preceding implementation of the first aspect or the first aspect as such, the deblocking determination unit is further configured to determine whether the block edge between the first coding block and the second coding block is to be filtered by applying the first filter (i.e. a longer tap filter or an asymmetric filter or an asymmetric tap filter or an asymmetric longer filter) based upon at most a number DA of sample values of the first coding block, adjacent to the block edge, as first filter decision values, and at most a number DB of sample values of the second coding block, adjacent to the block edge, as second filter decision values.

In general, DA=MA+1 and DB=MB+1. If MA=3 and MB=3, DA=DB=4; or if MA=7 and MB=7, DA=DB=8; or if MA=3 and MB=7, DA=4, DB=8; or if MA=4 and MB=7, DA=5, DB=8; or if MA=5 and MB=7, DA=6, DB=8.

This allows for a very accurate and parallel determination of which edges are actually deblocked, and which edges are not deblocked.

In a possible implementation form of the method according to any preceding implementation of the first aspect or the first aspect as such, if a sub-block edge between sub blocks exists inside the second coding block Q (i.e. if the second coding block Q has sub blocks), the deblocking determination unit is configured to determine whether a first condition defined by the following first equation is satisfied:

$$(|q_3 - q_2 - q_1 + q_0| + |p_0 - p_3 - p_4 + p_7|) < \frac{3*\beta}{32} \&\&$$

$$(|q_3 - q_2 - q_1 + q_0| + |p_0 - p_2 - p_3 + p_5|) < \frac{3*\beta}{32}$$

wherein $\beta$ denotes a threshold parameter and $q_i$ represent the sample values of the second coding block Q, i=0, 1, 2, 3 and $p_j$ represent the sample values of the first coding block P, j=0, 3, 4, 7 or j=0, 2, 3, 5.

A new filter condition is proposed. This significantly reduces the line memory required for storing the pixel values of the previous coding units used for performing the deblocking at the coding unit edge.

In a possible implementation form of the method according to any preceding implementation of the first aspect or the first aspect as such, if a sub-block edge between sub blocks exists inside the first coding block P (i.e. if the first coding block P has sub blocks), the deblocking determination unit is configured to determine whether a second condition defined by the following second equation is satisfied:

$$(|p_3 - p_2 - p_1 + p_0| + |q_0 - q_3 - q_4 + q_7|) < \frac{3*\beta}{32} \&\&$$

$$(|p_3 - p_2 - p_1 + p_0| + |q_0 - q_2 - q_3 + q_5|) < \frac{3*\beta}{32}$$

wherein $\beta$ denotes a threshold parameter and $p_i$ represent the sample values of the first coding block P, i=0, 1, 2, 3 and $q_j$ represent the sample values of the second coding block Q, j=0, 3, 4, 7 or j=0, 2, 3, 5.

A new filter condition is proposed. This significantly reduces the line memory required for storing the pixel values of the previous coding units used for performing the deblocking at the coding unit edge.

In a possible implementation form of the method according to any preceding implementation of the first aspect or the first aspect as such, the threshold parameter $\beta$ is determined on the basis of a quantization parameter, QP, associated with a quantization step size of the plurality of samples, or the threshold parameter $\beta$ is determined on the basis of the quantization parameter, QP, using a look-up table.

In a possible implementation form of the method according to any preceding implementation of the first aspect or the first aspect as such, if no sub-block edge between sub blocks exists inside the first coding block P, and a sub-block edge between sub blocks exists inside the second coding block Q (i.e. the first coding block P has no sub-blocks and the second coding block Q has sub-blocks), the deblocking filtering unit is configured to determine the filtered sample value $q'_0$ of the first sample of the current row or column of samples to the right or bottom of the vertical or horizontal edge (505) between the first and the second sample block (503$a$, 503$b$) on the basis of the following equation:

$q'_0 = (0 \cdot q_7 + 0 \cdot q_6 + 0 \cdot q_5 + 0 \cdot q_4 + 5 \cdot q_3 + 1 \cdot q_2 + 1 \cdot q_1 + 2 \cdot q_0 + 1 \cdot p_0 + 1 \cdot p_1 + 1 \cdot p_2 + 1 \cdot p_3 + 1 \cdot p_4 + 1 \cdot p_5 + 1 \cdot p_6 + 0 \cdot p_7)/16$; or, $q'_0 = (0 \cdot q_7 + 0 \cdot q_6 + 0 \cdot q_5 + 0 \cdot q_4 + 0 \cdot q_3 + 2 \cdot q_2 + 4 \cdot q_1 + 4 \cdot q_0 + 4 \cdot p_0 + 2 \cdot p_1 + 0 \cdot p_2 + 0 \cdot p_3 + 0 \cdot p_4 + 0 \cdot p_5 + 0 \cdot p_6 + 0 \cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

New filter coefficients are proposed. These allow for two kinds of filter coefficients comprising HEVC strong filter coefficients and longer tap asymmetric filter coefficients.

In a possible implementation form of the method according to any preceding implementation of the first aspect or the first aspect as such, if no sub-block edge between sub blocks exists inside the first coding block P, and a sub-block edge between sub blocks exists inside the second coding block Q (i.e. the first coding block P has no sub-blocks and the second coding block Q has sub-blocks), the deblocking filtering unit is configured to determine the filtered sample value $q'_1$ of the second sample of the current row or column of samples to the right or bottom of the vertical or horizontal edge (505) between the first and the second sample block (503$a$, 503$b$) on the basis of the following equation:

$q'_1 = (0 \cdot q_7 + 0 \cdot q_6 + 0 \cdot q_5 + 0 \cdot q_4 + 5 \cdot q_3 + 1 \cdot q_2 + 3 \cdot q_1 + 1 \cdot q_0 + 1 \cdot p_0 + 1 \cdot p_1 + 1 \cdot p_2 + 1 \cdot p_3 + 1 \cdot p_4 + 1 \cdot p_5 + 0 \cdot p_6 + 0 \cdot p_7)/16$; or, $q'_1 = (0 \cdot q_7 + 0 \cdot q_6 + 0 \cdot q_5 + 0 \cdot q_4 + 0 \cdot q_3 + 4 \cdot q_2 + 4 \cdot q_1 + 4 \cdot q_0 + 4 \cdot p_0 + 0 \cdot p_1 + 0 \cdot p_2 + 0 \cdot p_3 + 0 \cdot p_4 + 0 \cdot p_5 + 0 \cdot p_6 + 0 \cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

New filter coefficients are proposed. These allow for two kinds of filter coefficients comprising HEVC strong filter coefficients and longer tap asymmetric filter coefficients.

In a possible implementation form of the method according to any preceding implementation of the first aspect or the first aspect as such, if no sub-block edge between sub blocks exists inside the first coding block P, and a sub-block edge between sub blocks exists inside the second coding block Q (i.e. the first coding block P has no sub-blocks and the second coding block Q has sub-blocks), the deblocking filtering unit is configured to determine the filtered sample value $q'_2$ of the third sample of the current row or column of samples to the right or bottom of the vertical or horizontal edge (505) between the first and the second sample block (503$a$, 503$b$) on the basis of the following equation:

$q'_2 = (0 \cdot q_7 + 0 \cdot q_6 + 0 \cdot q_5 + 0 \cdot q_4 + 6 \cdot q_3 + 3 \cdot q_2 + 1 \cdot q_1 + 1 \cdot q_0 + 1 \cdot p_0 + 1 \cdot p_1 + 1 \cdot p_2 + 1 \cdot p_3 + 1 \cdot p_4 + 0 \cdot p_5 + 0 \cdot p_6 + 0 \cdot p_7)/16$; or, $q'_2 = (0 \cdot q_7 + 0 \cdot q_6 + 0 \cdot q_5 + 0 \cdot q_4 + 4 \cdot q_3 + 6 \cdot q_2 + 2 \cdot q_1 + 2 \cdot q_0 + 2 \cdot p_0 + 0 \cdot p_1 + 0 \cdot p_2 + 0 \cdot p_3 + 0 \cdot p_4 + 0 \cdot p_5 + 0 \cdot p_6 + 0 \cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

New filter coefficients are proposed. These allow for two kinds of filter coefficients comprising HEVC strong filter coefficients and longer tap asymmetric filter coefficients.

In a possible implementation form of the method according to any preceding implementation of the first aspect or the first aspect as such, if no sub-block edge between sub blocks exists inside the first coding block P, and a sub-block edge between sub blocks exists inside the second coding block Q (i.e. the first coding block P has no sub-blocks and the second coding block Q has sub-blocks), the deblocking filtering unit is configured to determine the filtered sample value $p_i'$ of the corresponding sample of the current row or column of samples to the left or upper of the vertical or horizontal edge (505) between the first and the second sample block (503a, 503b) on the basis of the following equation:

$$p'_0=(0\cdot q_7+0\cdot q_6+0\cdot q_5+0\cdot q_4+4\cdot q_3+1\cdot q_2+1\cdot q_1+1\cdot q_0+2\cdot p_0+1\cdot p_1+1\cdot p_2+1\cdot p_3+1\cdot p_4+1\cdot p_5+1\cdot p_6+1\cdot p_7)/16,$$

$$p'_1=(0\cdot q_7+0\cdot q_6+0\cdot q_5+0\cdot q_4+3\cdot q_3+1\cdot q_2+1\cdot q_1+1\cdot q_0+1\cdot p_0+3\cdot p_1+1\cdot p_2+1\cdot p_3+1\cdot p_4+1\cdot p_5+1\cdot p_6+1\cdot p_7)/16,$$

$$p'_2=(0\cdot q_7+0\cdot q_6+0\cdot q_5+0\cdot q_4+2\cdot q_3+1\cdot q_2+1\cdot q_1+1\cdot q_0+1\cdot p_0+1\cdot p_1+3\cdot p_2+1\cdot p_3+1\cdot p_4+1p_5+1\cdot p_6+2\cdot p_7)/16,$$

$$p'_3=(0\cdot q_7+0\cdot q_6+0\cdot q_5+0\cdot q_4+1\cdot q_3+1\cdot q_2+1\cdot q_1+1\cdot q_0+1\cdot p_0+1\cdot p_1+1\cdot p_2+1\cdot p_3+1\cdot p_4+1\cdot p_5+1\cdot p_6+1\cdot p_7)/16,$$

$$p'_4=(0\cdot q_7+0\cdot q_6+0\cdot q_5+0\cdot q_4+0\cdot q_3+1\cdot q_2+1\cdot q_1+1\cdot q_0+1\cdot p_0+1\cdot p_1+1\cdot p_2+1\cdot p_3+3\cdot p_4+1\cdot p_5+1\cdot p_6+4\cdot p_7)/16,$$

$$p'_2=(0\cdot q_7+0\cdot q_6+0\cdot q_5+0\cdot q_4+0\cdot q_3+0\cdot q_2+1\cdot q_1+1\cdot q_0+1\cdot p_0+1\cdot p_1+1\cdot p_2+1\cdot p_3+3\cdot p_4+3p_5+1\cdot p_6+5\cdot p_7)/16,$$

$$p'6=(0\cdot q_7+0\cdot q_6+0\cdot q_5+0\cdot q_4+0\cdot q_3+0\cdot q_2+0\cdot q_1+1\cdot q_0+1\cdot p_0+1\cdot p_1+1\cdot p_2+1\cdot p_3+1\cdot p_4+1\cdot p_5+3\cdot p_6+6\cdot p_7)/16,$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

This allows for new longer tap asymmetric filter coefficients.

According to a second aspect, a deblocking filter apparatus is provided. The deblocking filter apparatus is intended for use in an image encoder and/or an image decoder. The deblocking filter apparatus comprises:

an edge locating unit, configured to determine edges between blocks, wherein the edges between blocks comprises a block edge between a first coding block P and a second coding block Q and a sub-block edge between sub blocks of the first coding block P or the second coding block Q (i.e. the first coding block P or the second coding block Q has sub-blocks, or the first coding block P or the second coding block Q uses sub-block tools), wherein the first coding block P has a block size being M×N or N×M, the second coding block Q has a block size being L×T or T×L, for example, N or T being an even integer $2^n$ larger than a threshold (e.g. 8 or 16, etc);

a deblocking determination unit, configured to determine whether the block edge between the first coding block P and the second coding block Q is to be filtered by applying a first filter (i.e. a longer tap filter or an asymmetric filter or an asymmetric tap filter or an asymmetric long filter); and a deblocking filtering unit, configured to apply a third filter to values of samples near the block edge between the first coding block P and the second coding block Q, when it is determined that the block edge between the first coding block P and the second coding block Q is not to be filtered by applying the first filter, wherein at most a number MA of sample values of the first coding block adjacent to the block edge per line are modified and at most a number MB of sample values of the second coding block adjacent to the block edge per line are modified, MA=MB<7, for example, MA=MB=4.

In an example, N or T being an even integer $2^n$ larger than 8, M or L being an even integer $2^n$ larger than 2; M is different from N or M is the same with N; or, L is different from T or L is the same with T;

In an example, a third filter may be an HEVC strong filter which may modify a maximum of four samples on both sides of a block edge (CU edge). In other words, the third filter may be an HEVC strong filter in which a maximum of four samples are modified on one side of the block edge (CU edge) while a maximum of four samples are modified on the other side of the block edge (CU edge).

This allows for modifying a small number of sample values at the two sides of a block edge, and therefore the method can avoid filtering overlaps between a block edge and a sub-block edge to a certain extent, and thus can ensure that the deblocking can be performed in parallel. Thus, the processing time for the deblocking filtering can be reduced.

According to a third aspect of the invention, a deblocking filter apparatus is provided. The deblocking filter apparatus is intended for use in an image encoder and/or an image decoder. The deblocking filter apparatus comprises:

an edge locating unit, configured to determine edges between blocks, wherein the edges between blocks comprises a block edge between a first coding block P and a second coding block Q and a sub-block edge between sub blocks of the first coding block P or the second coding block Q (i.e. the first coding block P or the second coding block Q has sub-blocks), wherein the first coding block P has a block size being M×N or N×M, the second coding block Q has a block size being L×T or T×L, for example, N or T being an even integer $2^n$ larger than a threshold (e.g. 8 or 16, etc);

a deblocking determination unit configured to determine the sub-block edge between sub blocks of (inside) the first coding block P or the second coding block Q is not to be filtered; in other words, determine the sub-block edge between sub blocks of (inside) the first coding block P or the second coding block Q is disabled for deblocking; and a deblocking filtering unit, configured to apply a fourth filter (a normal longer tap filter) to values of samples near the block edge between the first coding block P and the second coding block Q, wherein a number MA of sample values of the first coding block, adjacent to the block edge are modified and a number MB of sample values of the second coding block, adjacent to the block edge are modified, MA=MB, for example, MA=MB=7.

In an example, N or T being an even integer $2^n$ larger than 8, M or L being an even integer $2^n$ larger than 2; M is different from N or M is the same with N; or, L is different from T or L is the same with T.

In an example, the fourth filter may be a normal longer tap filter which may modify up to 7 samples on either side of the block edge (e.g. CU edge or CU boundary).

This allows for that the sub-block edge between sub blocks of (inside) the first coding block P or the second coding block Q is disabled for deblocking, and therefore the method can avoid filtering overlaps between a block edge and a sub-block edge, thus it can ensure that the deblocking can be performed in parallel. Thus, the processing time for the deblocking filtering is significantly reduced.

According to a fourth aspect of the invention, a video encoding apparatus is provided. the video encoding apparatus (100) for encoding a picture of a video stream, wherein the video encoding apparatus (100) comprises:

a reconstruction unit (114) configured to reconstruct the picture; and a filter apparatus (120) as previously described for processing the reconstructed picture into a filtered reconstructed picture.

This allows for efficient and accurate encoding of the image.

According to a fifth aspect of the invention, a video decoding apparatus is provided. the video decoding apparatus (200) for decoding a picture of an encoded video stream (303), wherein the video decoding apparatus (200) comprises:

a reconstruction unit (214) configured to reconstruct the picture; and a loop filter apparatus (220) as previously described for processing the reconstructed picture into a filtered reconstructed picture.

This allows for accurate and efficient decoding of the image.

According to a sixth aspect the invention relates to a deblocking method for use in an image encoding and/or an image decoding, the method comprising:

determining edges between blocks, wherein the edges between blocks comprises a block edge between a first coding block P and a second coding block Q and a sub-block edge between sub blocks of the first coding block P or the second coding block Q (e.g. the first coding block P or the second coding block Q has sub-blocks, or the first coding block P or the second coding block Q has sub-block tools), wherein the first coding block P has a block size being M×N samples or N×M samples, the second coding block Q has a block size being L×T samples or T×L samples, for example, wherein N or T being an even integer $2^n$ larger than a threshold (such as 8, 16 or etc);

determining whether the block edge between the first coding block P and the second coding block Q is to be filtered by applying a first filter (i.e. a longer tap filter or an asymmetric filter or an asymmetric tap filter or an asymmetric long filter), in other words, determining whether the block edge between the first coding block P and the second coding block Q is enabled for deblocking by applying a first filter (i.e. a longer tap filter or an asymmetric filter or an asymmetric tap filter); and applying the first filter (i.e. a longer tap filter or an asymmetric filter or an asymmetric tap filter or an asymmetric long filter) to values of samples near the block edge between the first coding block P and the second coding block Q, when it is determined that the block edge between the first coding block P and the second coding block Q is to be filtered by applying the first filter, wherein at most a number MA of sample values of the first coding block adjacent to the block edge per line are modified and at most a number MB of sample values of the second coding block adjacent to the block edge per line are modified; or at most a number MA of sample values of the second coding block adjacent to the block edge per line are modified and at most a number MB of sample values of the first coding block adjacent to the block edge per line are modified, MA≠MB, particularly MA<MB, such as MA<MB=7. For example, MA=3 and MB=7, or MA=4 and MB=7, or MA=5 and MB=7, etc.

In an example, N or T is an even integer $2^n$ larger than 8 (e.g. N or T takes 16 or 32, . . . ), M or L are an even integer $2^n$ larger than 2 (e.g. M or L takes 4, 8, 16 or 32, . . . ); M is different from N or M is the same with N; or, L is different from T or L is the same with T.

In another example, N or T is an even integer $2^n$ larger than 16 (e.g. N or T takes 32 or 64, . . . ), M or L are an even integer $2^n$ larger than 2 (e.g. M or L takes 4, 8, 16 or 32, . . . ), M is different from N or M is the same with N; or, L is different from T or L is the same with T; M×N where N>16 applies for horizontal edges and N×M where N>16 applies for vertical edges.

In an example, the first filter (i.e. a longer tap filter or an asymmetric filter or an asymmetric tap filter) is a filter which uses DB samples for filter decision on one side of the block edge and uses DA samples for filter decision on the other side of the block edge, and MB samples are modified on said one side of the block edge (CU edge or TU edge) while MA samples are modified on said other side of the block edge (CU edge or TU edge), MA≠MB, particularly MA<MB, for example, MA=3 and MB=7, or MA=4 and MB=7, or MA=5 and MB=7. The first filter may be an asymmetric filter which modifies different number of samples on either side of the block edge (e.g. CU edge or TU edge).

This allows for an especially accurate and efficient deblocking. In particular, this allows for differently handling the two sides of a block edge, and therefore the method can avoid filtering overlaps between a block edge and a sub-block edge, thus it can ensure that the deblocking can be performed in parallel. Thus, the processing time for the deblocking filtering is significantly reduced.

In a possible implementation form of the method according to the sixth aspect as such, a sub-block edge between sub blocks exists inside the first coding block and a sub-block edge between sub blocks exists inside the second coding block (e.g. the first coding block P and the second coding block Q has sub-blocks, or the first coding block P and the second coding block Q have sub-block tools), The method further comprises:

determining whether the block edge between the first coding block and the second coding block is to be filtered by applying a second filter; and applying the second filter to values of samples near the block edge, when it is determined that the block edge between the first coding block and the second coding block is to be filtered by applying a second filter, wherein a number MA' of sample values of the first coding block adjacent to the block edge are modified and a number MB' of sample values of the second coding block adjacent to the block edge are modified, MA'=MB', for example, MA'=MB'=3, or MA'=MB'=5.

In a possible implementation form of the method according to any preceding implementation of the sixth aspect or the sixth aspect as such, when no sub-block edge between sub blocks exists inside the second coding block (e.g. the first coding block P has sub-blocks while the second coding block Q has no sub-blocks), at most a number MA of sample values of the first coding block adjacent to the block edge per line are modified and at most a number MB of sample values of the second coding block adjacent to the block edge per line are modified, MA=3 and MB=7, or MA=4 and MB=7, MA=5 and MB=7;

or when no sub-block edge between sub blocks exists inside the first coding block (e.g. the second coding block Q has sub-blocks while the first coding block P has no sub-blocks), at most a number MA of sample values of the second coding block adjacent to the block edge per line are modified and at most a number MB of sample values of the first coding block adjacent to the block edge per line are modified, MA=3 and MB=7, or MA=4 and MB=7, MA=5 and MB=7.

In a possible implementation form of the method according to any preceding implementation of the sixth aspect or the sixth aspect as such, it is determined whether the block edge between the first coding block and the second coding block is to be filtered by applying the first filter based upon at most a number DA of sample values of the first coding block, adjacent to the block edge, as first filter decision values, and at most a number DB of sample values of the second coding block, adjacent to the block edge, as second filter decision values.

In a possible implementation form of the method according to any preceding implementation of the sixth aspect or the sixth aspect as such, if a sub-block edge between sub blocks exists inside the second coding block Q (e.g. the second coding block Q has sub-blocks), it is determined whether a first condition defined by the following first equation is satisfied:

$$(|q_3 - q_2 - q_1 + q_0| + |p_0 - p_3 - p_4 + p_7|) < \frac{3*\beta}{32} \&\&$$

$$(|q_3 - q_2 - q_1 + q_0| + |p_0 - p_2 - p_3 + p_5|) < \frac{3*\beta}{32}$$

wherein $\beta$ denotes a threshold parameter and $q_i$ represent the sample values of the second coding block Q, i=0, 1, 2, 3 and $p_j$ represent the sample values of the first coding block P, j=0, 3, 4, 7 or j=0, 2, 3, 5.

In a possible implementation form of the method according to any preceding implementation of the sixth aspect or the sixth aspect as such, if a sub-block edge between sub blocks exists inside the first coding block P (e.g. the first coding block P has sub-blocks), it is determined whether a second condition defined by the following second equation is satisfied:

$$(|p_3 - p_2 - p_1 + p_0| + |q_0 - q_3 - q_4 + q_7|) < \frac{3*\beta}{32} \&\&$$

$$(|p_3 - p_2 - p_1 + p_0| + |q_0 - q_2 - q_3 + q_5|) < \frac{3*\beta}{32}$$

wherein $\beta$ denotes a threshold parameter and $p_i$ represent the sample values of the first coding block P, i=0, 1, 2, 3 and $q_j$ represent the sample values of the second coding block Q, j=0, 3, 4, 7 or j=0, 2, 3, 5.

In a possible implementation form of the method according to any preceding implementation of the sixth aspect or the sixth aspect as such, wherein the threshold parameter $\beta$ is determined on the basis of a quantization parameter, QP, associated with a quantization step size of the plurality of samples, or the threshold parameter $\beta$ is determined on the basis of the quantization parameter, QP, using a look-up table.

In a possible implementation form of the method according to any preceding implementation of the sixth aspect or the sixth aspect as such, wherein if no sub-block edge between sub blocks exists inside the first coding block P, and a sub-block edge between sub blocks exists inside the second coding block Q (such as the coding block P has no sub-blocks and the coding block Q has sub-blocks), the filtered sample value $q'_0$ of the first sample of the current row or column of samples to the right or bottom of the vertical or horizontal edge between the first and the second sample block is determined on the basis of the following equation:

$q'_0 = (0 \cdot q_7 + 0 \cdot q_6 + 0 \cdot q_5 + 0 \cdot q_4 + 5 \cdot q_3 + 1 \cdot q_2 + 1 \cdot q_1 + 2 \cdot q_0 + 1 \cdot p_0 + 1 \cdot p_1 + 1 \cdot p_2 + 1 \cdot p_3 + 1 \cdot p_4 + 1 \cdot p_5 + 1 \cdot p_6 + 0 \cdot p_7)/16$; or, $q'_0 = (0 \cdot q_7 + 0 \cdot q_6 + 0 \cdot q_5 + 0 \cdot q_4 + 0 \cdot q_3 + 2 \cdot q_2 + 4 \cdot q_1 + 4 \cdot q_0 + 4 \cdot p_0 + 2 \cdot p_1 + 0 \cdot p_2 + 0 \cdot p_3 + 0 \cdot p_4 + 0 \cdot p_5 + 0 \cdot p_6 + 0 \cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to any preceding implementation of the sixth aspect or the sixth aspect as such, if no sub-block edge between sub blocks exists inside the first coding block P, and a sub-block edge between sub blocks exists inside the second coding block Q (such as the coding block P has no sub-blocks and the coding block Q has sub-blocks), the filtered sample value $q'_1$ of the second sample of the current row or column of samples to the right or bottom of the vertical or horizontal edge between the first and the second sample block is determined on the basis of the following equation:

$q'_1 = (0 \cdot q_7 + 0 \cdot q_6 + 0 \cdot q_5 + 0 \cdot q_4 + 5 \cdot q_3 + 1 \cdot q_2 + 3 \cdot q_1 + 1 \cdot q_0 + 1 \cdot p_0 + 1 \cdot p_1 + 1 \cdot p_2 + 1 \cdot p_3 + 1 \cdot p_4 + 1 \cdot p_5 + 0 \cdot p_6 + 0 \cdot p_7)/16$; or, $q'_1 = (0 \cdot q_7 + 0 \cdot q_6 + 0 \cdot q_5 + 0 \cdot q_4 + 0 \cdot q_3 + 4 \cdot q_2 + 4 \cdot q_1 + 4 \cdot q_0 + 4 \cdot p_0 + 0 \cdot p_1 + 0 \cdot p_2 + 0 \cdot p_3 + 0 \cdot p_4 + 0 \cdot p_5 + 0 \cdot p_6 + 0 \cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to any preceding implementation of the sixth aspect or the sixth aspect as such, if no sub-block edge between sub blocks exists inside the first coding block P, and a sub-block edge between sub blocks exists inside the second coding block Q (such as the coding block P has no sub-blocks and the coding block Q has sub-blocks), the filtered sample value $q'_2$ of the third sample of the current row or column of samples to the right or bottom of the vertical or horizontal edge between the first and the second sample block, is determined on the basis of the following equation:

$q'_2 = (0 \cdot q_7 + 0 \cdot q_6 + 0 \cdot q_5 + 0 \cdot q_4 + 6 \cdot q_3 + 3 \cdot q_2 + 1 \cdot q_1 + 1 \cdot q_0 + 1 \cdot p_0 + 1 \cdot p_1 + 1 \cdot p_2 + 1 \cdot p_3 + 1 \cdot p_4 + 0 \cdot p_5 + 0 \cdot p_6 + 0 \cdot p_7)/16$; or, $q'_2 = (0 \cdot q_7 + 0 \cdot q_6 + 0 \cdot q_5 + 0 \cdot q_4 + 4 \cdot q_3 + 6 \cdot q_2 + 2 \cdot q_1 + 2 \cdot q_0 + 2 \cdot p_0 + 0 \cdot p_1 + 0 \cdot p_2 + 0 \cdot p_3 + 0 \cdot p_4 + 0 \cdot p_5 + 0 \cdot p_6 + 0 \cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to any preceding implementation of the sixth aspect or the sixth aspect as such, if no sub-block edge between sub blocks exists inside the first coding block P, and a sub-block edge between sub blocks exists inside the second coding block Q (such as the coding block P has no sub-blocks and the coding block Q has sub-blocks), the filtered sample value $p'_i$ of the corresponding sample of the current row or column of samples to the left or upper of the vertical or horizontal edge between the first and the second sample block, is determined on the basis of the following equation:

$$p'_0 = (0 \cdot q_7 + 0 \cdot q_6 + 0 \cdot q_5 + 0 \cdot q_4 + 4 \cdot q_3 + 1 \cdot q_2 + 1 \cdot q_1 + 1 \cdot q_0 + 2 \cdot p_0 + 1 \cdot p_1 + 1 \cdot p_2 + 1 \cdot p_3 + 1 \cdot p_4 + 1 \cdot p_5 + 1 \cdot p_6 + 1 \cdot p_7)/16,$$

-continued $$p'_1 = (0 \cdot q_7 + 0 \cdot q_6 + 0 \cdot q_5 + 0 \cdot q_4 + 3 \cdot q_3 + 1 \cdot q_2 + 1 \cdot q_1 + 1 \cdot q_0 +$$
$$1 \cdot p_0 + 3 \cdot p_1 + 1 \cdot p_2 + 1 \cdot p_3 + 1 \cdot p_4 + 1 \cdot p_5 + 1 \cdot p_6 + 1 \cdot p_7)/16,$$

$$p'_2 = (0 \cdot q_7 + 0 \cdot q_6 + 0 \cdot q_5 + 0 \cdot q_4 + 2 \cdot q_3 + 1 \cdot q_2 + 1 \cdot q_1 + 1 \cdot q_0 +$$
$$1 \cdot p_0 + 1 \cdot p_1 + 3 \cdot p_2 + 1 \cdot p_3 + 1 \cdot p_4 + 1 \cdot p_5 + 1 \cdot p_6 + 2 \cdot p_7)/16,$$

$$p'_3 = (0 \cdot q_7 + 0 \cdot q_6 + 0 \cdot q_5 + 0 \cdot q_4 + 1 \cdot q_3 + 1 \cdot q_2 + 1 \cdot q_1 + 1 \cdot q_0 +$$
$$1 \cdot p_0 + 1 \cdot p_1 + 1 \cdot p_2 + 3 \cdot p_3 + 1 \cdot p_4 + 1 \cdot p_5 + 1 \cdot p_6 + 3 \cdot p_7)/16,$$

$$p'_4 = (0 \cdot q_7 + 0 \cdot q_6 + 0 \cdot q_5 + 0 \cdot q_4 + 0 \cdot q_3 + 1 \cdot q_2 + 1 \cdot q_1 + 1 \cdot q_0 +$$
$$1 \cdot p_0 + 1 \cdot p_1 + 1 \cdot p_2 + 1 \cdot p_3 + 3 \cdot p_4 + 1 \cdot p_5 + 1 \cdot p_6 + 4 \cdot p_7)/16,$$

$$p'_5 = (0 \cdot q_7 + 0 \cdot q_6 + 0 \cdot q_5 + 0 \cdot q_4 + 0 \cdot q_3 + 0 \cdot q_2 + 1 \cdot q_1 + 1 \cdot q_0 +$$
$$1 \cdot p_0 + 1 \cdot p_1 + 1 \cdot p_2 + 1 \cdot p_3 + 1 \cdot p_4 + 3 \cdot p_5 + 1 \cdot p_6 + 5 \cdot p_7)/16,$$

$$p'_6 = (0 \cdot q_7 + 0 \cdot q_6 + 0 \cdot q_5 + 0 \cdot q_4 + 0 \cdot q_3 + 0 \cdot q_2 + 0 \cdot q_1 + 1 \cdot q_0 +$$
$$1 \cdot p_0 + 1 \cdot p_1 + 1 \cdot p_2 + 1 \cdot p_3 + 1 \cdot p_4 + 1 \cdot p_5 + 3 \cdot p_6 + 6 \cdot p_7)/16,$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to any preceding implementation of the sixth aspect or the sixth aspect as such, if N and T are even integers $2^n$ larger than 16, MA=3 and MB=7, or MA=4 and MB=7, or MA=5 and MB=7.

According to a seventh aspect the invention relates to a method for deblocking a block edge between a first coding block P and a second coding block Q of an image, for image encoding and/or an image decoding, wherein the first coding block P has a block size being M*N or N*M, the second coding block Q has a block size being L*T or T*L, for example, N or T being an even integer $2^n$ larger than 8, particularly, N or T being an even integer $2^n$ larger than 16, and there is a sub-block edge between sub blocks of the first coding block or the second coding block (i.e. the first coding block or the second coding block has sub-blocks), the method comprising:

in the case that a sub-block edge between sub blocks of the first coding block (i.e. the first coding block has sub-blocks or the first coding block uses sub-block tools, where the first coding block is the current block), modifying at most a number MA of sample values of the first coding block, adjacent to the block edge, as first filter output sample values; and modifying at most a number MB of sample values of the second coding block, adjacent to the block edge, as second filter output sample values; wherein MA≠MB, particularly MA<MB, such as MA<MB=7, for example, MA=3 and MB=7, or MA=4 and MB=7, or MA=5 and MB=7, etc;

or, in the case that a sub-block edge between sub blocks of the second coding block (i.e. the second coding block has sub-blocks or the second coding block uses sub-block tools, where the second coding block is the current block),—modifying at most a number MA of sample values of the second coding block, adjacent to the block edge, as first filter output sample values; and modifying (1404) at most a number MB of sample values of the first coding block (902, 1302), adjacent to the block edge, as second filter output sample values, wherein MA≠MB, particularly MA<MB, such as MA<MB=7, for example, MA=3 and MB=7, or MA=4 and MB=7, or MA=5 and MB=7, etc.

This allows for an especially accurate and efficient deblocking. In particular, it allows for differently handling the two sides of a block edge, and therefore the method can avoid filtering overlaps between a block edge and a sub-block edge, and thus can ensure that the deblocking can be performed in parallel. Thus, the processing time for the deblocking filtering is significantly reduced.

According to an eighth aspect the invention relates to a deblocking method for use in an image encoding and/or an image decoding, the method comprising:

determining edges between blocks, wherein the edges between blocks comprises the block edge between the first coding block P and the second coding block Q and a sub-block edge between sub blocks of the first coding block P or the second coding block Q, wherein the first coding block P has a block size being M×N or N×M, the second coding block Q has a block size being L×T or T×L;

determining whether the block edge between the first coding block P and the second coding block Q is to be filtered by applying a first filter (i.e. a longer tap filter or an asymmetric filter or an asymmetric tap filter or an asymmetric longer filter); and applying a third filter to values of samples near the block edge between the first coding block P and the second coding block Q, when it is determined that the block edge between the first coding block P and the second coding block Q is not to be filtered by applying the first filter, wherein at most a number MA of sample values of the first coding block adjacent to the block edge per line are modified and at most a number MB of sample values of the second coding block adjacent to the block edge per line are modified, MA=MB such as MA=MB<7, for example, MA=MB=4.

In an example, N or T being an even integer $2^n$ larger than 8, particularly, N or T being an even integer $2^n$ larger than 16, M or L being an even integer $2^n$ larger than 2; M is different from N or M is the same with N; or, L is different from T or L is the same with T.

In an example, the first filter (i.e. a longer tap filter or an asymmetric filter or an asymmetric tap filter or an asymmetric longer filter) is a filter which uses DB samples for filter decision on one side of the block edge and uses DA samples for filter decision on the other side of the block edge, and MB samples are modified on said one side of the block edge (CU edge or TU edge) while MA samples are modified on said other side of the block edge (CU edge or TU edge), MA≠MB, particularly MA<MB, such as MA<MB=7, for example, MA=3 and MB=7, or MA=4 and MB=7, or MA=5 and MB=7.

In an example, the third filter may be an HEVC strong filter which may modify a maximum of four samples on both sides of a block edge (CU edge or TU edge). In other words, the third filter may be an HEVC strong filter in which a maximum of four samples are modified on one side of the block edge (CU edge or TU edge) while a maximum of four samples are modified on the other side of the block edge (CU edge or TU edge).

This allows for an especially accurate and efficient deblocking.

According to a ninth aspect the invention relates to a deblocking method for use in an image encoding and/or an image decoding, the method comprising:

determining edges between blocks, wherein the edges between blocks comprises the block edge between the first coding block P and the second coding block Q and a sub-block edge between sub blocks of the first coding block P or the second coding block Q, wherein the first coding block P has a block size being M×N or N×M, the second coding block Q has a block size being L×T or T×L;

determining the sub-block edge between sub blocks of the first coding block P or the second coding block Q is not to be filtered (e.g. determining the sub-block edge between sub blocks of the first coding block P or the second coding block Q is disabled to for deblocking); and applying a fourth filter (a normal longer tap filter) to values of samples near the block edge between the first coding block P and the second coding block Q, wherein a number MA of sample values of the first coding block, adjacent to the block edge are modified and a number MB of sample values of the second coding block, adjacent to the block edge are modified, MA=MB such as MA=MB=7.

In an example, N or T being an even integer $2^n$ larger than 8, particularly, N or T being an even integer $2^n$ larger than 16, M or L being an even integer $2^n$ larger than 2; M is different from N or M is the same with N; or, L is different from T or L is the same with T.

In an example, the fourth filter may be a normal longer tap filter which may modify up to 7 samples on either side of the block edge (e.g. CU edge or CU boundary).

This allows for an especially accurate and efficient deblocking.

According to a tenth aspect the invention relates to an encoding method for encoding an image, comprising a previously or later shown deblocking method according to any implementation of any aspect or the any aspect as such.

This allows for efficient and accurate encoding of the image.

According to an eleventh aspect the invention relates to a decoding method for decoding an image, comprising a previously or later shown deblocking method according to any implementation of any aspect or the any aspect as such. This allows for a very efficient and accurate decoding of the image.

According to a twelfth aspect of the invention, a deblocking filter apparatus is provided. The deblocking filter apparatus is intended for use in an image encoder and/or an image decoder. The deblocking filter apparatus comprises:

an edge locating unit, configured to determine edges between blocks, wherein the edges between blocks comprises a block edge (e.g. CU edge) between a first coding block P and a second coding block Q and a sub-block edge (e.g. sub-pu edge) between sub blocks inside the first coding block P and/or the second coding block Q, wherein the first coding block P has a block size being M×N or N×M, the second coding block Q has a block size being L×T or T×L, for example, N or T is an even integer $2^n$ larger than a threshold (e.g. 8 or 16, etc);

a deblocking determination unit, configured to determine the block edge between the first coding block P and the second coding block Q and a first set of sub-block edges between sub blocks inside the first coding block P and/or the second coding block Q are to be filtered, and a second set of sub-block edges between sub blocks inside the first coding block P and/or the second coding block Q are not to be filtered; and a deblocking filtering unit, configured to perform deblocking filtering at values of samples near the block edge between the first coding block P and the second coding block Q and perform deblocking filtering at values of samples near each of the first set of sub-block edges between sub blocks inside the first coding block P and/or the second coding block Q.

For example, the deblocking determination unit, may be configured to determine the "first" sub-block edge between sub blocks of (inside) the first coding block P or the second coding block Q is not to be filtered; in other words, determine the "first" sub-block edge between sub blocks of (inside) the first coding block P or the second coding block Q is disabled for deblocking.

For example, the deblocking determination unit, may be configured to determine the "last" sub-block edge between sub blocks of (inside) the first coding block P or the second coding block Q is not to be filtered; in other words, determine the "last" sub-block edge between sub blocks of (inside) the first coding block P or the second coding block Q is disabled for deblocking.

For example, the deblocking determination unit, may be configured to determine all the sub-pu edges which overlap with a 16×16 grid for the first coding block P and/or the second coding block Q and apply deblocking only to those internal edges. The other internal sub-pu edges are not deblocked. Also the longer tap filter can be used to deblock the internal sub-pu edges which overlap with the 16×16 grid while the longer tap filter can be applied for the CU edge.

In a possible implementation form of the apparatus according to the twelfth aspect as such, wherein the first set of sub-block edges between sub blocks inside the first coding block and/or the second coding block comprises (consist of) a plurality of sub-block edges except for the first sub-block edge and the last sub-block edge between sub blocks inside the first coding block P and/or the second coding block Q, wherein the first sub-block edge is closest to one of the first coding block P and the second coding block Q, and the last sub-block edge is closest to the other one of the first coding block P and the second coding block Q;

the second set of sub-block edges between sub blocks inside the first coding block and/or the second coding block consist of the first sub-block edge and the last sub-block edge between sub blocks inside the first coding block P and/or the second coding block Q, wherein the first sub-block edge is closest to one of the first coding block P and the second coding block Q, and the last sub-block edge is closest to the other one of the first coding block P and the second coding block Q.

In a possible implementation form of the apparatus according to the twelfth aspect as such, wherein the deblocking filtering unit is configured to apply a fifth filter to values of samples near each of the first set of sub-block edges inside the first coding block P and/or the second coding block Q, wherein at most a number NA of sample values at one side of the respective one of the first set of sub-block edges are modified inside the first coding block P and/or the second coding block Q and at most a number NB of sample values at the other side of the respective one of the first set of sub-block edges are modified, NA, NB=4.

In a possible implementation form of the apparatus according to the twelfth aspect as such, wherein if no sub-block edge between sub blocks exists inside the first coding block P, and a plurality of sub-block edge between sub blocks exists inside the second coding block Q, the deblocking filtering unit is configured to determine the filtered sample value $q'_i$ of the corresponding sample of the current row or column of samples at the respective side of the vertical or horizontal sub-block edge inside the second coding block Q on the basis of the following equation when the fifth filter being the HEVC deblocking filtering is decided to be applied:

$$q'_0=(1 \cdot q_2+2 \cdot q_1+2 \cdot q_0+2 \cdot p_0+p_1+4)>>3$$

$$q'_1=(q_2+q_1+p_0+p_1+4)>>3$$

$$q'_2=(2*q_3+3*q_2+q_1+q_0+p_0+4)>>3$$

wherein $p_i$ represent a corresponding sample value of a part of the current row or column of samples of the first coding block P, and $q_j$ represent a corresponding sample value of a part of the current row or column of samples of the second coding block Q, i=0, 1, j=0, 1 ... 3.

In a possible implementation form of the apparatus according to the twelfth aspect as such, wherein the first set of sub-block edges between sub blocks inside the first coding block and/or the second coding block comprises (consist of) one or more sub-block edges which overlap with a 16×16 grid between sub blocks inside the first coding block P and/or the second coding block Q;

the second set of sub-block edges between sub blocks inside the first or second coding block comprises (consist of) one or more sub-block edges except the sub-block edges which overlap with a 16×16 grid between sub blocks inside the first coding block P and/or the second coding block Q.

In a possible implementation form of the apparatus according to the twelfth aspect as such, wherein the deblocking filtering unit is configured to apply a sixth filter to values of samples near each of the first set of sub-block edges inside the first coding block P and/or the second coding block Q, wherein at most a number NA' of sample values at one side of the respective one of the first set of sub-block edges are modified inside the first coding block P or the second coding block Q and at most a number NB' of sample values at the other side of the respective one of the first set of sub-block edges are modified, NA'=NB'=7. It can be understood that NA' and NB' may be determined based on the block size, in other words, NA' and NB' depend on the block size of the respective block. In an implementation manner, for large blocks, i.e. the block size >=32, the maximum number of samples modified may be 7 (corresponds to a long filter).

In a possible implementation form of the apparatus according to the twelfth aspect as such, wherein if no sub-block edge between sub blocks exists inside the first coding block P, and a plurality of sub-block edge between sub blocks exists inside the second coding block Q, the deblocking filtering unit is configured to determine the filtered sample value $q'_i$ of the corresponding sample of the current row or column of samples at the respective side of the vertical or horizontal sub-block edge inside the second coding block Q on the basis of the following equation:

$$q'_0=(0 \cdot p_7+1 \cdot p_6+1 \cdot p_5+1 \cdot p_4+1 \cdot p_3+1 \cdot p_2+1 \cdot p_1+1 \cdot p_0+2 \cdot q_0+1 \cdot q_1+1 \cdot q_2+1 \cdot q_3+1 \cdot q_4+1 \cdot q_5+1 \cdot q_6+1 \cdot q_7+8)/16; \text{ and/or}$$

$$q'_1=(0 \cdot p_7+0 \cdot p_6+1 \cdot p_5+1 \cdot p_4+1 \cdot p_3+1 \cdot p_2+1 \cdot p_1+1 \cdot p_0+1 \cdot q_0+3 \cdot q_1+1 \cdot q_2+1 \cdot q_3+1 \cdot q_4+1 \cdot q_5+1 \cdot q_6+1 \cdot q_7+8)/16; \text{ and/or}$$

$$q'_2=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+1 \cdot q_1+3 \cdot q_2+1 \cdot q_3+1 \cdot q_4+1 \cdot q_5+1 \cdot q_6+2 \cdot q_7+8)/16; \text{ and/or}$$

$$q'_3=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+1 \cdot q_1+1 \cdot q_2+3 \cdot q_3+1 \cdot q_4+1 \cdot q_5+1 \cdot q_6+3 \cdot q_7+8)/16; \text{ and/or}$$

$$q'_4=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+1 \cdot q_1+1 \cdot q_2+1 \cdot q_3+3 \cdot q_4+1 \cdot q_5+1 \cdot q_6+4 \cdot q_7+8)/16; \text{ and/or}$$

$$q'_5=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+1 \cdot q_1+1 \cdot q_2+1 \cdot q_3+1 \cdot q_4+3 \cdot q_5+1 \cdot q_6+5 \cdot q_7+8)/16; \text{ and/or}$$

$$q'_6=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+1 \cdot q_1+1 \cdot q_2+1 \cdot q_3+1 \cdot q_4+1+3 \cdot q_6+6 \cdot q_7+8)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 ... 7.

In a possible implementation form of the apparatus according to the twelfth aspect as such, in the case that a plurality of sub-block edges between sub blocks exists inside the first coding block P and a plurality of sub-block edges between sub blocks exists inside the second coding block Q, the deblocking filtering unit is configured to determine the filtered sample value $q'_i$ and $p'_i$ of the corresponding sample of the current row or column of samples at the respective side of the vertical or horizontal sub-block edge inside the second coding block Q and the first coding block P respectively on the basis of the following equation:

$$q'_0=(0 \cdot p_7+1 \cdot p_6+1 \cdot p_5+1 \cdot p_4+1 \cdot p_3+1 \cdot p_2+1 \cdot p_1+1 \cdot p_0+2 \cdot q_0+1 \cdot q_1+1 \cdot q_2+1 \cdot q_3+1 \cdot q_4+1 \cdot q_5+1 \cdot q_6+1 \cdot q_7+8)/16; \text{ and/or}$$

$$q'_1=(0 \cdot p_7+0 \cdot p_6+1 \cdot p_5+1 \cdot p_4+1 \cdot p_3+1 \cdot p_2+1 \cdot p_1+1 \cdot p_0+1 \cdot q_0+3 \cdot q_1+1 \cdot q_2+1 \cdot q_3+1 \cdot q_4+1 \cdot q_6+1 \cdot q_7+8)/16; \text{ and/or}$$

$$q'_2=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+1+3 \cdot q_2+1 \cdot q_3+1 \cdot q_4+1 \cdot q_5+1 \cdot q_6+2 \cdot q_7+8)/16; \text{ and/or}$$

$$q'_3=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+1 \cdot q_2+3 \cdot q_3+1 \cdot q_4+1 \cdot q_5+1 \cdot q_6+3 \cdot q_7+8)/16; \text{ and/or}$$

$$q'_4=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+1 \cdot q_2+1 \cdot q_3+3 \cdot q_4+1 \cdot q_5+1 \cdot q_6+4 \cdot q_7+8)/16; \text{ and/or}$$

$$q'_5=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+1 \cdot q_2+1 \cdot q_3+1 \cdot q_4+3 \cdot q_5+1 \cdot q_6+5 \cdot q_7+8)/16; \text{ and/or}$$

$$q'_6=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+1 \cdot q_1+1 \cdot q_2+1 \cdot q_3+1 \cdot q_4+1 \cdot q_5+3 q_6+6 q_7+8)/16; \text{ and/or}$$

$$p'_0=(0 \cdot q_7+1 \cdot q_6+1 \cdot q_5+1 \cdot q_4+1 \cdot q_3+1 \cdot q_2+1 \cdot q_1+1 \cdot q_0+2 \cdot p_0+1 \cdot p_1+1 \cdot p_2+1 \cdot p_3+1 \cdot p_4+1 \cdot p_5+1 \cdot p_6+1 \cdot p_7+8)/16; \text{ and/or}$$

$$p'_1=(0 \cdot q_7+0 \cdot q_6+1 \cdot q_5+1 \cdot q_4+1 \cdot q_3+1 \cdot q_2+1 \cdot q_1+1 \cdot q_0+1 \cdot p_0+3 \cdot p_1+1 \cdot p_2+1 \cdot p_3+1 \cdot p_4+1 \cdot p_5+1 \cdot p_6+1 \cdot p_7+8)/16; \text{ and/or}$$

$$p'_2=(0 \cdot q_7+0 \cdot q_6+0 \cdot q_5+1 \cdot q_4+1 \cdot q_3+1 \cdot q_2+1 \cdot q_1+1 \cdot q_0+1 \cdot p_0+1 \cdot p_1+3 \cdot p_2+1 \cdot p_3+1 \cdot p_4+1 \cdot p_5+1 \cdot p_6+2 \cdot p_7+8)/16; \text{ and/or}$$

$$p'_3=(0 \cdot q_7+0 \cdot q_6+0 \cdot q_5+0 \cdot q_4+1 \cdot q_3+1 \cdot q_2+1 \cdot q_1+1 \cdot q_0+1 \cdot p_0+1 \cdot p_1+1 \cdot p_2+3 \cdot p_3+1 \cdot p_4+1 \cdot p_5+1 \cdot p_6+3 \cdot p_7+8)/16; \text{ and/or}$$

$$p'_4=(0 \cdot q_7+0 \cdot q_6+0 \cdot q_5+0 \cdot q_4+0 \cdot q_3+1 \cdot q_2+1 \cdot q_1+1 \cdot q_0+1 \cdot p_0+1 \cdot p_1+1 \cdot p_2+1 \cdot p_3+3 \cdot p_4+1 \cdot p_5+1 \cdot p_6+4 \cdot p_7+8)/16; \text{ and/or}$$

$$p'_5=(0 \cdot q_7+0 \cdot q_6+0 \cdot q_5+0 \cdot q_4+0 \cdot q_3+0 \cdot q_2+1 \cdot q_1+1 \cdot q_0+1 \cdot p_0+1 \cdot p_1+1 \cdot p_2+1 \cdot p_3+1 \cdot p_4+3 \cdot p_5+1 \cdot p_6+5 \cdot p_7+8)/16; \text{ and/or}$$

$$p'_6=(0 \cdot q_7+0 \cdot q_6+0 \cdot q_5+0 \cdot q_4+0 \cdot q_3+0 \cdot q_2+0 \cdot q_1+1 \cdot q_0+1 \cdot p_0+1 \cdot p_1+1 \cdot p_2+1 \cdot p_3+1 \cdot p_4+1 \cdot p_5+3 \cdot p_6+6 \cdot p_7+8)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the apparatus according to the twelfth aspect as such, the deblocking determination unit is further configured to determine whether the block edge between the first coding block P and the second coding block Q is to be filtered by applying a first filter; and the deblocking filtering unit is further configured to apply the first filter to values of samples near the block edge between the first coding block P and the second coding block Q, when it is determined that the block edge between the first coding block P and the second coding block Q is to be filtered by applying the first filter, wherein at most a number MA of sample values of the first coding block adjacent to the block edge per line are modified and at most a number MB of sample values of the second coding block adjacent to the block edge per line are modified; or at most a number MA of sample values of the second coding block adjacent to the block edge per line are modified and at most a number MB of sample values of the first coding block adjacent to the block edge per line are modified, MA=3 and MB=7.

In a possible implementation form of the apparatus according to the twelfth aspect as such, wherein in the case that a plurality of sub-block edge between sub blocks exists inside the first coding block and a plurality of sub-block edge between sub blocks exists inside the second coding block, the deblocking determination unit is further configured to determine the block edge between the first coding block and the second coding block is to be filtered by applying a second filter; and the deblocking filtering unit is further configured to apply the second filter to values of samples near the block edge, when it is determined that the block edge between the first coding block and the second coding block is to be filtered by applying a second filter, wherein a number MA' of sample values of the first coding block adjacent to the block edge are modified and a number MB' of sample values of the second coding block adjacent to the block edge are modified, MA'=3 and MB'=3.

In a possible implementation form of the apparatus according to the twelfth aspect as such, when no sub-block edge between sub blocks exists inside the second coding block, at most a number MA of sample values of the first coding block adjacent to the block edge per line are modified and at most a number MB of sample values of the second coding block adjacent to the block edge per line are modified;

or when no sub-block edge between sub blocks exists inside the first coding block, at most a number MA of sample values of the second coding block adjacent to the block edge per line are modified and at most a number MB of sample values of the first coding block adjacent to the block edge per line are modified, MA=3 and MB=7.

In a possible implementation form of the apparatus according to the twelfth aspect as such, the deblocking determination unit is further configured to determine whether the block edge between the first coding block and the second coding block is to be filtered by applying the first filter based upon at most a number DA of sample values of the first coding block, adjacent to the block edge, as first filter decision values and at most a number DB of sample values of the second coding block, adjacent to the block edge, as second filter decision values.

In a possible implementation form of the apparatus according to the twelfth aspect as such, if a plurality of sub-block edges between sub blocks exists inside the second coding block Q, the deblocking determination unit is configured to determine whether a first condition defined by the following first equation is satisfied:

$$(|q_3 - q_2 - q_1 + q_0| + |p_0 - p_3 - p_4 + p_7|) < \frac{3*\beta}{32} \&\&$$

$$(|q_3 - q_2 - q_1 + q_0| + |p_0 - p_2 - p_3 + p_5|) < \frac{3*\beta}{32}$$

wherein $\beta$ denotes a threshold parameter and $q_i$ represent the sample values of the second coding block Q, i=0, 1, 2, 3 and $p_j$ represent the sample values of the first coding block P, j=0, 3, 4, 7 or j=0, 2, 3, 5.

In a possible implementation form of the apparatus according to the twelfth aspect as such, wherein if a plurality of sub-block edges between sub blocks exists inside the first coding block P, the deblocking determination unit is configured to determine whether a second condition defined by the following second equation is satisfied:

$$(|p_3 - p_2 - p_1 + p_0| + |q_0 - q_3 - q_4 + q_7|) < \frac{3*\beta}{32} \&\&$$

$$(|p_3 - p_2 - p_1 + p_0| + |q_0 - q_2 - q_3 + q_5|) < \frac{3*\beta}{32}$$

wherein $\beta$ denotes a threshold parameter and $p_i$ represent the sample values of the first coding block P, i=0, 1, 2, 3 and $q_j$ represent the sample values of the second coding block Q, j=0, 3, 4, 7 or j=0, 2, 3, 5.

In a possible implementation form of the apparatus according to the twelfth aspect as such, wherein the threshold parameter $\beta$ is determined on the basis of a quantization parameter, QP, associated with a quantization step size of the plurality of samples, or the threshold parameter $\beta$ is determined on the basis of the quantization parameter, QP, using a look-up table.

In a possible implementation form of the apparatus according to the twelfth aspect as such, if no sub-block edge between sub blocks exists inside the first coding block P, and a sub-block edge between sub blocks exists inside the second coding block Q, the deblocking filtering unit is configured to determine the filtered sample value $q'_0$ of the first sample of the current row or column of samples to the right or bottom of the vertical or horizontal edge between the first and the second sample block on the basis of the following equation:

$q'_0 = (0 \cdot q_7 + 0 \cdot q_6 + 0 \cdot q_5 + 0 \cdot q_4 + 5 \cdot q_3 + 1 \cdot q_2 + 1 \cdot q_1 + 2 \cdot q_0 + 1 \cdot p_0 + 1 \cdot p_1 + 1 \cdot p_2 + 1 \cdot p_3 + 1 \cdot p_4 + 1 \cdot p_5 + 1 \cdot p_6 + 0 \cdot p_7)/16$; or, $q'_0 = (0 \cdot q_7 + 0 \cdot q_6 + 0 \cdot q_5 + 0 \cdot q_4 + 0 \cdot q_3 + 2 \cdot q_2 + 4 \cdot q_1 + 4 \cdot q_0 + 4 \cdot p_0 + 2 \cdot p_1 + 0 \cdot p_2 + 0 \cdot p_3 + 0 \cdot p_4 + 0 \cdot p_5 + 0 \cdot p_6 + 0 \cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the apparatus according to the twelfth aspect as such, if no sub-block edge between sub blocks exists inside the first coding block P, and a sub-block edge between sub blocks exists inside the second coding block Q, the deblocking filtering unit is configured to determine the filtered sample value q'$_1$ of the second sample of the current row or column of samples to the right or to bottom of the vertical or horizontal edge between the first and the second sample block on the basis of the following equation:

$$q'_1=(0·q_7+0·q_6+0·q_5+0·q_4+5·q_3+1·q_2+3·q_1+1·q_0+1·p_0+1·p_1+1·p_2+1·p_3+1·p_4+1·p_5+0·p_6+0·p_7)/16; \text{ or,}$$

$$q'_1=(0·q_7+0·q_6+0·q_5+0·q_4+0·q_3+4·q_2+4·q_1+4·q_0+4·p_0+0·p_1+0·p_2+0·p_3+0·p_4+0·p_5+0·p_6+0·p_7)/16;$$

wherein p$_i$ represent a corresponding sample value of a part of the current row or column of samples of the first coding block P, and q$_j$ represent a corresponding sample value of a part of the current row or column of samples of the second coding block Q, i, j=0, 1 . . . 7.

In a possible implementation form of the apparatus according to the twelfth aspect as such, if no sub-block edge between sub blocks exists inside the first coding block P, and a sub-block edge between sub blocks exists inside the second coding block Q, the deblocking filtering unit is configured to determine the filtered sample value q'$_2$ of the third sample of the current row or column of samples to the right or bottom of the vertical or horizontal edge between the first and the second sample block on the basis of the following equation:

$$q'_2=(0·q_7+0·q_6+0·q_5+0·q_4+6·q_3+3·q_2+1·q_1+1·q_0+1·p_0+1·p_1+1·p_2+1·p_3+1·p_4+0·p_5+0·p_6+0·p_7)/16; \text{ or,}$$

$$q'_2=(0·q_7+0·q_6+0·q_5+0·q_4+4·q_3+6·q_2+2·q_1+2·q_0+2·p_0+0·p_1+0·p_2+0·p_3+0·p_4+0·p_5+0·p_6+0·p_7)/16;$$

wherein p$_i$ represent a corresponding sample value of a part of the current row or column of samples of the first coding block P, and q$_j$ represent a corresponding sample value of a part of the current row or column of samples of the second coding block Q, i, j=0, 1 . . . 7.

In a possible implementation form of the apparatus according to the twelfth aspect as such, if no sub-block edge between sub blocks exists inside the first coding block P, and a sub-block edge between sub blocks exists inside the second coding block Q, the deblocking filtering unit is configured to determine the filtered sample value p'$_i$ of the corresponding sample of the current row or column of samples to the left or upper of the vertical or horizontal edge between the first and the second sample block on the basis of the following equation:

$$p'_0 = (0·q_7 + 0·q_6 + 0·q_5 + 0·q_4 + 4·q_3 + 1·q_2 + 1·q_1 + 1·q_0 + 2·p_0 + 1·p_1 + 1·p_2 + 1·p_3 + 1·p_4 + 1·p_5 + 1·p_6 + 1·p_7)/16,$$

$$p'_1 = (0·q_7 + 0·q_6 + 0·q_5 + 0·q_4 + 3·q_3 + 1·q_2 + 1·q_1 + 1·q_0 + 1·p_0 + 3·p_1 + 1·p_2 + 1·p_3 + 1·p_4 + 1·p_5 + 1·p_6 + 1·p_7)/16,$$

$$p'_2 = (0·q_7 + 0·q_6 + 0·q_5 + 0·q_4 + 2·q_3 + 1·q_2 + 1·q_1 + 1·q_0 + 1·p_0 + 1·p_1 + 3·p_2 + 1·p_3 + 1·p_4 + 1·p_5 + 1·p_6 + 2·p_7)/16,$$

$$p'_3 = (0·q_7 + 0·q_6 + 0·q_5 + 0·q_4 + 1·q_3 + 1·q_2 + 1·q_1 + 1·q_0 + 1·p_0 + 1·p_1 + 1·p_2 + 3·p_3 + 1·p_4 + 1·p_5 + 1·p_6 + 3·p_7)/16,$$

$$p'_4 = (0·q_7 + 0·q_6 + 0·q_5 + 0·q_4 + 0·q_3 + 1·q_2 + 1·q_1 + 1·q_0 + 1·p_0 + 1·p_1 + 1·p_2 + 1·p_3 + 3·p_4 + 1·p_5 + 1·p_6 + 4·p_7)/16,$$

-continued $$p'_5 = (0·q_7 + 0·q_6 + 0·q_5 + 0·q_4 + 0·q_3 + 0·q_2 + 1·q_1 + 1·q_0 + 1·p_0 + 1·p_1 + 1·p_2 + 1·p_3 + 1·p_4 + 3·p_5 + 1·p_6 + 5·p_7)/16,$$

$$p'_6 = (0·q_7 + 0·q_6 + 0·q_5 + 0·q_4 + 0·q_3 + 0·q_2 + 0·q_1 + 1·q_0 + 1·p_0 + 1·p_1 + 1·p_2 + 1·p_3 + 1·p_4 + 1·p_5 + 3·p_6 + 6·p_7)/16,$$

wherein p$_i$ represent a corresponding sample value of a part of the current row or column of samples of the first coding block P, and q$_j$ represent a corresponding sample value of a part of the current row or column of samples of the second coding block Q, i, j=0, 1 . . . 7.

In a possible implementation form of the apparatus according to the twelfth aspect as such, the deblocking determination unit is further configured to determine whether the block edge between the first coding block P and the second coding block Q is to be filtered by applying a first filter; and the deblocking filtering unit is further configured to apply a third filter to values of samples near the block edge between the first coding block P and the second coding block Q, when it is determined that the block edge between the first coding block P and the second coding block Q is not to be filtered by applying the first filter, wherein at most a number MA of sample values of the first coding block adjacent to the block edge per line are modified and at most a number MB of sample values of the second coding block adjacent to the block edge per line are modified, MA=MB=4.

According to a thirteenth aspect the invention relates to a deblocking method for use in an image encoding and/or an image decoding, the method comprising:

determining edges between blocks, wherein the edges between blocks comprises a block edge between a first coding block P and a second coding block Q and a sub-block edge between sub blocks inside the first coding block P and/or the second coding block Q, wherein the first coding block P has a block size being M×N or N×M, the second coding block Q has a block size being L×T or T×L, for example, wherein N or T is an even integer 2$^n$ larger than a threshold (e.g. 8 or 16, etc);

determining the block edge between the first coding block P and the second coding block Q and a first set of sub-block edges between sub blocks inside the first coding block P and/or the second coding block Q are to be filtered, and a second set of sub-block edges between sub blocks inside the first coding block P and/or the second coding block Q are not to be filtered; and performing deblocking filtering at values of samples near the block edge between the first coding block P and the second coding block Q and perform deblocking filtering at values of samples near each of the first set of sub-block edges between sub blocks inside the first coding block P and/or the second coding block Q.

In a possible implementation form of the method according to the thirteenth aspect as such, the first set of sub-block edges between sub blocks inside the first coding block and/or the second coding block comprises (consist of) a plurality of sub-block edges except the first sub-block edge and the last sub-block edge between sub blocks inside the first coding block P and/or the second coding block Q, wherein the first sub-block edge is closest to one of the first coding block P and the second coding block Q, and the last sub-block edge is closest to the other one of the first coding block P and the second coding block Q;

the second set of sub-block edges between sub blocks inside the first coding block and/or the second coding block consist of the first sub-block edge and the last sub-block edge between sub blocks inside the first coding block P and/or the second coding to block Q, wherein the first sub-block edge is closest to one of the first coding block P and the second coding block Q, and the last sub-block edge is closest to the other one of the first coding block P and the second coding block Q.

In a possible implementation form of the method according to the thirteenth aspect as such, the step of performing deblocking filtering at values of samples near each of the first set of sub-block edges between sub blocks of the first coding block P and/or the second coding block Q, comprises:

applying a fifth filter to values of samples near each of the first set of sub-block edges inside the first coding block P and/or the second coding block Q, wherein at most a number NA of sample values at one side of the respective one of the first set of sub-block edges are modified inside the first coding block P and/or the second coding block Q and at most a number NB of sample values at the other side of the respective one of the first set of sub-block edges are modified, NA=NB=4.

In a possible implementation form of the method according to the thirteenth aspect as such, if no sub-block edge between sub blocks exists inside the first coding block P, and a plurality of sub-block edge between sub blocks exists inside the second coding block Q, the step of performing deblocking filtering at values of samples near each of the first set of sub-block edges between sub blocks inside the first coding block P and/or the second coding block Q, comprises:

determining the filtered sample value $q'_i$ of the corresponding sample of the current row or column of samples at the respective side of the vertical or horizontal sub-block edge inside the second coding block Q on the basis of the following equation when the fifth filter being the HEVC deblocking filtering is decided to be applied:

$$q'_0=(1 \cdot q_2+2 \cdot q_1+2 \cdot q_0+2 \cdot p_0+p_1+4)>>3$$

$$q'_1=(q_2+q_1+p_0+p_1+4)>>3$$

$$q'_2=(2*q_3+3*q_2+q_1+q_0+p_0+4)>>3$$

wherein $p_i$ represent a corresponding sample value of a part of the current row or column of samples of the first coding block P, and $q_j$ represent a corresponding sample value of a part of the current row or column of samples of the second coding block Q, i=0, 1, j=0, 1 . . . 3.

In a possible implementation form of the method according to the thirteenth aspect as such, the first set of sub-block edges between sub blocks inside the first coding block and/or the second coding block comprises (consist of) one or more sub-block edges which overlap with a 16×16 grid between sub blocks inside the first coding block P and/or the second coding block Q;

the second set of sub-block edges between sub blocks inside the first or second coding block comprises (consist of) one or more sub-block edges except the sub-block edges which overlap with a 16×16 grid between sub blocks inside the first coding block P and/or the second coding block Q.

In a possible implementation form of the method according to the thirteenth aspect as such, the step of performing deblocking filtering at values of samples near each of the first set of sub-block edges between sub blocks of the first coding block P and/or the second coding block Q, comprises:

applying a sixth filter to values of samples near each of the first set of sub-block edges inside the first coding block P and/or the second coding block Q, wherein at most a number NA' of sample values at one side of the respective one of the first set of sub-block edges are modified inside the first coding block P or the second coding block Q and at most a number NB' of sample values at the other side of the respective one of the first set of sub-block edges are modified, NA'=NB'=7.

In a possible implementation form of the method according to the thirteenth aspect as such, if no sub-block edge between sub blocks exists inside the first coding block P, and a plurality of sub-block edge between sub blocks exists inside the second coding block Q, the step of performing deblocking filtering at values of samples near each of the first set of sub-block edges between sub blocks inside the first coding block P and/or the second coding block Q, comprises:

determining the filtered sample value $q'_i$ of the corresponding sample of the current row or column of samples at the respective side of the vertical or horizontal sub-block edge inside the second coding block Q on the basis of the following equation:

$$q'_0=(0 \cdot p_7+1 \cdot p_6+1 \cdot p_5+1 \cdot p_4+1 \cdot p_3+1 \cdot p_2+1 \cdot p_1+1 \cdot p_0+2 \cdot q_0+\\1 \cdot q_1+1 \cdot q_2+1 \cdot q_3+1 \cdot q_4+1 \cdot q_5+1 \cdot q_6+1 \cdot q_7+8)/16; \text{ and/or}$$

$$q'_1=(0 \cdot p_7+0 \cdot p_6+1 \cdot p_5+1 \cdot p_4+1 \cdot p_3+1 \cdot p_2+1 \cdot p_1+1 \cdot p_0+1 \cdot q_0+\\3 \cdot q_1+1 \cdot q_2+1 \cdot q_3+1 \cdot q_4+1 \cdot q_5+1 \cdot q_6+1 \cdot q_7+8)/16; \text{ and/or}$$

$$q'_2=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+\\1 \cdot q_1+3 \cdot q_2+1 \cdot q_3+1 \cdot q_4+1 \cdot q_5+1 \cdot q_6+2 \cdot q_7+8)/16; \text{ and/or}$$

$$q'_3=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+\\1 \cdot q_1+1 \cdot q_2+3 \cdot q_3+1 \cdot q_4+1 \cdot q_5+1 \cdot q_6+3 \cdot q_7+8)/16; \text{ and/or}$$

$$q'_4=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+\\1 \cdot q_1+1 \cdot q_2+1 \cdot q_3+3 \cdot q_4+1 \cdot q_5+1 \cdot q_6+4 \cdot q_7+8)/16; \text{ and/or}$$

$$q'_5=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+\\1 \cdot q_1+1 \cdot q_2+1 \cdot q_3+1 \cdot q_4+3 \cdot q_5+1 \cdot q_6+5 \cdot q_7+8)/16; \text{ and/or}$$

$$q'_6=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+\\1 \cdot q_1+1 \cdot q_2+1 \cdot q_3+1 \cdot q_4+1 \cdot q_5+3 \cdot q_6+6 \cdot q_7+8)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to the thirteenth aspect as such, in the case that a plurality of sub-block edge between sub blocks exists inside the first coding block P and a plurality of sub-block edge between sub blocks exists inside the second coding block Q, the step of performing deblocking filtering at values of samples near each of the first set of sub-block edges between sub blocks inside the first coding block P and/or the second coding block Q, comprises:

determining the filtered sample value $q'_i$ and $p'_i$ of the corresponding sample of the current row or column of samples at the respective side of the vertical or horizontal sub-block edge inside the second coding block Q and the first coding block P respectively on the basis of the following equation:

$$q'_0=(0\cdot p_7+1\cdot p_6+1\cdot p_5+1\cdot p_4+1\cdot p_3+1\cdot p_2+1\cdot p_1+1\cdot p_0+2\cdot q_0+1\cdot q_1+1\cdot q_2+1\cdot q_3+1\cdot q_4+1\cdot q_5+1\cdot q_6+1\cdot q_7+8)/16; \text{ and/or}$$

$$q'_1=(0\cdot p_7+0\cdot p_6+1\cdot p_5+1\cdot p_4+1\cdot p_3+1\cdot p_2+1\cdot p_1+1\cdot p_0+1\cdot q_0+3\cdot q_1+1\cdot q_2+1\cdot q_3+1\cdot q_4+1\cdot q_5+1\cdot q_6+1\cdot q_7+8)/16; \text{ and/or}$$

$$q'_2=(0\cdot p_7+0\cdot p_6+0\cdot p_5+1\cdot p_4+1\cdot p_3+1\cdot p_2+1\cdot p_1+1\cdot p_0+1\cdot q_0+1\cdot q_1+3\cdot q_2+1\cdot q_3+1\cdot q_4+1\cdot q_5+1\cdot q_6+2\cdot q_7+8)/16 \text{ and/or}$$

$$q'_3=(0\cdot p_7+0\cdot p_6+0\cdot p_5+0\cdot p_4+1\cdot p_3+1\cdot p_2+1\cdot p_1+1\cdot p_0+1\cdot q_0+1\cdot q_1+1\cdot q_2+3\cdot q_3+1\cdot q_4+1\cdot q_5+1\cdot q_6+3\cdot q_7+8)/16; \text{ and/or}$$

$$q'_4=(0\cdot p_7+0\cdot p_6+0\cdot p_5+0\cdot p_4+0\cdot p_3+1\cdot p_2+1\cdot p_1+1\cdot p_0+1\cdot q_0+1\cdot q_1+1\cdot q_2+1\cdot q_3+3\cdot q_4+1\cdot q_5+1\cdot q_6+4\cdot q_7+8)/16; \text{ and/or}$$

$$q'_56=(0\cdot p_7+0\cdot p_6+0\cdot p_5+0\cdot p_4+0\cdot p_3+0\cdot p_2+1\cdot p_1+1\cdot p_0+1\cdot q_0+1\cdot q_1+1\cdot q_2+1\cdot q_3+1\cdot q_4+3\cdot q_5+1\cdot q_6+5\cdot q_7+8)/16; \text{ and/or}$$

$$q'_6=(0\cdot p_7+0\cdot p_6+0\cdot p_5+0\cdot p_4+0\cdot p_3+0\cdot p_2+0\cdot p_1+1\cdot p_0+1\cdot q_0+1\cdot q_1+1\cdot q_2+1\cdot q_3+1\cdot q_4+1+3\cdot q_6+6\cdot q_7+8)/16; \text{ and/or}$$

$$p'_0=(0\cdot q_7+1\cdot q_6+1+1\cdot q_4+1\cdot q_3+1\cdot q_2+1\cdot q_1+1\cdot q_0+2\cdot p_0+1+1\cdot p_2+1\cdot p_3+1\cdot p_4+1\cdot p_5+1\cdot p_6+1\cdot p_7+8)/16; \text{ and/or}$$

$$p'_1=(0\cdot q_7+0\cdot q_6+1\cdot q_5+1\cdot q_4+1\cdot q_3+1\cdot q_2+1\cdot q_1+1\cdot q_0+1\cdot p_0+1\cdot p_1+1\cdot p_2+1\cdot p_3+1\cdot p_4+1\cdot p_5+1\cdot p_6+1\cdot p_7+8)/16; \text{ and/or}$$

$$p'_2=(0\cdot q_7+0\cdot q_6+1\cdot q_5+1\cdot q_4+1\cdot q_3+1\cdot q_2+1\cdot q_1+1\cdot q_0+1\cdot p_0+1\cdot p_1+1\cdot p_2+1\cdot p_3+1\cdot p_4+1\cdot p_5+1\cdot p_6+1\cdot p_7+8)/16; \text{ and/or}$$

$$p'_3=(0\cdot q_7+0\cdot q_6+0\cdot q_5+0\cdot q_4+1\cdot q_3+1\cdot q_2+1\cdot q_1+1\cdot q_0+1\cdot p_0+1+p_1+1\cdot p_2+3\cdot p_3+1\cdot p_4+1\cdot p_5+1\cdot p_6+3\cdot p_7+8)/16; \text{ and/or}$$

$$p'_4=(0\cdot q_7+0\cdot q_6+0\cdot q_5+0\cdot q_4+0\cdot q_3+1\cdot q_2+1\cdot q_1+1\cdot q_0+1\cdot p_0+1\cdot p_1+1\cdot p_2+1\cdot p_3+3\cdot p_4+1\cdot p_5+1\cdot p_6+4\cdot p_7+8)/16; \text{ and/or}$$

$$p'_5=(0\cdot q_7+0\cdot q_6+0\cdot q_5+0\cdot q_4+0\cdot q_3+0\cdot q_2+1\cdot q_1+1\cdot q_0+1\cdot p_0+1\cdot p_1+1\cdot p_2+1\cdot p_3+1\cdot p_4+3\cdot p_5+1\cdot p_6+5\cdot p_7+8)/16; \text{ and/or}$$

$$p'_6=(0\cdot q_7+0\cdot q_6+0\cdot q_5+0\cdot q_4+0\cdot q_3+0\cdot q_2+0\cdot q_1+1\cdot q_0+1\cdot p_0+1\cdot p_1+1\cdot p_2+1\cdot p_3+1\cdot p_4+1\cdot p_5+3\cdot p_6+6\cdot p_7+8)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to the thirteenth aspect as such, the method further comprises:

determining whether the block edge between the first coding block P and the second coding block Q is to be filtered by applying a first filter; and applying the first filter to values of samples near the block edge between the first coding block P and the second coding block Q, when it is determined that the block edge between the first coding block P and the second coding block Q is to be filtered by applying the first filter, wherein at most a number MA of sample values of the first coding block adjacent to the block edge per line are modified and at most a number MB of sample values of the second coding block adjacent to the block edge per line are modified; or at most a number MA of sample values of the second coding block adjacent to the block edge per line are modified and at most a number MB of sample values of the first coding block adjacent to the block edge per line are modified, MA=3 and MB=7.

In a possible implementation form of the method according to the thirteenth aspect as such, in the case that a plurality of sub-block edge between sub blocks exists inside the first coding block and a plurality of sub-block edge between sub blocks exists inside the second coding block, the method further comprises:

determining the block edge between the first coding block and the second coding block is to be filtered by applying a second filter; and applying the second filter to values of samples near the block edge, when it is determined that the block edge between the first coding block and the second coding block is to be filtered by applying a second filter, wherein a number MA' of sample values of the first coding block adjacent to the block edge are modified and a number MB' of sample values of the second coding block adjacent to the block edge are modified, MA'=3 and MB'=3.

In a possible implementation form of the method according to the thirteenth aspect as such, when no sub-block edge between sub blocks exists inside the second coding block, at most a number MA of sample values of the first coding block adjacent to the block edge per line are modified and at most a number MB of sample values of the second coding block adjacent to the block edge per line are modified;

or when no sub-block edge between sub blocks exists inside the first coding block, at most a number MA of sample values of the second coding block adjacent to the block edge per line are modified and at most a number MB of sample values of the first coding block adjacent to the block edge per line are modified, MA=3 and MB=7.

In a possible implementation form of the method according to the thirteenth aspect as such, the method further comprising: determining whether the block edge between the first coding block and the second coding block is to be filtered by applying the first filter based upon at most a number DA of sample values of the first coding block, adjacent to the block edge, as first filter decision values, DA=4 and at most a number DB of sample values of the second coding block, adjacent to the block edge, as second filter decision values, DB=4.

In a possible implementation form of the method according to the thirteenth aspect as such, if a plurality of sub-block edges between sub blocks exists inside the second coding block Q, the method further comprises: determining whether a first condition defined by the following first equation is satisfied:

$$(|q_3 - q_2 - q_1 + q_0| + |p_0 - p_3 - p_4 + p_7|) < \frac{3*\beta}{32} \&\&$$
$$(|q_3 - q_2 - q_1 + q_0| + |p_0 - p_2 - p_3 + p_5|) < \frac{3*\beta}{32}$$

wherein $\beta$ denotes a threshold parameter and $q_i$ represent the sample values of the second coding block Q, i=0, 1, 2, 3 and $p_j$ represent the sample values of the first coding block P, j=0, 3, 4, 7 or j=0, 2, 3, 5.

In a possible implementation form of the method according to the thirteenth aspect as such, if a plurality of sub-block edges between sub blocks exists inside the first coding block P, the method further comprises: determining whether a second condition defined by the following second equation is satisfied:

$$(|p_3 - p_2 - p_1 + p_0| + |q_0 - q_3 - q_4 + q_7|) < \frac{3*\beta}{32} \&\&$$

$$(|p_3 - p_2 - p_1 + p_0| + |q_0 - q_2 - q_3 + q_5|) < \frac{3*\beta}{32}$$

wherein $\beta$ denotes a threshold parameter and $p_i$ represent the sample values of the first coding block P, i=0, 1, 2, 3 and $q_j$ represent the sample values of the second coding block Q, j=0, 3, 4, 7 or j=0, 2, 3, 5.

In a possible implementation form of the method according to the thirteenth aspect as such, the threshold parameter $\beta$ is determined on the basis of a quantization parameter, QP, associated with a quantization step size of the plurality of samples, or the threshold parameter $\beta$ is determined on the basis of the quantization parameter, QP, using a look-up table.

In a possible implementation form of the method according to the thirteenth aspect as such, if no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $q'_0$ of the first sample of the current row or column of samples to the right or bottom of the vertical or horizontal edge between the first and the second sample block on the basis of the following equation:

$q'_0=(0\cdot q_7+0\cdot q_6+0\cdot q_5+0\cdot q_4+5\cdot q_3+1\cdot q_2+1\cdot q_1+2\cdot q_0+1\cdot p_0+1\cdot p_1+1\cdot p_2+1\cdot p_3+1\cdot p_4+1\cdot p_5+1\cdot p_6+0\cdot p_7)/16$; or, $q'_0=(0\cdot q_7+0\cdot q_6+0\cdot q_5+0\cdot q_4+0\cdot q_3+2\cdot q_2+4\cdot q_1+4\cdot q_0+4\cdot p_0+2\cdot p_1+0\cdot p_2+0\cdot p_3+0\cdot p_4+0\cdot p_5+0\cdot p_6+0\cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to the thirteenth aspect as such, if no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $q'_1$ of the second sample of the current row or column of samples to the right or bottom of the vertical or horizontal edge between the first and the second sample block on the basis of the following equation:

$q'_1=(0\cdot q_7+0\cdot q_6+0\cdot q_5+0\cdot q_4+5\cdot q_3+1\cdot q_2+3\cdot q_1+1\cdot q_0+1\cdot p_0+1\cdot p_1+1\cdot p_2+1\cdot p_3+1\cdot p_4+1\cdot p_5+0\cdot p_6+0\cdot p_7)/16$; or, $q'_1=(0\cdot q_7+0\cdot q_6+0\cdot q_5+0\cdot q_4+0\cdot q_3+4\cdot q_2+4\cdot q_1+4\cdot q_0+4\cdot p_0+0\cdot p_1+0\cdot p_2+0\cdot p_3+0\cdot p_4+0\cdot p_5+0\cdot p_6+0\cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to the thirteenth aspect as such, if no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $q'_2$ of the third sample of the current row or column of samples to the right or bottom of the vertical or horizontal edge between the first and the second sample block on the basis of the following equation:

$q'_2=(0\cdot q_7+0\cdot q_6+0\cdot q_5+0\cdot q_4+6\cdot q_3+3\cdot q_2+1\cdot q_1+1\cdot q_0+1\cdot p_0+1\cdot p_1+1\cdot p_2+1\cdot p_3+1\cdot p_4+0\cdot p_5+0\cdot p_6+0\cdot p_7)/16$; or, $q'_2=(0\cdot q_7+0\cdot q_6+0\cdot q_5+0\cdot q_4+4\cdot q_3+4\cdot q_2+6\cdot q_2+2\cdot q_1+2\cdot q_0+2\cdot p_0+0\cdot p_1+0\cdot p_2+0\cdot p_3+0\cdot p_4+0\cdot p_5+0\cdot p_6+0\cdot p_7)/16$;

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In a possible implementation form of the method according to the thirteenth aspect as such, if no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $p'_i$ of the corresponding sample of the current row or column of samples to the left or upper of the vertical or horizontal edge between the first and the second coding block on the basis of the following equation:

$p'_0 = (0 \cdot q_7 + 0 \cdot q_6 + 0 \cdot q_5 + 0 \cdot q_4 + 4 \cdot q_3 + 1 \cdot q_2 + 1 \cdot q_1 + 1 \cdot q_0 + 2 \cdot p_0 + 1 \cdot p_1 + 1 \cdot p_2 + 1 \cdot p_3 + 1 \cdot p_4 + 1 \cdot p_5 + 1 \cdot p_6 + 1 \cdot p_7)/16$, $p'_1 = (0 \cdot q_7 + 0 \cdot q_6 + 0 \cdot q_5 + 0 \cdot q_4 + 3 \cdot q_3 + 1 \cdot q_2 + 1 \cdot q_1 + 1 \cdot q_0 + 1 \cdot p_0 + 3 \cdot p_1 + 1 \cdot p_2 + 1 \cdot p_3 + 1 \cdot p_4 + 1 \cdot p_5 + 1 \cdot p_6 + 1 \cdot p_7)/16$, $p'_2 = (0 \cdot q_7 + 0 \cdot q_6 + 0 \cdot q_5 + 0 \cdot q_4 + 2 \cdot q_3 + 1 \cdot q_2 + 1 \cdot q_1 + 1 \cdot q_0 + 1 \cdot p_0 + 1 \cdot p_1 + 3 \cdot p_2 + 1 \cdot p_3 + 1 \cdot p_4 + 1 \cdot p_5 + 1 \cdot p_6 + 2 \cdot p_7)/16$, $p'_3 = (0 \cdot q_7 + 0 \cdot q_6 + 0 \cdot q_5 + 0 \cdot q_4 + 1 \cdot q_3 + 1 \cdot q_2 + 1 \cdot q_1 + 1 \cdot q_0 + 1 \cdot p_0 + 1 \cdot p_1 + 1 \cdot p_2 + 3 \cdot p_3 + 1 \cdot p_4 + 1 \cdot p_5 + 1 \cdot p_6 + 3 \cdot p_7)/16$, $p'_4 = (0 \cdot q_7 + 0 \cdot q_6 + 0 \cdot q_5 + 0 \cdot q_4 + 0 \cdot q_3 + 1 \cdot q_2 + 1 \cdot q_1 + 1 \cdot q_0 + 1 \cdot p_0 + 1 \cdot p_1 + 1 \cdot p_2 + 1 \cdot p_3 + 3 \cdot p_4 + 1 \cdot p_5 + 1 \cdot p_6 + 4 \cdot p_7)/16$, $p'_5 = (0 \cdot q_7 + 0 \cdot q_6 + 0 \cdot q_5 + 0 \cdot q_4 + 0 \cdot q_3 + 0 \cdot q_2 + 1 \cdot q_1 + 1 \cdot q_0 + 1 \cdot p_0 + 1 \cdot p_1 + 1 \cdot p_2 + 1 \cdot p_3 + 1 \cdot p_4 + 3 \cdot p_5 + 1 \cdot p_6 + 5 \cdot p_7)/16$, $p'_6 = (0 \cdot q_7 + 0 \cdot q_6 + 0 \cdot q_5 + 0 \cdot q_4 + 0 \cdot q_3 + 0 \cdot q_2 + 0 \cdot q_1 + 1 \cdot q_0 + 1 \cdot p_0 + 1 \cdot p_1 + 1 \cdot p_2 + 1 \cdot p_3 + 1 \cdot p_4 + 1 \cdot p_5 + 3 \cdot p_6 + 6 \cdot p_7)/16$, wherein $p_i$ represent a corresponding sample value of a part of the current row or column of samples of the first coding block P, and $q_j$ represent a corresponding sample value of a part of the current row or column of samples of the second coding block Q, i, j=0, 1 ... 7.

In a possible implementation form of the method according to the thirteenth aspect as such, the method further comprises:

determining whether the block edge between the first coding block P and the second coding block Q is to be filtered by applying a first filter; and applying a third filter to values of samples near the block edge between the first coding block P and the second coding block Q, when it is determined that the block edge between the first coding block P and the second coding block Q is not to be filtered by applying the first filter, wherein at most a number MA of sample values of the first coding block adjacent to the block edge per line are modified and at most a number MB of sample values of the second coding block adjacent to the block edge per line are modified, MA=MB=4.

The method according to the sixth or seventh aspect of the invention can be performed by the apparatus according to the first aspect of the invention. Further features and implementation forms of the method according to the sixth or seventh aspect of the invention result directly from the functionality of the apparatus according to the first aspect of the invention and its different implementation forms.

The method according to the eighth aspect of the invention can be performed by the apparatus according to the second aspect of the invention. Further features and implementation forms of the method according to the eighth aspect of the invention result directly from the functionality of the apparatus according to the second aspect of the invention and its different implementation forms.

The method according to the thirteenth aspect of the invention can be performed by the apparatus according to the twelfth aspect of the invention. Further features and implementation forms of the method according to the eighth aspect of the invention result directly from the functionality of the apparatus according to the second aspect of the invention and its different implementation forms.

According to another aspect the invention relates to an apparatus for decoding a video stream includes a processor and a memory. The memory is storing instructions that cause the processor to perform the deblocking method according to any preceding implementation of the any preceding aspect or the any preceding aspect as such.

According to another aspect the invention relates to an apparatus for encoding a video stream includes a processor and a memory. The memory is storing instructions that cause the processor to perform the deblocking method according to any preceding implementation of the any preceding aspect or the any preceding aspect as such.

According to another aspect, a computer-readable storage medium having stored thereon instructions that when executed cause one or more processors configured to code video data is proposed. The instructions cause the one or more processors to perform the deblocking method according to any preceding implementation of the any preceding aspect or the any preceding aspect as such.

According to another aspect, a computer program product with a program code for performing the deblocking method according to any preceding implementation of the any preceding aspect or the any preceding aspect as such when the computer program runs on a computer, is provided.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

Figure 1:
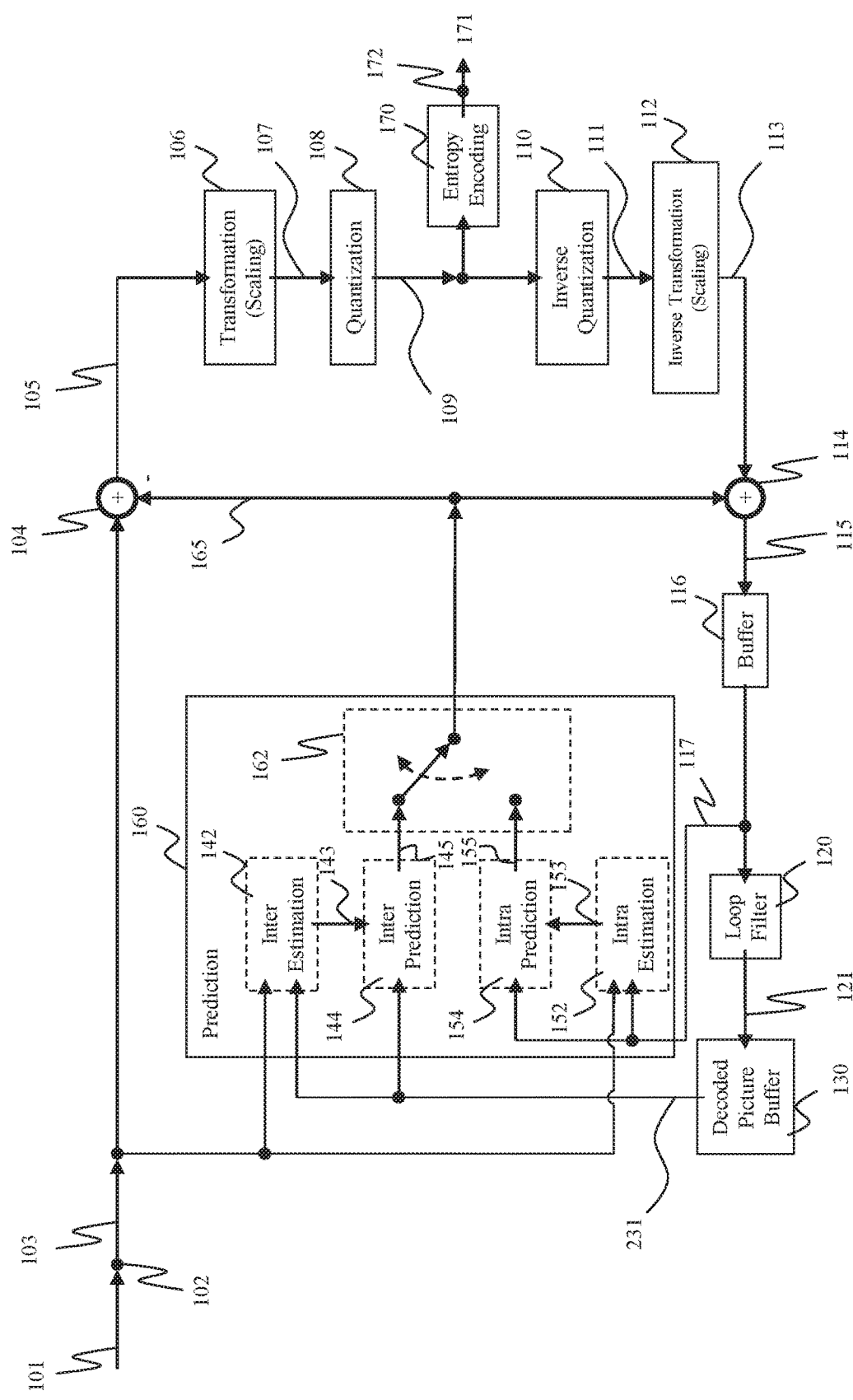
FIG. 1 is a block diagram showing an example of a video encoder configured to implement embodiments of the invention.

In the following, identical reference signs refer to identical or at least functionally equivalent features. In part, different reference signs referring to the same entities have been used in different figures.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of m units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term picture the terms frame or image may be used as synonyms in the field of video coding. Video coding comprises two parts, video encoding and video decoding. Video encoding is performed at the source side, typically comprising processing (e.g. by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to both, "encoding" and "decoding" of video pictures. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g. by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards since H.261 belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. by using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g. intra- and inter predictions) and/or re-constructions for processing, i.e. coding, the subsequent blocks.

As video picture processing (also referred to as moving picture processing) and still picture processing (the term processing comprising coding), share many concepts and technologies or tools, in the following the term "picture" is used to refer to a video picture of a video sequence (as explained above) and/or to a still picture to avoid unnecessary repetitions and distinctions between video pictures and still pictures, where not necessary. In case the description refers to still pictures (or still images) only, the term "still picture" shall be used.

In the following embodiments of an encoder 100, a decoder 200 and a coding system 300 are described based on FIGS. 1 to 3 before describing embodiments of the invention in more detail based on FIGS. 4-14.

Figure 3:
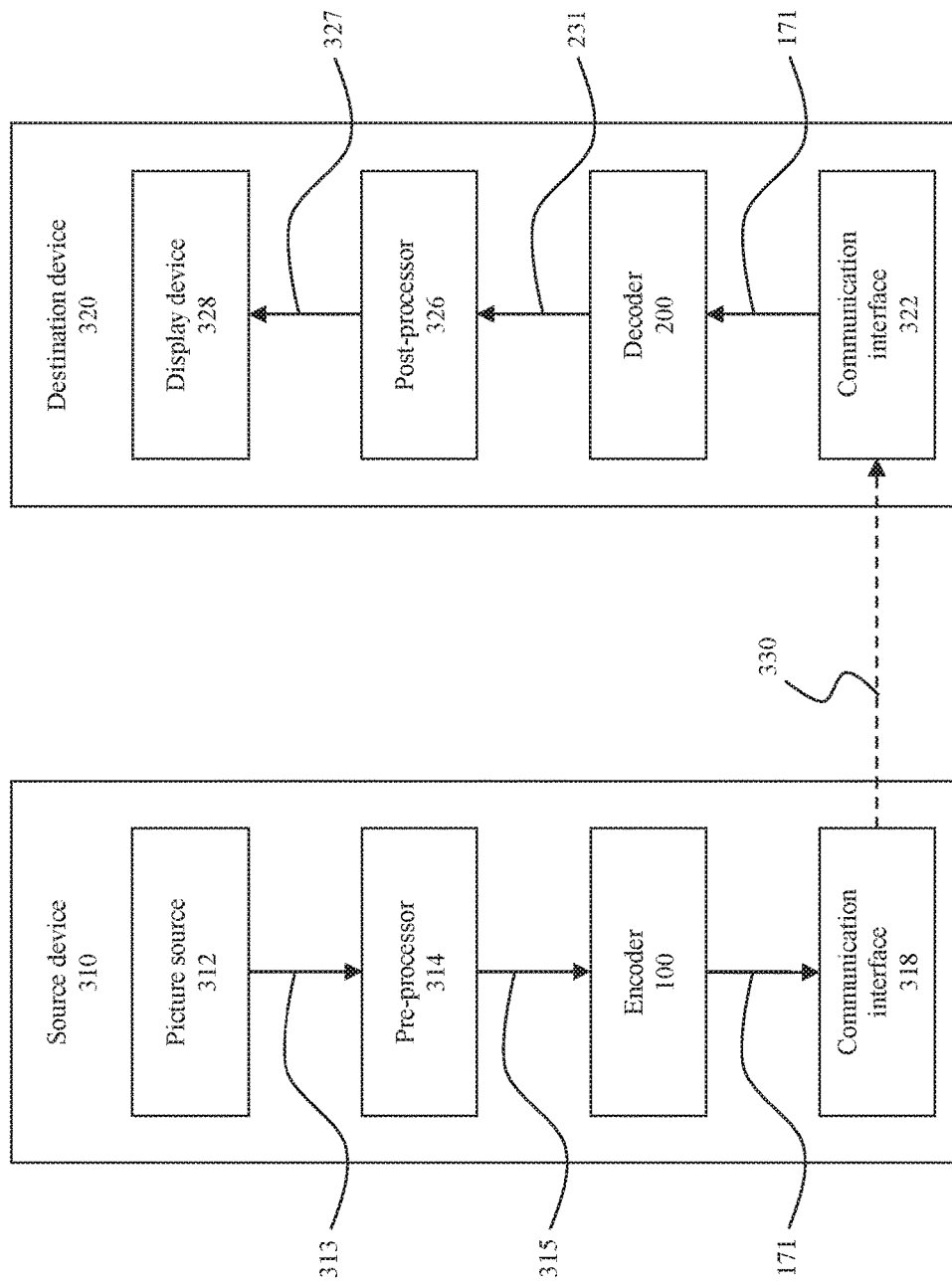
FIG. 3 is a block diagram showing an example of a video coding system configured to implement embodiments of the invention.

FIG. 3 is a conceptional or schematic block diagram illustrating an embodiment of a coding system 300, e.g. a picture coding system 300, wherein the coding system 300 comprises a source device 310 configured to provide encoded data 330, e.g. an encoded picture 330, e.g. to a destination device 320 for decoding the encoded data 330.

The source device 310 comprises an encoder 100 or encoding unit 100, and may additionally, i.e. optionally, comprise a picture source 312, a pre-processing unit 314, e.g. a picture pre-processing unit 314, and a communication interface or communication unit 318.

The picture source 312 may comprise or be any kind of picture capturing device, for example for capturing a real-world picture, and/or any kind of a picture generating device, for example a computer-graphics processor for generating a computer animated picture, or any kind of device for obtaining and/or providing a real-world picture, a computer animated picture (e.g. a screen content, a virtual reality (VR) picture) and/or any combination thereof (e.g. an augmented reality (AR) picture). In the following, all these kinds of pictures and any other kind of picture will be referred to as "picture" or "image", unless specifically described otherwise, while the previous explanations with regard to the term "picture" covering "video pictures" and "still pictures" still hold true, unless explicitly specified differently.

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance/chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 312 may be, for example a camera for capturing a picture, a memory, e.g. a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g. integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g. a wired or wireless interface, an optical interface, according to any proprietary or standardized interface protocol. The interface for obtaining the picture data 312 may be the same interface as or a part of the communication interface 318.

In distinction to the pre-processing unit 314 and the processing performed by the pre-processing unit 314, the picture or picture data 313 may also be referred to as raw picture or raw picture data 313.

Pre-processing unit 314 is configured to receive the (raw) picture data 313 and to perform pre-processing on the picture data 313 to obtain a pre-processed picture 315 or pre-processed picture data 315. Pre-processing performed by the pre-processing unit 314 may, e.g., comprise trimming, color format conversion (e.g. from RGB to YCbCr), color correction, or de-noising.

The encoder 100 is configured to receive the pre-processed picture data 315 and provide encoded picture data 171 (further details will be described, e.g., based on FIG. 1).

Communication interface 318 of the source device 310 may be configured to receive the encoded picture data 171 and to directly transmit it to another device, e.g. the destination device 320 or any other device, for storage or direct reconstruction, or to process the encoded picture data 171 for respectively before storing the encoded data 330 and/or transmitting the encoded data 330 to another device, e.g. the destination device 320 or any other device for decoding or storing.

The destination device 320 comprises a decoder 200 or decoding unit 200, and may additionally, i.e. optionally, comprise a communication interface or communication unit 322, a post-processing unit 326 and a display device 328.

The communication interface 322 of the destination device 320 is configured receive the encoded picture data 171 or the encoded data 330, e.g. directly from the source device 310 or from any other source, e.g. a memory, e.g. an encoded picture data memory.

The communication interface 318 and the communication interface 322 may be configured to transmit respectively receive the encoded picture data 171 or encoded data 330 via a direct communication link between the source device 310 and the destination device 320, e.g. a direct wired or wireless connection, or via any kind of network, e.g. a wired or wireless network or any combination thereof, or any kind of private and public network, or any kind of combination thereof.

The communication interface 318 may be, e.g., configured to package the encoded picture data 171 into an appropriate format, e.g. packets, for transmission over a communication link or communication network, and may further comprise data loss protection and data loss recovery.

The communication interface 322, forming the counterpart of the communication interface 318, may be, e.g., configured to de-package the encoded data 330 to obtain the encoded picture data 171 and may further be configured to perform data loss protection and data loss recovery, e.g. comprising error concealment.

Both, communication interface 318 and communication interface 322 may be configured as unidirectional communication interfaces as indicated by the arrow for the encoded picture data 330 in FIG. 3 pointing from the source device 310 to the destination device 320, or bi-directional communication interfaces, and may be configured, e.g. to send and receive messages, e.g. to set up a connection, to acknowledge and/or re-send lost or delayed data including picture data, and exchange any other information related to the communication link and/or data transmission, e.g. encoded picture data transmission.

The decoder 200 is configured to receive the encoded picture data 171 and provide decoded picture data 231 or a decoded picture 231 (further details will be described, e.g., based on FIG. 2).

The post-processor 326 of destination device 320 is configured to post-process the decoded picture data 231, e.g. the decoded picture 231, to obtain post-processed picture data 327, e.g. a post-processed picture 327. The post-processing performed by the post-processing unit 326 may comprise, e.g. color format conversion (e.g. from YCbCr to RGB), color correction, trimming, or re-sampling, or any other processing, e.g. for preparing the decoded picture data 231 for display, e.g. by display device 328.

The display device 328 of the destination device 320 is configured to receive the post-processed picture data 327 for displaying the picture, e.g. to a user or viewer. The display device 328 may be or comprise any kind of display for representing the reconstructed picture, e.g. an integrated or external display or monitor. The displays may, e.g. comprise cathode ray tubes (CRT), liquid crystal displays (LCD), plasma displays, organic light emitting diodes (OLED) displays or any kind of other display . . . beamer, hologram (3D), . . . .

Although FIG. 3 depicts the source device 310 and the destination device 320 as separate devices, embodiments of devices may also comprise both or both functionalities, the source device 310 or corresponding functionality and the destination device 320 or corresponding functionality. In such embodiments the source device 310 or corresponding functionality and the destination device 320 or corresponding functionality may be implemented using the same hardware and/or software or by separate hardware and/or software or any combination thereof.

As will be apparent for the skilled person based on the description, the existence and (exact) split of functionalities of the different units or functionalities within the source device 310 and/or destination device 320 as shown in FIG. 3 may vary depending on the actual device and application.

Therefore, the source device 310 and the destination device 320 as shown in FIG. 3 are just example embodiments of the invention and embodiments of the invention are not limited to those shown in FIG. 3.

Source device 310 and destination device 320 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices, broadcast receiver device, or the like. (also servers and work-stations for large scale professional encoding/decoding, e.g. network entities) and may use no or any kind of operating system.

FIG. 1 shows a schematic/conceptual block diagram of an embodiment of an encoder 100, e.g. a picture encoder 100, which comprises an input 102, a residual calculation unit 104, a transformation unit 106, a quantization unit 108, an inverse quantization unit 110, and inverse transformation unit 112, a reconstruction unit 114, a buffer 118, a loop filter 120, a decoded picture buffer (DPB) 130, a prediction unit 160 [an inter estimation unit 142, an inter prediction unit 144, an intra-estimation unit 152, an intra-prediction unit 154,] a mode selection unit 162, an entropy encoding unit 170, and an output 172. A video encoder 100 as shown in FIG. 1 may also be referred to as hybrid video encoder or a video encoder according to a hybrid video codec.

Figure 2:
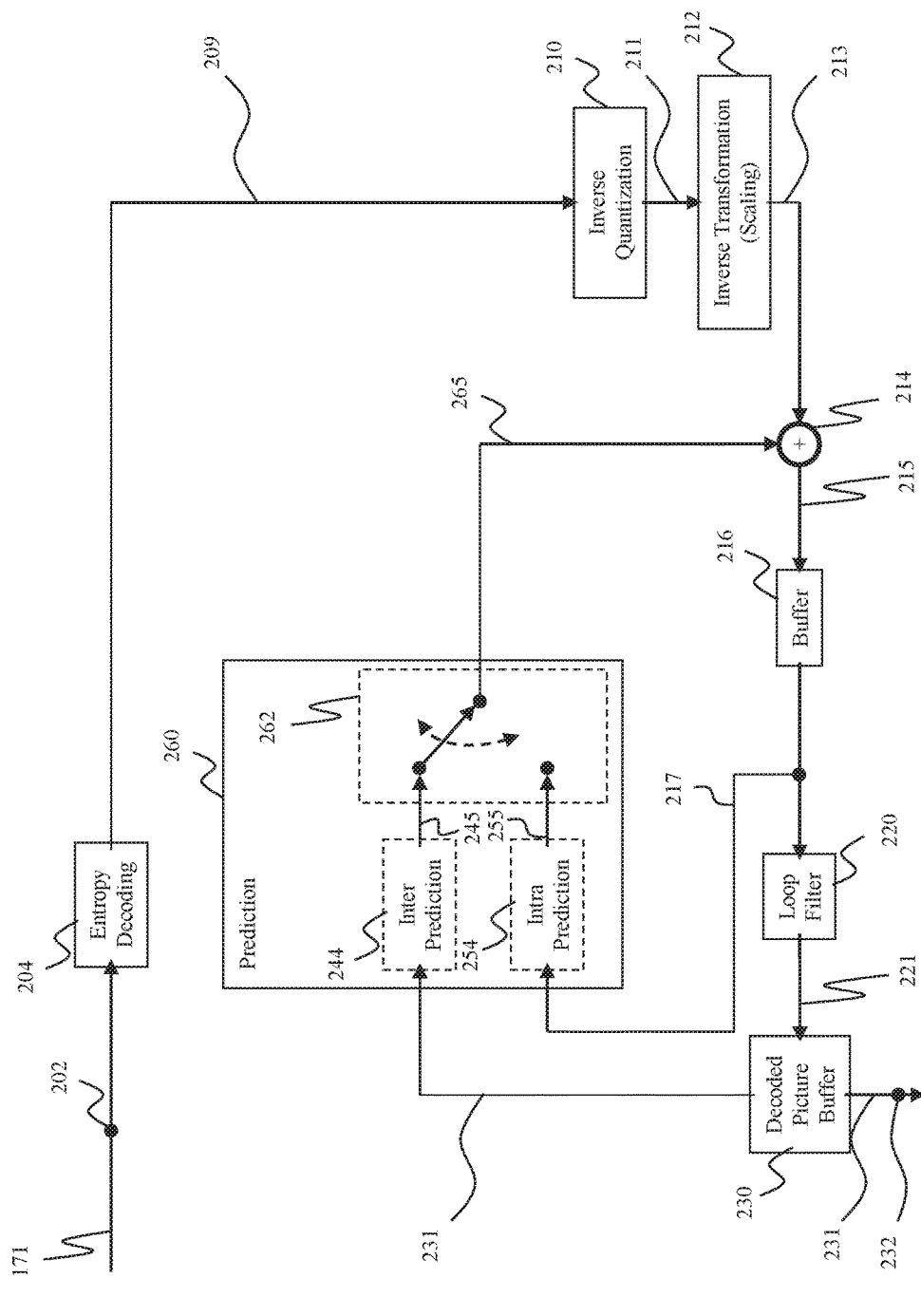
FIG. 2 is a block diagram showing an example structure of a video decoder configured to implement embodiments of the invention.

For example, the residual calculation unit 104, the transformation unit 106, the quantization unit 108, and the entropy encoding unit 170 form a forward signal path of the encoder 100, whereas, for example, the inverse quantization unit 110, the inverse transformation unit 112, the reconstruction unit 114, the buffer 118, the loop filter 120, the decoded picture buffer (DPB) 130, the inter prediction unit 144, and the intra-prediction unit 154 form a backward signal path of the encoder, wherein the backward signal path of the encoder corresponds to the signal path of the decoder (see decoder 200 in FIG. 2).

The encoder is configured to receive, e.g. by input 102, a picture 101 or a picture block 103 of the picture 101, e.g. picture of a sequence of pictures forming a video or video sequence. The picture block 103 may also be referred to as current picture block or picture block to be coded, and the picture 101 as current picture or picture to be coded (in particular in video coding to distinguish the current picture from other pictures, e.g. previously encoded and/or decoded pictures of the same video sequence, i.e. the video sequence which also comprises the current picture).

Embodiments of the encoder 100 may comprise a partitioning unit (not depicted in FIG. 1), e.g. which may also be referred to as picture partitioning unit, configured to partition the picture 103 into a plurality of blocks, e.g. blocks like block 103, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

Like the picture 101, the block 103 again is or can be regarded as a two-dimensional array or matrix of samples with intensity values (sample values), although of smaller dimension than the picture 101. In other words, the block 103 may comprise, e.g., one sample array (e.g. a luma array in case of a monochrome picture 101) or three sample arrays (e.g. a luma and two chroma arrays in case of a color picture 101) or any other number and/or kind of arrays depending on the color format applied. The number of samples in horizontal and vertical direction (or axis) of the block 103 define the size of block 103.

Encoder 100 as shown in FIG. 1 is configured encode the picture 101 block by block, e.g. the encoding and prediction is performed per block 103.

The residual calculation unit 104 is configured to calculate a residual block 105 based on the picture block 103 and a prediction block 165 (further details about the prediction block 165 are provided later), e.g. by subtracting sample values of the prediction block 165 from sample values of the picture block 103, sample by sample (pixel by pixel) to obtain the residual block 105 in the sample domain.

The transformation unit 106 is configured to apply a transformation, e.g. a spatial frequency transform or a linear spatial transform, e.g. a discrete cosine transform (DCT) or discrete sine transform (DST), on the sample values of the residual block 105 to obtain transformed coefficients 107 in a transform domain. The transformed coefficients 107 may also be referred to as transformed residual coefficients and represent the residual block 105 in the transform domain.

The transformation unit 106 may be configured to apply integer approximations of DCT/DST, such as the core transforms specified for HEVC/H.265. Compared to an orthonormal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transformed coefficients, tradeoff between accuracy and implementation costs, etc. Specific scaling factors are, for example, specified for the inverse transform, e.g. by inverse transformation unit 212, at a decoder 200 (and the corresponding inverse transform, e.g. by inverse transformation unit 112 at an encoder 100) and corresponding scaling factors for the forward transform, e.g. by transformation unit 106, at an encoder 100 may be specified accordingly.

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109. For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse de-quantization, e.g. by inverse quantization 110, may include multiplication by the quantization step size.

Embodiments according to HEVC, may be configured to use a quantization parameter to determine the quantization step size. Generally, the quantization step size may be calculated based on a quantization parameter using a fixed point approximation of an equation including division. Additional scaling factors may be introduced for quantization and de-quantization to restore the norm of the residual block, which might be modified because of the scaling used in the fixed point approximation of the equation for quantization step size and quantization parameter. In one example implementation, the scaling of the inverse transform and de-quantization might be combined. Alternatively, customized quantization tables may be used and signaled from an encoder to a decoder, e.g. in a bit-stream. The quantization is a lossy operation, wherein the loss increases with increasing quantization step sizes.

Embodiments of the encoder 100 (or respectively of the quantization unit 108) may be configured to output the quantization scheme and quantization step size, e.g. by means of the corresponding quantization parameter, so that a decoder 200 may receive and apply the corresponding inverse quantization. Embodiments of the encoder 100 (or quantization unit 108) may be configured to output the quantization scheme and quantization step size, e.g. directly or entropy encoded via the entropy encoding unit 170 or any other entropy coding unit.

The inverse quantization unit 110 is configured to apply the inverse quantization of the quantization unit 108 on the quantized coefficients to obtain de-quantized coefficients 111, e.g. by applying the inverse of the quantization scheme applied by the quantization unit 108 based on or using the same quantization step size as the quantization unit 108. The de-quantized coefficients 111 may also be referred to as de-quantized residual coefficients 111 and correspond—although typically not identical to the transformed coefficients due to the loss by quantization—to the transformed coefficients 108.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed de-quantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block and the respective sample values, for example for intra estimation and/or intra prediction. In further embodiments, the encoder may be configured to use unfiltered reconstructed blocks and/or the respective sample values stored in buffer unit 116 for any kind of estimation and/or prediction.

Embodiments of the encoder 100 may be configured such that, e.g. the buffer unit 116 is not only used for storing the reconstructed blocks 115 for intra estimation 152 and/or intra prediction 154 but also for the loop filter unit 120 (not shown in FIG. 1), and/or such that, e.g. the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

The loop filter unit 120 (or short "loop filter" 120), is configured to filter the reconstructed block 115 to obtain a filtered block 121, e.g. by applying a de-blocking sample-adaptive offset (SAO) filter or other filters, e.g. sharpening or smoothing filters or collaborative filters. The filtered block 121 may also be referred to as filtered reconstructed block 121. The loop filter 120 is in the following also referred to as deblocking filter. Further details of the loop filter unit 120 will be described below, e.g., based on FIG. 6 or 7 or FIG. 10 to FIG. 12.

Embodiments of the loop filter unit 120 may comprise (not shown in FIG. 1) a filter analysis unit and the actual filter unit, wherein the filter analysis unit is configured to determine loop filter parameters for the actual filter. The filter analysis unit may be configured to apply fixed predetermined filter parameters to the actual loop filter, adaptively select filter parameters from a set of predetermined filter parameters or adaptively calculate filter parameters for the actual loop filter.

Embodiments of the loop filter unit 120 may comprise (not shown in FIG. 1) one or a plurality of filters (loop filter components/subfilters), e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters, e.g. as described in the previous paragraph.

Embodiments of the encoder 100 (respectively loop filter unit 120) may be configured to output the loop filter parameters, e.g. directly or entropy encoded via the entropy encoding unit 170 or any other entropy coding unit, so that, e.g., a decoder 200 may receive and apply the same loop filter parameters for decoding.

The decoded picture buffer (DPB) 130 is configured to receive and store the filtered block 121. The decoded picture buffer 130 may be further configured to store other previously filtered blocks, e.g. previously reconstructed and filtered blocks 121, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter estimation and/or inter prediction.

Further embodiments of the invention may also be configured to use the previously filtered blocks and corresponding filtered sample values of the decoded picture buffer 130 for any kind of estimation or prediction, e.g. intra and inter estimation and prediction.

The prediction unit 160, also referred to as block prediction unit 160, is configured to receive or obtain the picture block 103 (current picture block 103 of the current picture 101) and decoded or at least reconstructed picture data, e.g. reference samples of the same (current) picture from buffer 116 and/or decoded picture data 231 from one or a plurality of previously decoded pictures from decoded picture buffer 130, and to process such data for prediction, i.e. to provide a prediction block 165, which may be an inter-predicted block 145 or an intra-predicted block 155.

The mode selection unit 162 may be configured to select a prediction mode (e.g. an intra or inter prediction mode) and/or a corresponding prediction block 145 or 155 to be used as prediction block 165 for the calculation of the residual block 105 and for the reconstruction of the reconstructed block 115.

Embodiments of the mode selection unit 162 may be configured to select the prediction mode (e.g. from those supported by prediction unit 160), which provides the best match or in other words the minimum residual (minimum residual means better compression for transmission or storage), or a minimum signaling overhead (minimum signaling overhead means better compression for transmission or storage), or which considers or balances both. The mode selection unit 162 may be configured to determine the prediction mode based on rate distortion optimization (RDO), i.e. select the prediction mode which provides a minimum rate distortion optimization or which associated rate distortion at least a fulfills a prediction mode selection criterion.

In the following the prediction processing (e.g. prediction unit 160 and mode selection (e.g. by mode selection unit 162) performed by an example encoder 100 will be explained in more detail.

As described above, encoder 100 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 32 different intra-prediction modes, e.g. non-directional modes like DC (or mean) mode and planar mode, or directional modes, e.g. as defined in H.264, or may comprise 65 different intra-prediction modes, e.g. non-directional modes like DC (or mean) mode and planar mode, or directional modes, e.g. as defined in H.265.

The set of (or possible) inter-prediction modes depend on the available reference pictures (i.e. previous at least partially decoded pictures, e.g. stored in DBP 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additionally to the above prediction modes, skip mode and/or direct mode may be applied.

The prediction unit 160 may be further configured to partition the block 103 into smaller block partitions or sub-blocks, e.g. iteratively using quad-tree-partitioning (QT), binary partitioning (BT) or triple-tree-partitioning (TT) or any combination thereof, and to perform, e.g. the prediction for each of the block partitions or sub-blocks, wherein the mode selection comprises the selection of the tree-structure of the partitioned block 103 and the prediction modes applied to each of the block partitions or sub-blocks.

The inter estimation unit 142, also referred to as inter picture estimation unit 142, is configured to receive or obtain the picture block 103 (current picture block 103 of the current picture 101) and a decoded picture 231, or at least one or a plurality of previously reconstructed blocks, e.g. reconstructed blocks of one or a plurality of other/different previously decoded pictures 231, for inter estimation (or "inter picture estimation"). E.g. a video sequence may comprise the current picture and the previously decoded pictures 231, or in other words, the current picture and the previously decoded pictures 231 may be part of or form a sequence of pictures forming a video sequence.

The encoder 100 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to obtain, e.g. receive, an inter prediction parameter 143 and to perform inter prediction based on or using the inter prediction parameter 143 to obtain an inter prediction block 145.

Although FIG. 1 shows two distinct units (or steps) for the inter-coding, namely inter estimation 142 and inter prediction 152, both functionalities may be performed as one (inter estimation) requires/comprises calculating an/the inter prediction block, i.e. the or a "kind of" inter prediction 154), e.g. by testing all possible or a predetermined subset of possible inter-prediction modes iteratively while storing the currently best inter prediction mode and respective inter prediction block, and using the currently best inter prediction mode and respective inter prediction block as the (final) inter prediction parameter 143 and inter prediction block 145 without performing another time the inter prediction 144.

The intra estimation unit 152 is configured to obtain, e.g. receive, the picture block 103 (current picture block) and one or a plurality of previously reconstructed blocks, e.g. reconstructed neighbor blocks, of the same picture for intra estimation. The encoder 100 may, e.g., be configured to select an intra prediction mode from a plurality of (predetermined) intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 103) or minimum rate distortion.

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation) requires/comprises calculating the intra prediction block, i.e. the or a "kind of" intra prediction 154), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

The entropy encoding unit 170 is configured to apply an entropy encoding algorithm or scheme (e.g. a variable length coding (VLC) scheme, an context adaptive VLC scheme (CALVC), an arithmetic coding scheme, a context adaptive binary arithmetic coding (CABAC)) on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bit-stream 171.

Other structural variations of the video encoder 100 can be used to encode the video stream. For example, a non-transform based encoder 100 can quantize the residual signal directly without the transform processing unit for certain blocks or frames. In another implementation, an encoder 100 can have the quantization unit and the inverse quantization unit combined into a single unit.

FIG. 2 shows an exemplary video decoder 200 configured to receive encoded picture data (e.g. encoded bit-stream) 171, e.g. encoded by encoder 100, to obtain a decoded picture 231.

The decoder 200 comprises an input 202, an entropy decoding unit 204, an inverse quantization unit 210, an inverse transformation unit 212, a reconstruction unit 214, a buffer 216, a loop filter 220, a decoded picture buffer 230, a prediction unit 260, an inter prediction unit 244, an intra prediction unit 254, a mode selection unit 260 and an output 232.

The entropy decoding unit 204 is configured to perform entropy decoding to the encoded picture data 171 to obtain, e.g., quantized coefficients 209 and/or decoded coding parameters (not shown in FIG. 2), e.g. (decoded) any or all of inter prediction parameters 143, intra prediction parameter 153, and/or loop filter parameters.

In embodiments of the decoder 200, the inverse quantization unit 210, the inverse transformation unit 212, the reconstruction unit 214, the buffer 216, the loop filter 220, the decoded picture buffer 230, the prediction unit 260 and the mode selection unit 260 are configured to perform the inverse processing of the encoder 100 (and the respective functional units) to decode the encoded picture data 171.

In particular, the inverse quantization unit 210 may be identical in function to the inverse quantization unit 110, the inverse transformation unit 212 may be identical in function to the inverse transformation unit 112, the reconstruction unit 214 may be identical in function reconstruction unit 114, the buffer 216 may be identical in function to the buffer 116, the loop filter 220 may be identical in function to the loop filter 220 (with regard to the actual loop filter as the loop filter 220 typically does not comprise a filter analysis unit to determine the filter parameters based on the original image 101 or block 103 but receives (explicitly or implicitly) or obtains the filter parameters used for encoding, e.g. from entropy decoding unit 204), and the decoded picture buffer 230 may be identical in function to the decoded picture buffer 130.

The prediction unit 260 may comprise an inter prediction unit 244 and an inter prediction unit 254, wherein the inter prediction unit 144 may be identical in function to the inter prediction unit 144, and the inter prediction unit 154 may be identical in function to the intra prediction unit 154. The prediction unit 260 and the mode selection unit 262 are typically configured to perform the block prediction and/or obtain the predicted block 265 from the encoded data 171 only (without any further information about the original image 101) and to receive or obtain (explicitly or implicitly) the prediction parameters 143 or 153 and/or the information about the selected prediction mode, e.g. from the entropy decoding unit 204.

The decoder 200 is configured to output the decoded picture 230, e.g. via output 232, for presentation or viewing to a user.

Although embodiments of the invention have been primarily described based on video coding, it should be noted that embodiments of the encoder 100 and decoder 200 (and correspondingly the system 300) may also be configured for still picture processing or coding, i.e. the processing or coding of an individual picture independent of any preceding or consecutive picture as in video coding. In general only inter-estimation 142, inter-prediction 144, 242 are not available in case the picture processing coding is limited to a single picture 101. Most if not all other functionalities (also referred to as tools or technologies) of the video encoder 100 and video decoder 200 may equally be used for still pictures, e.g. partitioning, transformation (scaling) 106, quantization 108, inverse quantization 110, inverse transformation 112, intra-estimation 142, intra-prediction 154, 254 and/or loop filtering 120, 220, and entropy coding 170 and entropy decoding 204.

Embodiments of the present invention deal with the inner workings of the deblocking filter, also referred to as loop filter in FIG. 1 and FIG. 2. Further details of the loop filter unit 120, 220 will be described below, e.g., based on FIG. 6 or FIG. 7 or FIG. 10 to FIG. 12 or FIG. 15 to FIG. 16.

Video coding schemes such as H.264/AVC and HEVC are designed along the principle of block-based hybrid video coding. Using this principle a picture is first partitioned into blocks and then each block is predicted by using intra-picture or inter-picture prediction. These blocks are coded relatively from the neighboring blocks and approximate the original signal with some degree of similarity. Since coded blocks only approximate the original signal, the difference between the approximations may cause discontinuities at the prediction and transform block boundaries. These discontinuities are attenuated by the deblocking filter. HEVC replaces the macroblock structure of H.264/AVC with the concept of coding tree unit (CTU) of maximum size 64×64 pixels. The CTU can further be partitioned into a quadtree-decomposition scheme into smaller coding units (CU), which can be subdivided down to a minimum size of 8×8 pixels. HEVC also introduces the concepts of prediction blocks (PB) and Transform blocks (TB).

In HEVC two filters are defined in deblocking filter: the normal filter and the strong filter. The normal filter modifies at most two samples on both sides of an edge. In the strong filter, three additional checkings between the samples along the edge and some pre-defined threshold are evaluated. If all of those checkings are true then the strong filter is applied. The strong filter has a more intensive smoothing effect for samples along the edge and can modify at most three samples on both sides of an edge.

ITU-T VCEG (Q6/16) and ISO/IEC MPEG (JTC 1/SC 29/WG 11) are studying the next generation video codec: Versatile Video Coding (VVC). This new video codec standard aims a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area.

The VVC Test Model (VTM) describes the features that are under coordinated test model study by the Joint Video Exploration Team (JVET) of ITU-T VCEG and ISO/IEC MPEG as potential enhanced video coding technology beyond the capabilities of HEVC.

The VTM software uses a new partitioning block structure scheme called as Quadtree plus binary tree plus triple tree (QTBTTT).

The QTBTTT structure removes the concepts of multiple partition types i.e. removes the separation of coding units (CU), prediction units (PU) and transform units (TU). Therefore CU=PU=TU.

QTBTTT supports more flexible CU partition shapes wherein a CU can have either square or rectangular shape. The minimum width and height of a CU can be 4 samples and the sizes of the CU can also be 4×N or N×4 where N can take values in the range [4, 8, 16, 32]. Furthermore, the largest CTU size has been increased to 128×128 pixels, which is 4 times larger than the CTU size in HEVC.

For rectangle CUs, the distortion close to the shorter edge can be obvious which results in block artifact even when the HEVC strong filter is applied. The blocking artifact can also be observed along the edge of large CUs, where distortion is significant due to larger prediction and transform operations.

Figure 15:
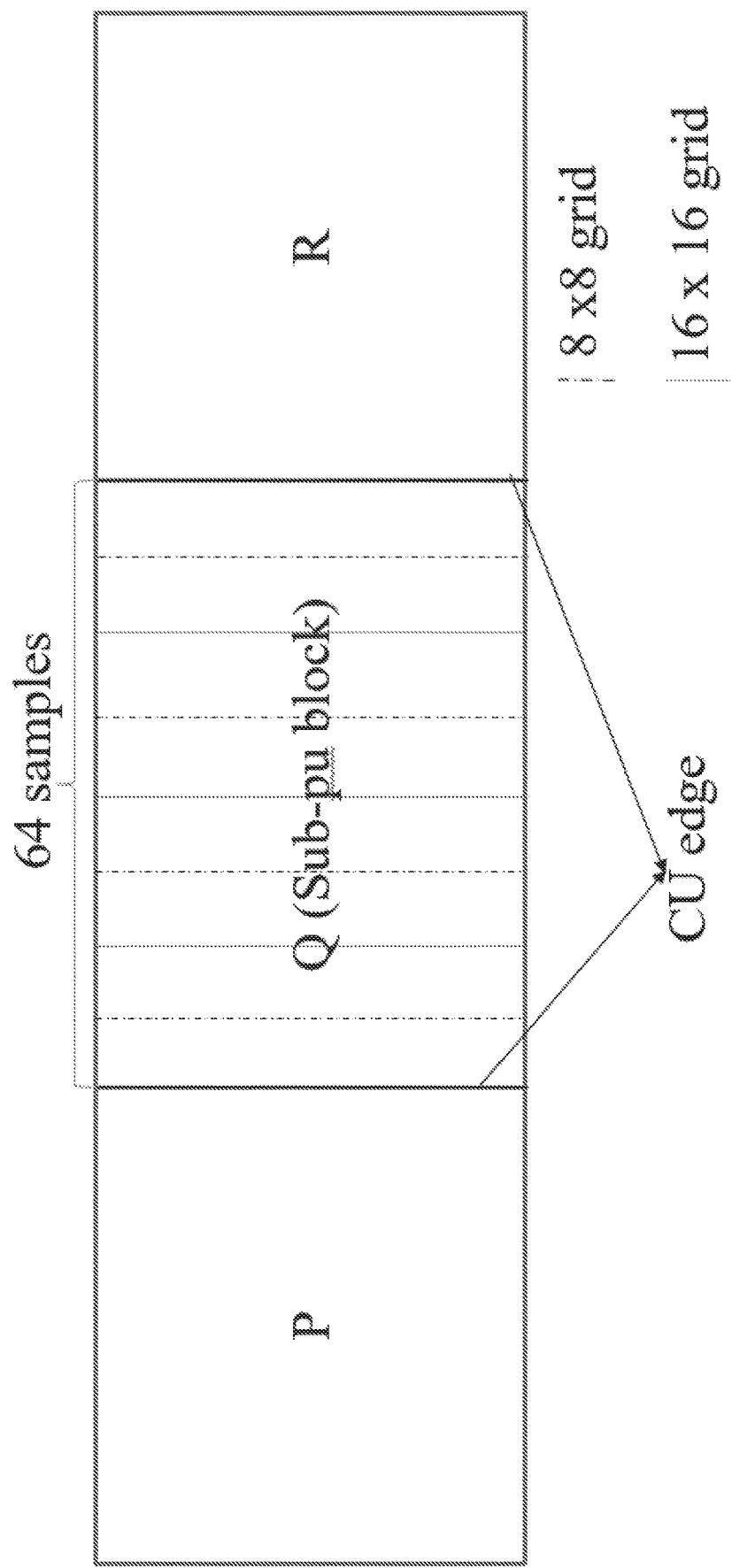
FIG. 15 shows how deblocking can be applied to all the internal sub-pu edges which lie on a 16×16 grid.
Figure 16:
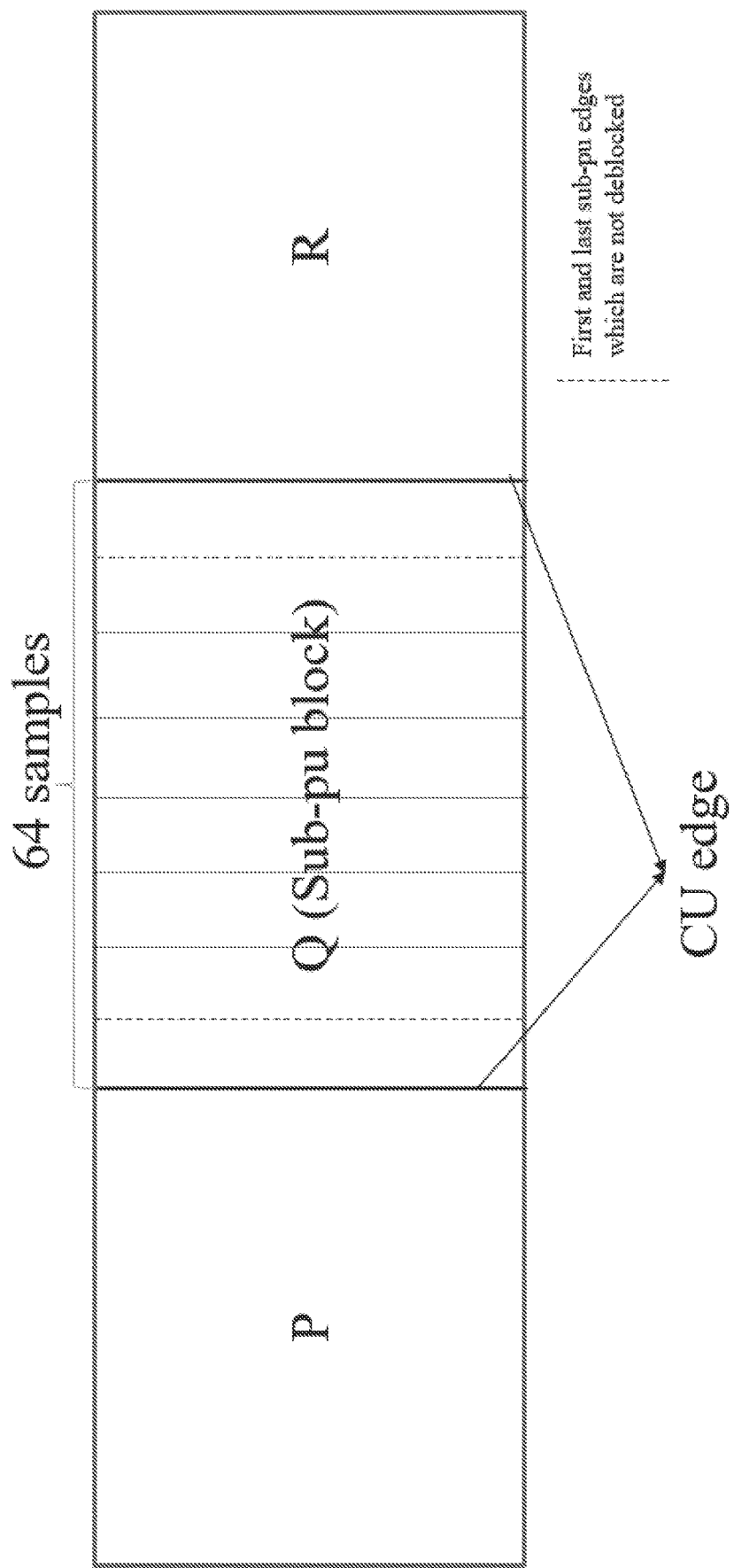
FIG. 16 shows how HEVC deblocking can be applied to all the internal sub-pu edges except the first and last sub-pu edges.

Additional Sub-pu tools (generally namely sub-block tools) like Affine and advanced temporal motion vector prediction (ATMVP) have now been adopted to Versatile Video Coding (VVC) standard. In an implementation manner, for sub-pu tools, especially Affine, deblocking may be also performed for the sub-pu edges/boundaries which overlap with an 8×8 grid. In another implementation manner, for sub-pu tools, especially Affine, only the sub-pu boundaries which overlap with the 16×16 grid are deblocked, all the other sub-pu boundaries are not deblocked, i.e. deblocking is not performed for the sub-pu boundaries which overlap with an 8×8 grid as shown in FIG. 15. In another implementation manner, for sub-pu tools, especially Affine, the first and last internal sub-pu boundaries are not deblocked. All the other internal sub-pu edges are deblocked as shown in FIG. 16. In other words, the solutions as shown in FIGS. 15 and 16 at least allow deblocking to some of the internal sub-pu edges. All these implementations mainly are there to cover the harmonization of longer tap filter applications when one of the block sharing the edge uses sub-pu tools like Affine or ATMVP.

Figure 4:
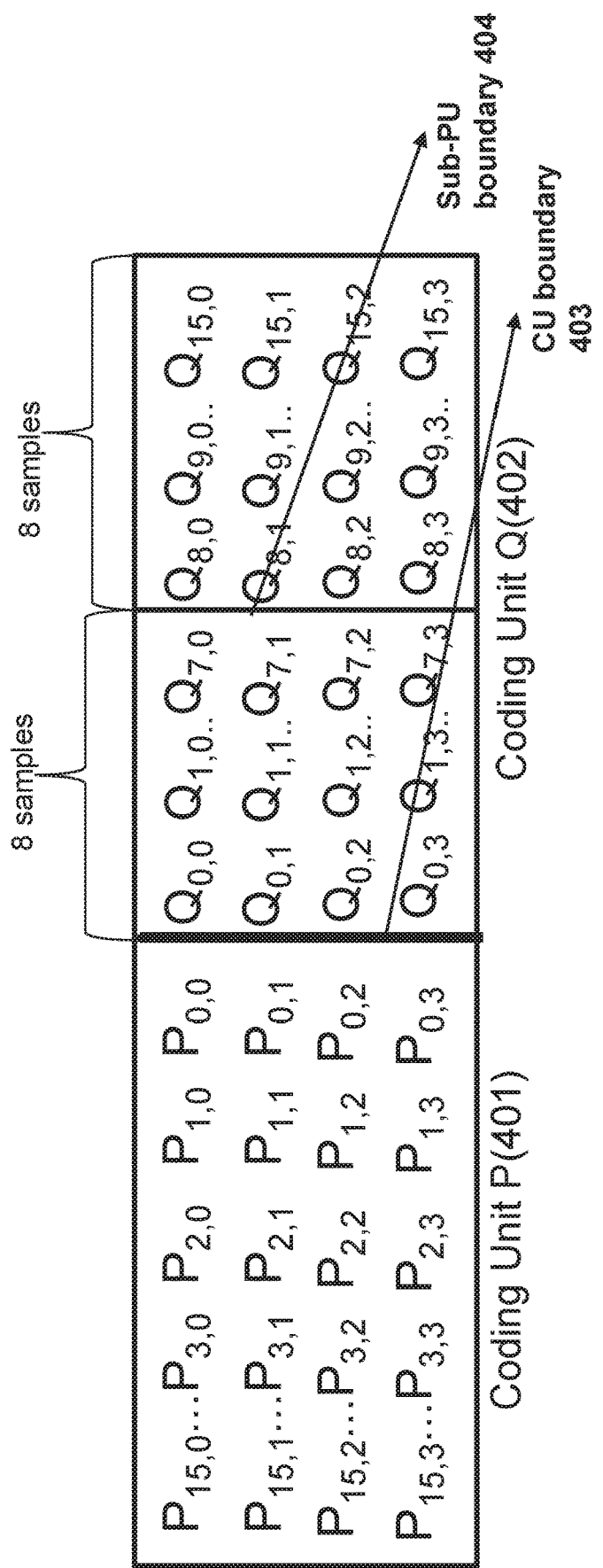
FIG. 4 shows two exemplary coding blocks in which coding block Q uses sub-pu tools (in general sub-block tools)

A current deblocking filter operation (with Quadtree plus binary tree plus triple tree (QTBTTT) partitioning) is depicted in FIG. 4.

The problem with the application of "longer tap filter" to sub-pu tools in shown in FIG. 4. Coding blocks 401, 402 also referred to as P, Q are two CUs, the size of the CU's are 16×4 samples.

When the CU edge (marked in thick black line) is filtered, then a maximum of 7 samples on either side of the CU edge are modified. Therefore the samples $Q_{0,0}$ up to $Q_{6,0}$ are modified. Also the samples $Q_{7,0}$ $Q_{6,0}$ $Q_{5,0}$ are used in the deblocking decision for the sub-pu boundary (marked in thin black line). Therefore the filtering creates an overlap and moreover results in the edges not to be deblocked in parallel.

It is therefore necessary to perform the deblocking filtering in a serial manner. This leads to long processing time. Especially with upcoming processor technologies, employing more and more parallel processing structures, this leads to unnecessarily long processing time. By adapting the deblocking filtering to work in parallel, significant processing time can be saved.

Figure 5:
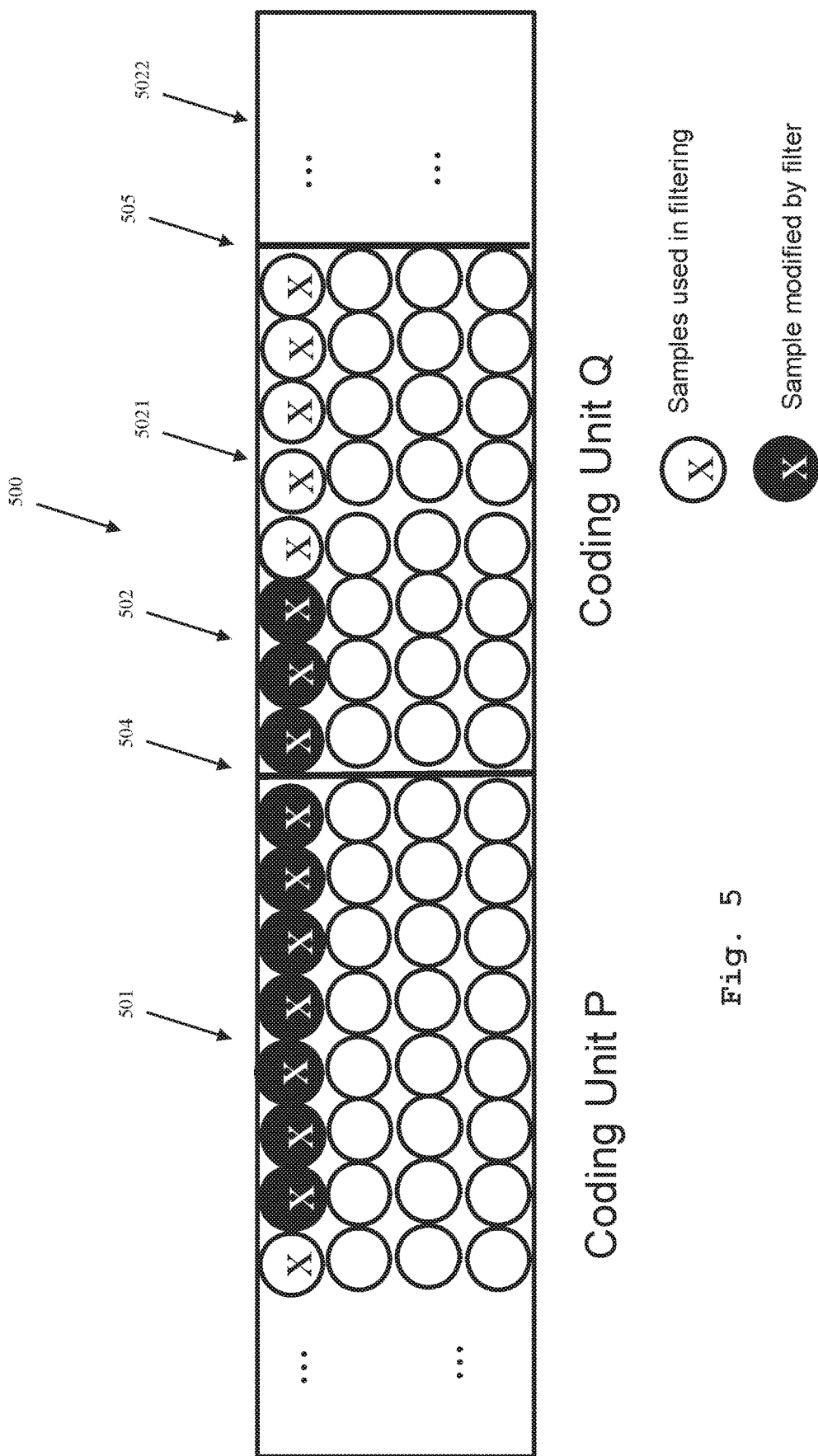
FIG. 5 shows two exemplary coding blocks and respective sample values used and modified during filtering by the exemplary method shown in FIG. 10.

In detail, parallelizing the deblocking filtering may be achieved by an approach as shown in FIG. 5, FIG. 15 or FIG. 16.

the embodiments of the invention

Figure 17:
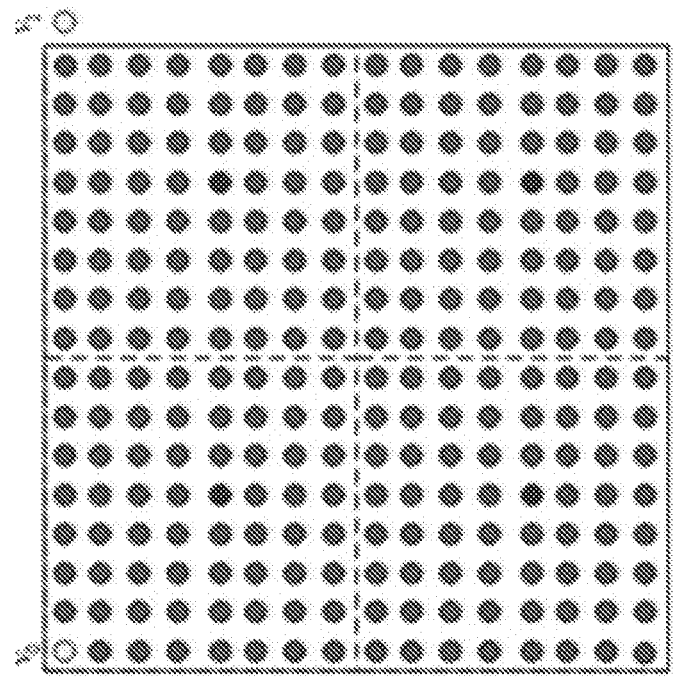
FIG. 17 shows two exemplary sub-blocks inside the coding block in which the coding block uses sub-pu tools.
Figure 17:
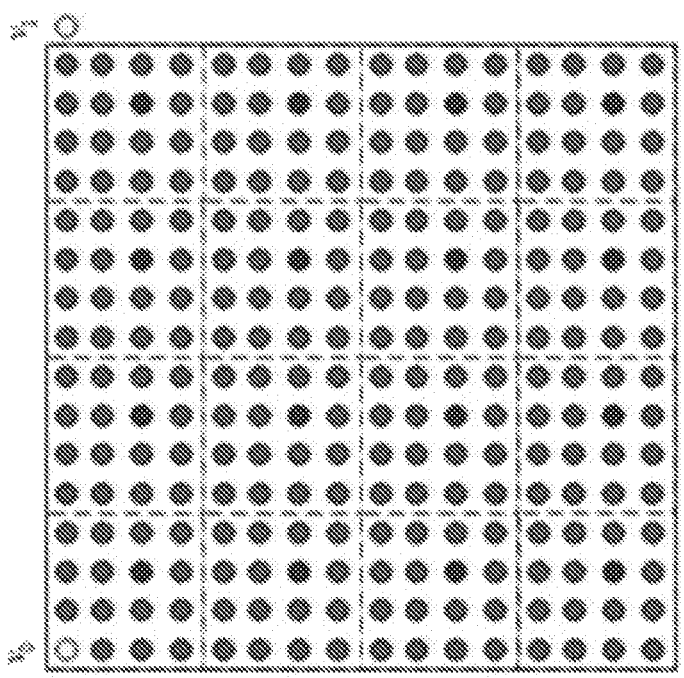
Figure 18:
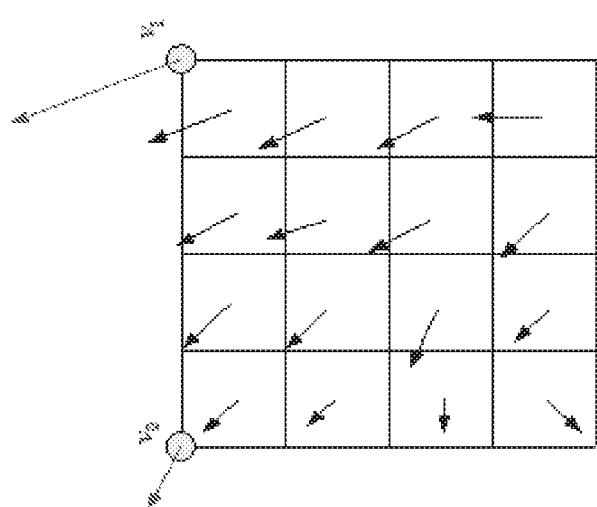
FIG. 18 shows exemplary sub-blocks inside the coding block in which the coding block uses sub-pu tools in which each of these sub-pus uses separate motion vectors.

Solution 1:

If current block Q uses Sub-pu tools like Affine or ATMVP, then embodiments of the present invention use the asymmetric version of the longer tap filter, i.e. uses an asymmetric filter as shown in table 1 to deblock the CU boundary between blocks P and Q; Basically a coding unit can use inter prediction. In inter prediction, there are several different tools which the coding unit may use. Affine and ATMVP are two sub-pu tools. Sub-pu tools means a given coding unit will further use smaller prediction units (sub-pus) and motion compensation is done separately for each of the sub-pus. For example, we have a coding unit of size 16×4, then, affine tool uses 2 sub-pus of size 8×4 (as shown in FIG. 4) or 4 sub-pus of size 4×4. For example, we have a coding unit of size 16×16, then, affine tool uses 16 sub-pus of size 4×4 or 4 sub-pus of size 8×8 as shown in FIGS. 17(*a*) and (*b*). Each of these sub-pus or sub-blocks uses separate motion vectors as shown in FIG. 18.

Therefore for the coding unit Q which uses Sub-pu tools, a maximum of three samples are modified, whereas for coding unit P a maximum of up to 7 samples are modified. Please refer to FIG. 4 or 5, if the width of coding unit P is larger than 8 samples, e.g. 16 or 32 samples, for coding unit P a maximum of up to 7 samples are modified. It can be noted that in some scenarios, 3, 4, 5 or 6 samples also may be modified for coding unit P, Q.

TABLE 1

| Output pixel | Filter coefficients $\{q_7, q_6, q_5, q_4, g_3, q_2, q_1, q_0, p_0, p_1, p_2, p_3, p_4, p_5, p_6, p_7\}$ | Input pixels |
|---|---|---|
| $q_2$ | {0, 0, 0, 0, 6, 3, 1, 1, 1, 1, 1, 1, 0, 0, 0} | $q_3$~$p_4$ |
| $q_1$ | {0, 0, 0, 0, 5, 1, 3, 1, 1, 1, 1, 1, 1, 0, 0} | $q_3$~$p_5$ |
| $q_0$ | {0, 0, 0, 0, 5, 1, 1, 2, 1, 1, 1, 1, 1, 1, 0} | $q_3$~$p_6$ |
| $p_0$ | {0, 0, 0, 0, 4, 1, 1, 1, 2, 1, 1, 1, 1, 1, 1} | $q_3$~$p_7$ |
| $p_1$ | {0, 0, 0, 0, 3, 1, 1, 1, 1, 3, 1 1, 1, 1, 1} | $q_3$~$p_7$ |
| $p_2$ | {0, 0, 0, 0, 2, 1, 1, 1, 1, 1, 3, 1, 1, 1, 2} | $q_3$~$p_7$ |
| $p_3$ | {0, 0, 0, 0, 1, 1, 1, 1, 1, 1, 1, 3, 1, 1, 3} | $q_3$~$p_7$ |
| $p_4$ | {0, 0, 0, 0, 0, 1, 1, 1, 1, 1, 1, 1, 3, 1, 1, 4} | $q_2$~$p_7$ |
| $p_5$ | {0, 0, 0, 0, 0, 0, 1, 1, 1, 1, 1, 1, 1, 3, 1, 5} | $q_1$~$p_7$ |
| $p_6$ | {0, 0, 0, 0, 0, 0, 0, 1, 1, 1, 1, 1, 1, 1, 3, 6} | $q_0$~$p_7$ |

The input pixels correspond to the pixel values or sample values used for filtering, and the output pixels correspond to the modified sample values. It should be noted that the input pixels may be consecutive pixels perpendicular to the block edge beginning at the block edge. Also, the output pixels may be consecutive pixels perpendicular to the block edge, beginning at the block edge. As illustrated in table 1, in an example, the first output values (related to the coding block Q) correspond to q2, q1, q0; and the second output values (related to the coding block P) correspond to p0, p1, p2, . . . p5, p6. Correspondingly, the coding unit Q corresponds to the second image block which uses the sub-block tool and the coding unit P corresponds to the first image block. The coding unit Q is a current block and the coding unit P is a neighboring block of the current block.

Also the filter condition (equation 1) makes sure only a maximum of 4 samples from block Q are used for making the filter decision.

In an example, for both the first and fourth lines of a deblocking segment:

$$(|q_3 - q_2 - q_1 + q_0| + |p_0 - p_3 - p_4 + p_7|) < \frac{3*\beta}{32} \ \&\& \quad \text{(Equation 1)}$$

$$(|q_3 - q_2 - q_1 + q_0| + |p_0 - p_2 - p_3 + p_5|) < \frac{3*\beta}{32}$$

Generally, the deblocking filter process may include three steps: boundary/edge detection, filtering decision (Filter On/Off decision), and filtering process for vertical and horizontal edges.

For filter decision (for equation 1), we can only use 4 samples. Therefore in equation 1 for block Q, the samples only from $q_0$ till $q_3$ are used. In equation 1 for the block P, the four samples as illustrated in equation 1 may be used. In an example, the second decision values correspond to q3, q2, q1, q0; and the first decision values correspond to p0, p3, p4, p7, p0, p2, p3, p5.

If equation 1 is satisfied, then the longer tap filter mentioned in Table 1 can be used. If equation 1 is not satisfied, then the HEVC strong filter can be used. Also here a maximum of 3 samples from the block Q are modified. i.e. $q_0$ to $q_2$. Basically to apply a longer tap filter, equation 1 is considered. Only if the equation/condition 1 is true, then the longer tap filter which is shown in table 1 may be applied. It can be noted that the equation 1 may be used in step 707 of FIG. 7.

Equation 1 basically checks for the gradient on either side of the CU edge. Since only a maximum of 4 samples are available for making filter decision from block Q, therefore only samples $q_0$ to $q_3$ are used from block Q. wherein β denotes the threshold parameter known, for instance, from the HEVC standard. For the filter condition, the value of the threshold parameter β depends on the quantization parameter, QP. As already described above, the QP is a well-known parameter in video coding standards that controls the tradeoff between bitrate and video content quality. In an embodiment, the QP can range from 0 to 51. In an embodiment the processing circuitry of the filter apparatus 120, 220 is configured to determine the threshold parameter β on the basis of the quantization parameter, QP, using a look-up table. In an embodiment, the look-up table can be defined as follows:

Look-up Table [52]={0,0,0,0,0,0,0,0,0,0,0,0,0,0,0,0,6, 7,8,9,10,11,12,13,14,15,16,17,18,20,22,24,26,28, 30,3 2,34,36,38,40,42,44,46,48,50,52,54,56,58, 60,62,64}.

For more details about the threshold parameter β and its dependency on the QP, reference is made to chapter 7 of the book "High Efficiency Video Coding (HEVC)", Sze et al, which is herein fully incorporated by reference.

If neighboring block P uses Sub-pu tools like Affine or ATMVP, then embodiments of the present invention use the asymmetric version of the longer tap filter, i.e. uses an asymmetric filter as shown in table 2 to deblock the CU boundary between blocks P and Q;

Therefore for the coding unit P which uses Sub-pu tools, in an example, a maximum of three samples are modified, whereas for the current coding unit Q a maximum of up to 7 samples are modified.

TABLE 2

| Output pixel | Filter coefficients $\{p_7, p_6, p_5, p_4, p_3, p_2, p_1, p_0, q_0, q_1, q_2, q_3, q_4, q_5, q_6, q_7\}$ | Input pixels |
| --- | --- | --- |
| $p_2$ | {0, 0, 0, 0, 6, 3, 1, 1, 1, 1, 1, 1, 1, 0, 0, 0} | $p_3$~$q_4$ |
| $p_1$ | {0, 0, 0, 0, 5, 1, 3, 1, 1, 1, 1, 1, 1, 1, 0, 0} | $p_3$~$q_5$ |
| $p_0$ | {0, 0, 0, 0, 5, 1, 1, 2, 1, 1, 1, 1, 1, 1, 1, 0} | $p_3$~$q_6$ |
| $q_0$ | {0, 0, 0, 0, 4, 1, 1, 1, 2, 1, 1, 1, 1, 1, 1, 1} | $p_3$~$q_7$ |
| $q_1$ | {0, 0, 0, 0, 3, 1, 1, 1, 1, 3, 1, 1, 1, 1, 1, 1} | $p_3$~$q_7$ |
| $q_2$ | {0, 0, 0, 0, 2, 1, 1, 1, 1, 1, 3, 1, 1, 1, 1, 2} | $p_3$~$q_7$ |
| $q_3$ | {0, 0, 0, 0, 1, 1, 1, 1, 1, 1, 1, 3, 1, 1, 1, 3} | $p_3$~$q_7$ |
| $q_4$ | {0, 0, 0, 0, 0, 1, 1, 1, 1, 1, 1, 1, 3, 1, 1, 4} | $p_2$~$q_7$ |

TABLE 2-continued

| Output pixel | Filter coefficients $\{p_7, p_6, p_5, p_4, p_3, p_2, p_1, p_0, q_0, q_1, q_2, q_3, q_4, q_5, q_6, q_7\}$ | Input pixels |
| --- | --- | --- |
| $q_5$ | {0, 0, 0, 0, 0, 0, 1, 1, 1, 1, 1, 1, 1, 3, 1, 5} | $p_1$~$q_7$ |
| $q_6$ | {0, 0, 0, 0, 0, 0, 0, 1, 1, 1, 1, 1, 1, 1, 3, 6} | $p_0$~$q_7$ |

The input pixels correspond to the pixel values or sample values used for filtering, and the output pixels correspond to the modified sample values. It should be noted that the input pixels may be consecutive pixels perpendicular to the block edge beginning at the block edge. Also, the output pixels may be consecutive pixels perpendicular to the block edge, beginning at the block edge. As illustrated in table 2, in an example, the first output values (related to the coding block P) correspond to p2, p1, p0; and the second output values (related to the coding block Q) correspond to q0, q1, q2, . . . q5, q6. Correspondingly, the coding unit P corresponds to the second image block which uses sub-block tools and the coding unit Q corresponds to the first image block. The coding unit P is a current block and the coding unit Q is a neighboring block of the current block.

Also the filter condition (equation 2) makes sure that only a maximum of 4 samples from block P are used for making the filter decision.

In an example, for both the first and fourth lines of a deblocking segment:

$$(|p_3 - p_2 - p_1 + p_0| + |q_0 - q_3 - q_4 + q_7|) < \frac{3 * \beta}{32} \&\& \quad \text{(Equation 2)}$$

$$(|p_3 - p_2 - p_1 + p_0| + |q_0 - q_2 - q_3 + q_5|) < \frac{3 * \beta}{32}$$

Generally, the deblocking filter process may include three steps: boundary/edge detection, filtering decision (Filter On/Off decision), and filtering process for vertical and horizontal edges.

For filter decision (for equation 2), we can only use 4 samples. Therefore in equation 2 for the block P, the samples only from $p_0$ till $p_3$ are used. In equation 2 for the block Q, the four samples as illustrated in equation 2 may be used. In an example, the second decision values correspond to p3, p2, p1, p0; and the first decision values correspond to q0, q3, q4, q7, q0, q2, q3, q5.

If equation 2 is satisfied, then the longer tap filter mentioned in Table 2 can be used. If equation 2 is not satisfied, then the HEVC strong filter can be used. Also here a maximum of 3 samples from the block P are modified. i.e. $p_0$ to $p_2$. Basically to apply a longer tap filter, equation 2 is considered. Only if the equation 2 is true, then the longer tap filter which is shown in table 2 may be applied. It can be noted that the equation 2 may be used in step 707 of FIG. 7.

It is allowed to use a maximum of 4 samples from the block P to make filter decision. Therefore the samples of p4, p5 . . . p7 cannot be used and therefore the filter coefficients of samples of p4, p5 . . . p7 are zero. In this manner, p4, p5 . . . p7 are not used in the filtering operations.

Equation 2 basically checks for the gradient on either side of the block. Since only a maximum of 4 samples are available for making filter decision from block P, therefore only samples $p_0$ to $p_3$ are used from block P.

In an alternative implementation, the coefficients for $p_0$, $p_1$, $p_2$ or $q_0$, $q_1$, $q_2$ can also use HEVC strong filter coefficients. The coefficients for the case in which the coding unit P uses Sub-pu tools are shown in table 3. In other words, embodiments of the present invention may use the asymmetric version of the longer tap filter, i.e. may use an asymmetric filter as shown in table 3 to de-block the CU boundary between blocks P and Q. Correspondingly, the coding unit P corresponds to the second image block and the coding unit Q corresponds to the first image block. The coding unit P is a current block and the coding unit Q is a neighboring block of the current block.

TABLE 3

| Output pixel | Filter coefficients $\{p_7, p_6, p_5, p_4, p_3, p_2, p_1, p_0, q_0, q_1, q_2, q_3, q_4, q_5, q_6, q_7\}$ | Input pixels |
|---|---|---|
| $p_2$ | {0, 0, 0, 0, 4, 6, 2, 2, 2, 0, 0, 0, 0, 0, 0, 0} | $p_3\sim q_0$ |
| $p_1$ | {0, 0, 0, 0, 0, 4, 4, 4, 4, 0, 0, 0, 0, 0, 0, 0} | $p_2\sim q_0$ |
| $p_0$ | {0, 0, 0, 0, 0, 2, 4, 4, 4, 2, 0, 0, 0, 0, 0, 0} | $p_2\sim q_1$ |
| $q_0$ | {0, 0, 0, 0, 4, 1, 1, 1, 2, 1, 1, 1, 1, 1, 1, 1} | $p_3\sim q_7$ |
| $q_1$ | {0, 0, 0, 0, 3, 1, 1, 1, 1, 3, 1, 1, 1, 1, 1, 1} | $p_3\sim q_7$ |
| $q_2$ | {0, 0, 0, 0, 2, 1, 1, 1, 1, 1, 3, 1, 1, 1, 1, 2} | $p_3\sim q_7$ |
| $q_3$ | {0, 0, 0, 0, 1, 1, 1, 1, 1, 1, 1, 3, 1, 1, 1, 3} | $p_3\sim q_7$ |
| $q_4$ | {0, 0, 0, 0, 0, 1, 1, 1, 1, 1, 1, 1, 3, 1, 1, 4} | $p_2\sim q_7$ |
| $q_5$ | {0, 0, 0, 0, 0, 0, 1, 1, 1, 1, 1, 1, 1, 3, 1, 5} | $p_1\sim q_7$ |
| $q_6$ | {0, 0, 0, 0, 0, 0, 0, 1, 1, 1, 1, 1, 1, 1, 3, 6} | $p_0\sim q_7$ |

Alternatively, the filter coefficients for $p_0$, $p_1$, $p_2$ or $q_0$, $q_1$, $q_2$ can also use HEVC strong filter coefficients. The filter coefficients for the case in which the coding unit Q uses Sub-pu tools are shown in table 4. In other words, embodiments of the present invention may use the asymmetric version of the longer tap filter, i.e. may use an asymmetric filter as shown in table 4 to deblock the CU boundary between blocks P and Q. Correspondingly, the coding unit Q corresponds to the second image block and the coding unit P corresponds to the first image block. The coding unit Q is a current block and the coding unit P is a neighboring block of the current block.

TABLE 4

| Output pixel | Filter coefficients $\{q_7, q_6, q_5, q_4, q_3, q_2, q_1, q_0, p_0, p_1, p_2, p_3, p_4, p_5, p_6, p_7\}$ | Input pixels |
|---|---|---|
| $q_2$ | {0, 0, 0, 0, 4, 6, 2, 2, 2, 0, 0, 0, 0, 0, 0, 0} | $q_3\sim p_0$ |
| $q_1$ | {0, 0, 0, 0, 0, 4, 4, 4, 4, 0, 0, 0, 0, 0, 0, 0} | $q_2\sim p_1$ |
| $q_0$ | {0, 0, 0, 0, 0, 2, 4, 4, 4, 2, 0, 0, 0, 0, 0, 0} | $q_2\sim p_1$ |
| $p_0$ | {0, 0, 0, 0, 4, 1, 1, 1, 2, 1, 1, 1, 1, 1, 1, 1} | $q_3\sim p_7$ |
| $p_1$ | {0, 0, 0, 0, 3, 1, 1, 1, 1, 3, 1, 1, 1, 1, 1, 1} | $q_3\sim p_7$ |
| $p_2$ | {0, 0, 0, 0, 2, 1, 1, 1, 1, 1, 3, 1, 1, 1, 1, 2} | $q_3\sim p_7$ |
| $p_3$ | {0, 0, 0, 0, 1, 1, 1, 1, 1, 1, 1, 3, 1, 1, 1, 3} | $q_3\sim p_7$ |
| $p_4$ | {0, 0, 0, 0, 0, 1, 1, 1, 1, 1, 1, 1, 3, 1, 1, 4} | $q_2\sim p_7$ |

TABLE 4-continued

| Output pixel | Filter coefficients $\{q_7, q_6, q_5, q_4, q_3, q_2, q_1, q_0, p_0, p_1, p_2, p_3, p_4, p_5, p_6, p_7\}$ | Input pixels |
|---|---|---|
| $p_5$ | {0, 0, 0, 0, 0, 0, 1, 1, 1, 1, 1, 1, 1, 3, 1, 5} | $q_1\sim p_7$ |
| $p_6$ | {0, 0, 0, 0, 0, 0, 0, 1, 1, 1, 1, 1, 1, 1, 3, 6} | $q_0\sim p_7$ |

The filter condition which is used can be Equation 1 or Equation 2 based on whether block P or block Q uses sub-pu tools. For example, if block P uses sub-pu tools, the filter condition is Equation 2; if block Q uses sub-pu tools, the filter condition is Equation 1;

If both coding unit Q and coding unit P use sub-pu tools, then the longer tap filter is not applied at the CU boundary any more. HEVC strong filter may be considered for the CU edge (short for CE). In an implementation, a maximum of 3 samples on a side of the CU edge are modified in block P, and a maximum of 3 samples on another side of the CU edge are modified in block Q. The filter used is as shown in table 5. In other words, embodiments of the present invention may use the filter as shown in table 5 to de-block the CU boundary between blocks P and Q.

TABLE 5

| Output pixel | Filter coefficients $\{p_2, p_1, p_0, q_0, q_1, q_2\}$ | Input pixels |
|---|---|---|
| $p_2$ | {6, 2, 2, 2, 0, 0} | $p_2\sim q_0$ |
| $p_1$ | {4, 4, 4, 4, 0, 0,} | $p_2\sim q_0$ |
| $p_0$ | {2, 4, 4, 4, 2, 0} | $p_2\sim q_1$ |
| $q_0$ | {0, 2, 4, 4, 4, 2} | $p_1\sim q_2$ |
| $q_1$ | {0, 0, 4, 4, 4, 4} | $p_0\sim q_2$ |
| $q_2$ | {0, 0, 2, 2, 2, 6} | $p_0\sim q_2$ |

Figure 7:
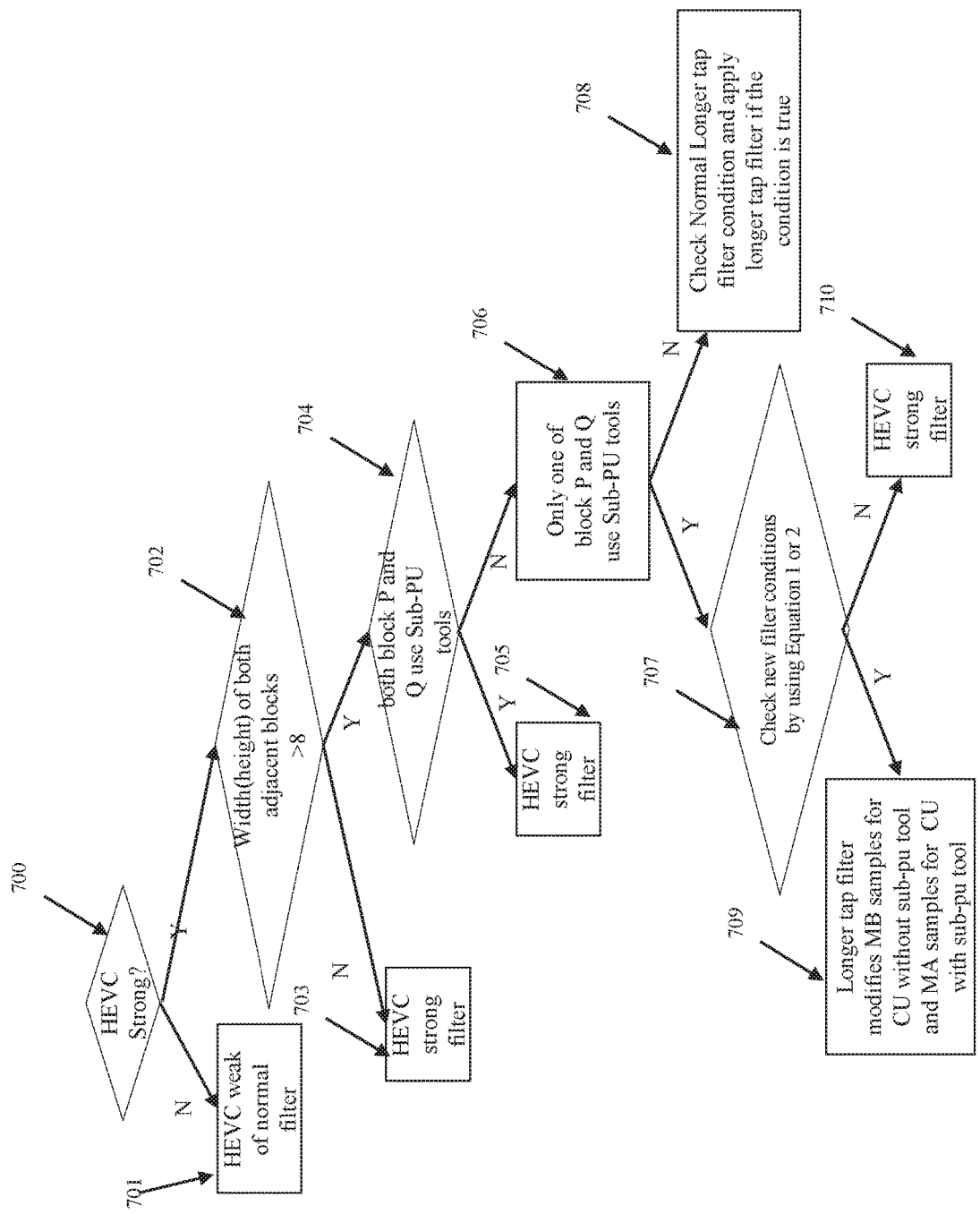
FIG. 7 shows a flow chart illustrating a method for determining whether a longer tap filter shall be used.

FIG. 7 is a flow chart illustrating a method for determining whether a longer tap filter (or an asymmetric long filter) shall be used. As illustrated in FIG. 7, the HEVC strong filter condition should be satisfied for the "longer tap filter" conditions to be true. In step 707, the details have been described above. The longer tap filter used in step 709 is different from the normal longer tap filter used in step 708, the details have been described above. The normal longer tap filter condition may be:

$$|p_7 - p_0| + |q_7 - q_0| < \frac{\beta}{8}.$$

In some examples, on top of the HEVC filter, the normal longer tap filter in step 708 uses 8 samples for filter decision on each side of the edge, and 7 samples are modified on each side of the edge. However, the longer tap filter in step 709 uses DB samples for filter decision on one side of the edge and DA samples for filter decision on the other side of the edge, and MB samples are modified on said one side of the edge while MA samples are modified on the other side of the edge. MA≠MB, particularly MA<MB, for example, MA=3 and MB=7, or MA=4 and MB=7, or MA=5 and MB=7. In general, DA=MA+1; DB=MB+1.

Figure 8:
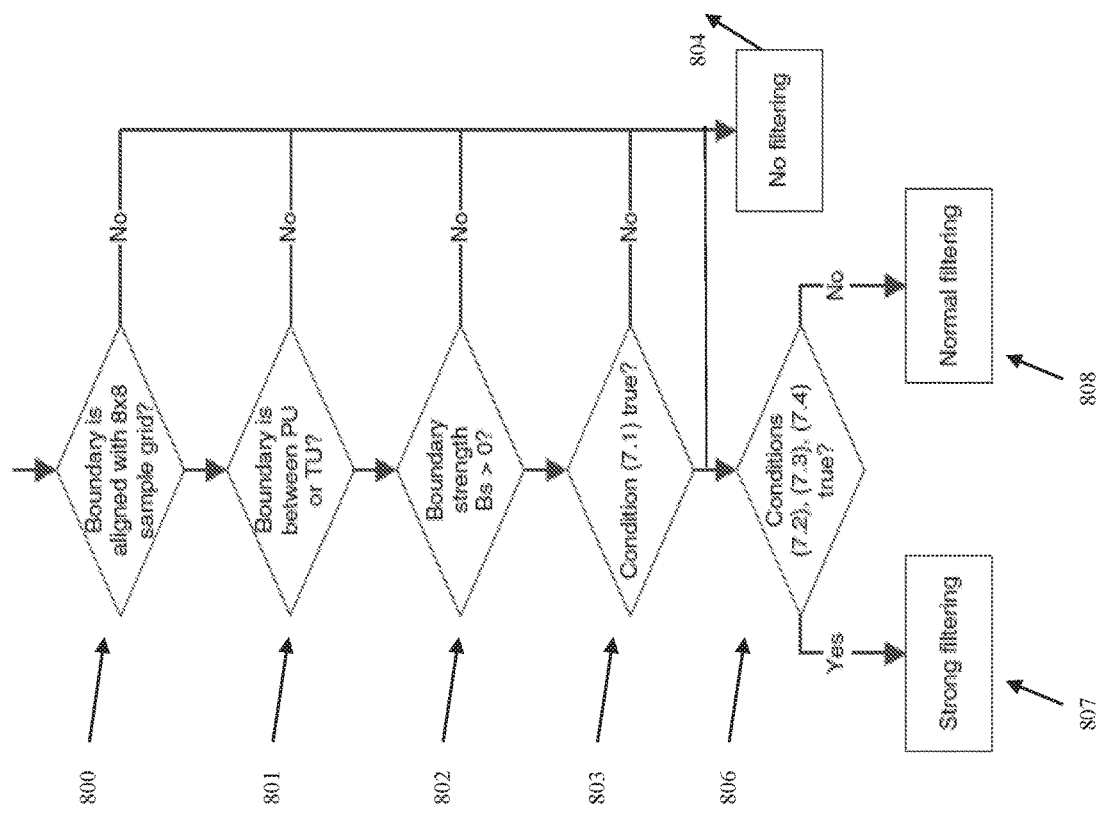
FIG. 8 shows a flow chart illustrating a method for determining whether the HEVC strong filter condition should be satisfied.

The details for determining whether the HEVC strong filter condition should be satisfied is shown in FIG. 8. The deblocking filtering decisions for a block boundary including the decisions between the strong and the normal filtering are summarized in a flowchart in FIG. 8.

In a first step 800, it is checked if the currently filtered block edge is aligned with an 8×8 encoding sample grid. If this is the case, in a second step 801, it is checked if the block edge to be filtered is a boundary between prediction units or transform units. If this is the case, in a third step 802, it is checked if a boundary strength Bs>0. If also this condition is met, in a fourth step 803 it is checked if a condition 7.1 is true.

Condition 7.1 is used to check if deblocking filtering is applied to a block boundary or not. The condition especially checks how much the signal on each side of the block boundary deviates from a straight line (ramp).

If this condition is not met, or any of the checks of steps 800, 801 and 802 are not fulfilled, it is decided in a fifth step 804 that no filtering is performed.

In a sixth step 805 (not shown in FIG. 8), it is now checked, if the block size of any of the two blocks, surrounding the edge to be filtered, is four. If this is not the case, in a seventh step 806, it is checked, if further condition 7.2, 7.3, and 7.4 are met.

Condition 7.2 checks that there are no significant signal variations at the sides of the block boundary. Condition 7.3 verifies that the signal on both sides is flat.

Condition 7.4 ensures that the step between the sample values at the sides of the block boundary is small.

If all of these conditions are true, in an eighth step 807, a strong filtering is performed, step 807 is directly replaced with step 702 of FIG. 7. If this is not the case, in a ninth step 808 it is decided that a normal filtering is performed.

This solution enforces part of a deblocking flow chart, so that only one sample modification is performed.

This allows for significantly reducing the number of checks needed to determine, if filtering is performed, and which type of filtering is performed, in case of at least one of the block sizes being an even integer $2^n$ larger than a threshold (e.g. 8 or 16, etc), particularly in case of at least one of the block sizes being an even integer $2^n$ larger than 16.

In order to avoid filter overlaps when a longer tap filter is applied for blocks either or both of which use sub-pu tools like Affine and ATMVP, the following solutions are proposed in the present disclosure.

Solution 1: Uses "asymmetric" filter which allows modification of up to MA samples for the block which use sub-pu tools if either of the block Q or block P uses Sub-pu tools like Affine or ATMVP, for example, MA=3, 4, 5 or 6.

Solution 2: Longer tap filter cannot be applied for the CU edge if both coding unit Q and coding unit P uses Sub-pu tools. HEVC strong filter is considered for the edge. Therefore the same number of samples on either side of the CU edge for block P and Q are modified, MA'=MB'.

Solution 3: Disable deblocking for the sub-pu edges while deblocking is performed only at the CU edges, if either of the block Q or block P use Sub-pu tools like Affine or ATMVP.

Solutions 4 and 5: If either of the block Q or block P use Sub-pu tools like Affine or ATMVP, then not only the deblocking is performed at some of the Sub-pu edges, but also performed at the CU edges.

Solution 4: In this solution, the longer tap deblocking filter or a normal HEVC deblocking filter can be applied to all the CU edges. For the internal sub-pu edges, only the edges which overlap with a 16×16 grid are deblocked. The internal sub-pu edges which overlap with 8×8 grid are not deblocked. The main advantage of this solution is that the longer tap filter can also be applied to some of the internal sub-pu edges apart from the cu edges.

As shown in FIG. 15, the example includes three coding units (blocks) P, Q, R. Block Q uses sub-pu tools like Affine or ATMVP and therefore consists of internal sub-pu edge. There are two coding units edges, one edge is shared between block P (e.g. CU P) and block Q (e.g. CU Q) and the other coding unit edge is shared between block Q (e.g. CU Q) and block R (e.g. CU R). To apply a longer tap filter for the coding unit edge without introducing filter overlaps and therefore not sacrificing parallel deblocking, the proposed solution only deblocks all the internal sub-pu edges which overlap with a 16×16 grid. All the other internal sub-pu edges are not deblocked. This situation is also depicted in FIG. 15, the dashed lines are the internal sub-pu edges which overlap with a 8×8 grid and are not deblocked. The normal lines depict the internal sub-pu edges which overlap with a 16×16 grid and therefore they can be deblocked. An important property of this solution is that: The longer tap filter can be applied to the CU edges and also to the internal sub-pu edges which overlap with a 16×16 grid.

The block P, Q, R has a block size being M×N or N×M or L×T or T×L and N or T being an even integer $2^n$ larger than a threshold (e.g. 8 or 16, etc). For example, the size (i.e. width or height) of block P, Q, R may be 32 or 64 samples.

For a 16×16 grid, there will be at least one internal sub-pu edge which overlaps.

In general for smaller blocks the first and last internal sub-pu edge overlapping with 8×8 grid will only be one and therefore it cannot be deblocked. This is the situation depicted in FIG. 4.

Figure 19:
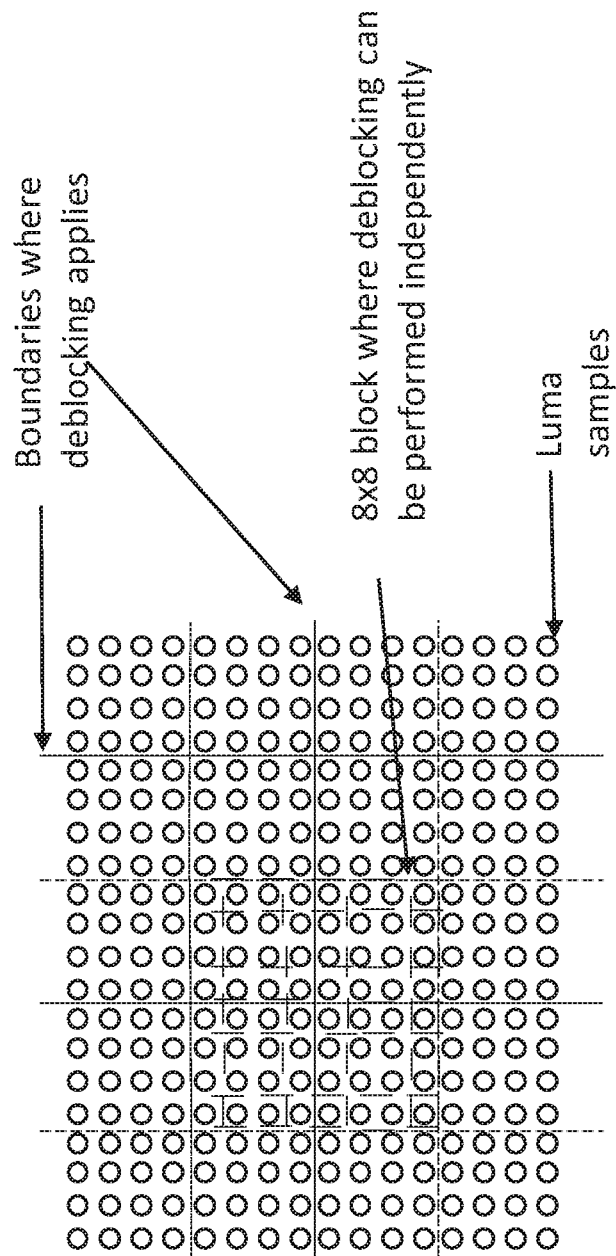
FIG. 19 illustration of picture samples, horizontal and vertical block boundaries on the 8*8 grid.

A 8×8 grid is shown in FIG. 19. A 8×8 grid will have vertical and horizontal lines spaced with a gap of 8 samples. A 16×16 grid will have vertical and horizontal lines spaced with a gap of 16 samples The sixth filter, such as the longer tap filter which modifies a maximum of 7 samples on either side of the sub-block edge i.e. NA'=NB'=7, can be used. By the way normal HEVC deblocking filter can also be applied to all these sub-pu edges which overlap with 16×16 grid. Generally, the normal HEVC deblocking filter may modify a maximum of 3 samples on either side of the edge. When the normal HEVC deblocking filter is applied to these sub-pu edges which overlap with 16×16 grid, the number of samples which to be modified on either side of the sub-pu edges may be adapted according to different scenarios.

In FIG. 15, i.e. for solution 4 (16×16 grid), the sixth filter may refer to the longer tap filter. The longer tap filter is the filter which modifies an equal number of samples on either side of the edge. In this case any longer tap filter with NA'=NB'=7 can be used, i.e. the longer tap filter can modify at most up to 7 samples on either side of the edge. If it is the longer tap filter then NA'=NB'=7. The longer tap filter modifies a maximum of 7 samples on either side of the sub-PU edge. Also a normal HEVC filter can be applied. The samples internal to the sub-pu block are used for filter decision and filter modification.

Solution 5: In this solution, the deblocking is disabled for the first and the last internal sub-pu edges e.g. overlapping with 8×8 grid. All the other sub-pu edges e.g. overlapping with 8×8 grid are allowed to have a fifth filter (such as normal HEVC deblocking filter or any other filter) which modifies a maximum up to 4 samples. The longer tap deblocking filter can still be safely applied to all the CU edges.

As shown in FIG. 16, the example consists of three coding units (blocks) P, Q, R. Block Q uses sub-pu tools like Affine or ATMVP and therefore consists of internal sub-pu edge.

There are two coding units edges, one edge is shared between block P and block Q and the other coding unit edge is shared between block Q and block R. To apply longer tap filter for the coding unit edge without introducing filter overlaps and therefore not sacrificing parallel deblocking, the solution only deblocks all the internal sub-pu edges except for the first and last sub-pu edge. Also the fifth filter, such as HEVC deblocking filter which modifies a maximum of 3 samples or any other deblocking filter which modifies a maximum of up to 4 samples, can be used to deblock all the other internal sub-pu edges except the first and last sub-pu edge. It is noted that for the internal sub-pu edges in this solution 5, because, each consecutive edge is only 8 samples apart as we are generally doing the filtering on an 8×8 grid. Therefore the normal HEVC deblocking filter or any other filter which can modify a maximum of up to 4 samples can be used in solution 5.

In FIG. 16, i.e. for solution 5 (except first and last), the fifth filter may also refer to the longer tap filter. The longer tap filter may be the filter which modifies equal number of samples on either side of the edge. In this case any longer tap filter with NA=NB=4 can be used. If it is the longer tap filter then NA=NB=4. The longer tap filter modifies a maximum of 4 samples on either side of the sub-PU edge. Also a normal HEVC filter can be applied. The samples internal to the sub-pu block are used for filter decision and filter modification.

The block P, Q, R has a block size being M×N or N×M or L×T or T×L and N or T being an even integer $2^n$ larger than 8. For example, the size (such as width or height) of block P, Q, R may be 32 or 64 samples. In general for smaller blocks the first and last internal sub-pu edge overlapping with 8×8 grid will only be one and therefore it cannot be deblocked. This is the situation depicted in FIG. 4.

For the first sub-pu edge and the last sub-pu edge between sub blocks inside the first coding block P or the second coding block Q, the first sub-pu edge is closest to one of the first coding block P and the second coding block Q, and the last sub-pu edge is closest to the other one of the first coding block P and the second coding block Q;

The present disclosure applies well to both vertical edges and horizontal edges. The present disclosure can define the first sub-pu edge using the top left location (x,y) of the sub-pu block and for the first vertical edge we can say that the top left location is (x+n, y+8), where n is increment along the edge, but their location is the same. For the last vertical edge we can say the location is next to adjacent blocks location (p, q), then the last vertical edge position will start at (p+n, q−8). For the horizontal edge is just vice versa.

To sum up, the solutions can ensure that parallel deblocking operations can be performed and therefore improves subjective and objective quality of the video coding. The solution 3 was disabling deblocking for all the internal sub-pu edges whereas the solution 4 and solution 5 at least allow deblocking to some of the internal sub-pu edges.

Figure 9:
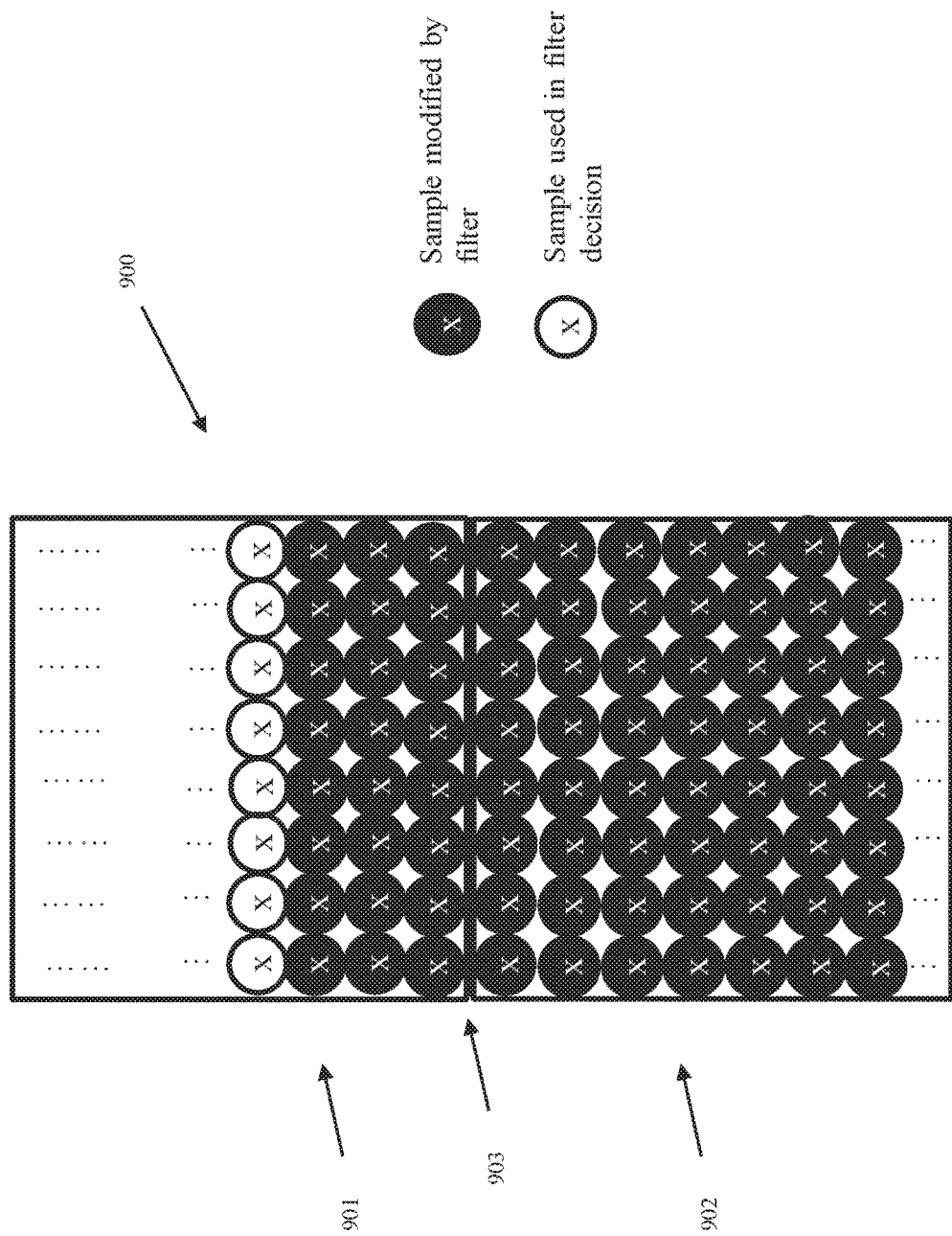
FIG. 9 shows two exemplary coding blocks and sample values used and modified during filtering according to another embodiment of the invention.

This approach is also shown along FIG. 15 or 16. In FIG. 5, an image 500 comprising two blocks 501, 502 is shown. A block edge 504 divides the blocks 501 and 502. A block edge 505 divides the block 502 into blocks 5021 and 5022. According to the first embodiment of the invention, the seventh sample values near to the block edge 504 are modified inside block 501, and the three sample values near to the block edge 504 are modified inside block 502, 5021, while on both sides of the block edge 504, two consecutive sample values are used as filter input values. In FIG. 9, only the relevant blocks 901 and 902 of an image 900 are depicted, the same applies for horizontal edges. Embodiments of the invention apply to all block types for application of a longer tap filter and apply to both vertical and horizontal edges, e.g. for vertical edges the width>8.

In the future video coding standard, a "long tap" filter which modifies more than 3 samples may be used. In the following, a "long tap" filter which uses 8 samples as filter input values and modifies up to 7 samples may be used whenever the block size is greater than or equal to 16 samples.

To ensure that parallel deblocking is possible in such a scenario in which the current block uses sub-block tools, the following improved mechanisms are proposed:

Mechanism 1a: Enforce "long tap" filter when the current block size is >16 samples and also when the neighbouring block size is also >16 samples.

Mechanism 2a: Enforce an "Asymmetric filer" as explained earlier.

Therefore the "Asymmetric filter" modifies the samples used as input values and modified values as per the block width:

For e.g.: if
block width==4, then three samples can be used in filter decision and one sample can be modified
block width==8, then 4 samples can be used in filter decision and modification
for block width >=16, the long tap filter can be
applied as previously described, e.g. in the case that the current block uses sub-block tools, at most a number MA of sample values of the current block (which uses sub-block tools) adjacent to the block edge per line are modified and at most a number MB of sample values of the neighbouring block adjacent to the block edge per line are modified; MA≠MB, particularly MA<MB, for example, MA=3 and MB=7, or MA=4 and MB=7, or MA=5 and MB=7. It can be understood that in the scenario in which the current block has sub-block tools, MA and MB may be determined based on the block size, in other words, MA and MB depend from the block size of the respective block. In an implementation manner, for large blocks, i.e. the block size >=32, the maximum number of samples modified may be 7 (corresponds to a long filter).

Figure 6:
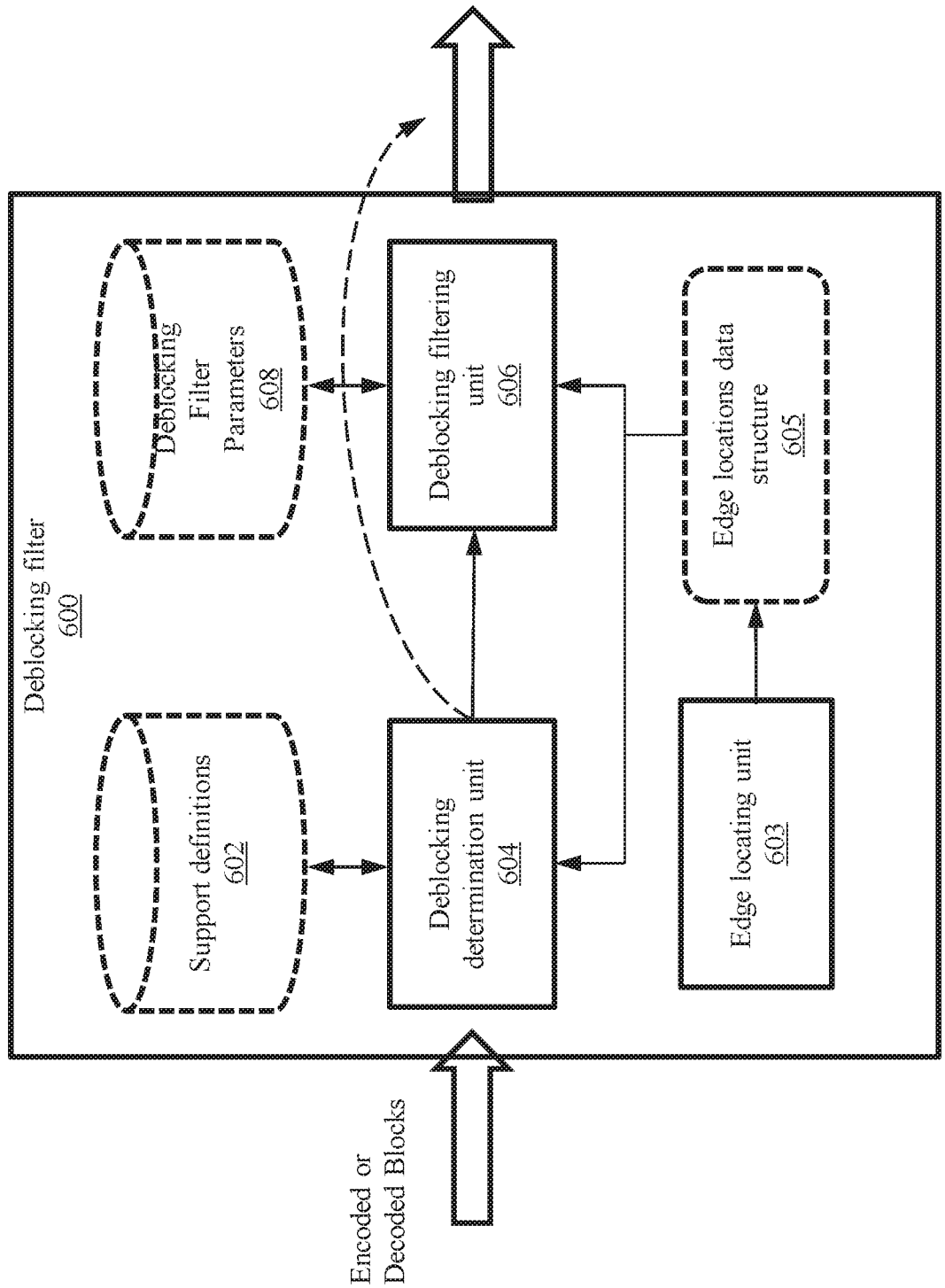
FIG. 6 shows a first embodiment of the deblocking filter device according to embodiments of the invention.

FIG. 6 is a block diagram illustrating an exemplary deblocking filter apparatus 600 according to the techniques described in this disclosure (further details will be described below, e.g., based on FIGS. 7, 8 or FIG. 10, 11A, 11B, 12). The deblocking filter apparatus 600 may be configured to perform deblocking techniques in accordance with various examples described in the present application. In general, either or both of loop filter 120 from FIG. 1 and loop filter 220 from FIG. 2 may include components substantially similar to those of deblocking filter apparatus 600. Other video coding devices, such as video encoders, video decoders, video encoder/decoders (CODECs), and the like may also include components substantially similar to deblocking filter 600. Deblocking filter apparatus 600 may be implemented in hardware, software, or firmware, or any combination thereof. When implemented in software or firmware, corresponding hardware (such as one or more processors or processing units and memory for storing instructions for the software or firmware) may also be provided.

In the example of FIG. 6, deblocking filter apparatus 600 includes deblocking determination unit 604, support definitions 602 stored in memory, deblocking filtering unit 606, deblocking filter parameters 608 stored in memory, edge locating unit 603, and edge locations data structure 605. Any or all of the components of deblocking filter 600 may be functionally integrated. The components of deblocking filter 600 are illustrated separately only for purposes of illustration. In general, deblocking filter 600 receives data for decoded blocks, e.g., from a summation component 114, 214 that combines prediction data with residual data for the blocks. The data may further include an indication of how the blocks were predicted. In the example described below, deblocking filter apparatus 600 is configured to receive data including a decoded video block associated with a CTB (or an LCU) and a CU quadtree for the CTB, where the CU quadtree describes how the CTB is partitioned into CUs and prediction modes for PUs and TUs of leaf-node CUs.

Deblocking filter apparatus 600 may maintain edge locations data structure 605 in a memory of deblocking filter apparatus 600, or in an external memory provided by a corresponding video coding device. In some examples, edge locating unit 603 may receive a quadtree corresponding to a CTB that indicates how the CTB is partitioned into CUs. Edge locating unit 603 may then analyze the CU quadtree to determine edges between decoded video blocks associated with TUs and PUs of CUs in the CTB that are candidates for deblocking.

Edge locations data structure 605 may comprise an array having a horizontal dimension, a vertical dimension, and a dimension representative of horizontal edges and vertical edges. In general, edges between video blocks may occur between two video blocks associated with smallest-sized CUs of the CTB, or TUs and PUs of the CUs. Assuming that the CTB has a size of N×N, and assuming that the smallest-sized CU of the CTB is of size M×M, the array may comprise a size of [N/M]×[N/M]×2, where "2" represents the two possible directions of edges between CUs (horizontal and vertical). For example, assuming that a CTB has 64×64 pixels and an 8×8 smallest-sized CU, the array may comprise [8]×[8]×[2] entries.

Each entry may generally correspond to a possible edge between two video blocks. Edges might not in fact exist at each of the positions within the LCU corresponding to each of the entries of edge locations data structure 605. Accordingly, values of the data structure may be initialized to false. In general, edge locating unit 603 may analyze the CU quadtree to determine locations of edges between two video blocks associated with TUs and PUs of CUs of the CTB and set corresponding values in edge locations data structure 605 to true.

In general, the entries of the array may describe whether a corresponding edge exists in the CTB as a candidate for deblocking. That is, when edge locating unit 603 determines that an edge between two neighboring video blocks associated with TUs and PUs of CUs of the CTB exists, edge locating unit 603 may set a value of the corresponding entry in edge locations data structure 605 to indicate that the edge exists (e.g., to a value of "true").

Deblocking determination unit 604 generally determines whether, for two neighboring blocks, an edge between the two blocks should be de-blocked. Deblocking determination unit 604 may determine locations of edges using edge locations data structure 605. When a value of edge locations data structure 605 has a Boolean value, deblocking determination unit 604 may determine that a "true" value indicates the presence of an edge, and a "false" value indicates that no edge is present, in some examples.

In general, deblocking determination unit 604 is configured with one or more deblocking determination functions. The functions may include a plurality of coefficients applied to lines of pixels that cross the edge between the blocks. For example, the functions may be applied to a line of pixels that is perpendicular to the edge, where MA (such as 3, 4 or 5) pixels are in one of the two blocks and MB (such as 7) pixels are in the other of the two blocks. Support definitions 602 define support for the functions. In general, the "support" corresponds to the pixels to which the functions are applied.

Deblocking determination unit 604 may be configured to apply one or more deblocking determination functions to one or more sets of support, as defined by support definitions 602, to determine whether a particular edge between two blocks of video data should be deblocked. The dashed line originating from deblocking determination unit 604 represents data for blocks being output without being filtered.

In cases where deblocking determination unit 604 determines that an edge between two blocks should not be filtered, deblocking filter 600 may output the data for the blocks without altering the data. That is, the data may bypass deblocking filtering unit 606. On the other hand, when deblocking determination unit 604 determines that an edge should be deblocked, deblocking determination unit 604 may cause deblocking filtering unit 606 to filter values for pixels near the edge in order to deblock the edge.

Deblocking filtering unit 606 retrieves definitions of deblocking filters from deblocking filter parameters 608 for edges to be deblocked, as indicated by deblocking determination unit 604. In general, filtering of an edge uses values of pixels from the neighborhood of a current edge to be deblocked. Therefore, both deblocking decision functions and deblocking filters may have a certain support region on both sides of an edge. By applying a deblocking filter to pixels in the neighborhood of an edge, deblocking filtering unit 606 may smooth the values of the pixels such that high frequency transitions near the edge are dampened. In this manner, the application of deblocking filters to pixels near an edge may reduce blockiness artifacts near the edge.

Figure 10:
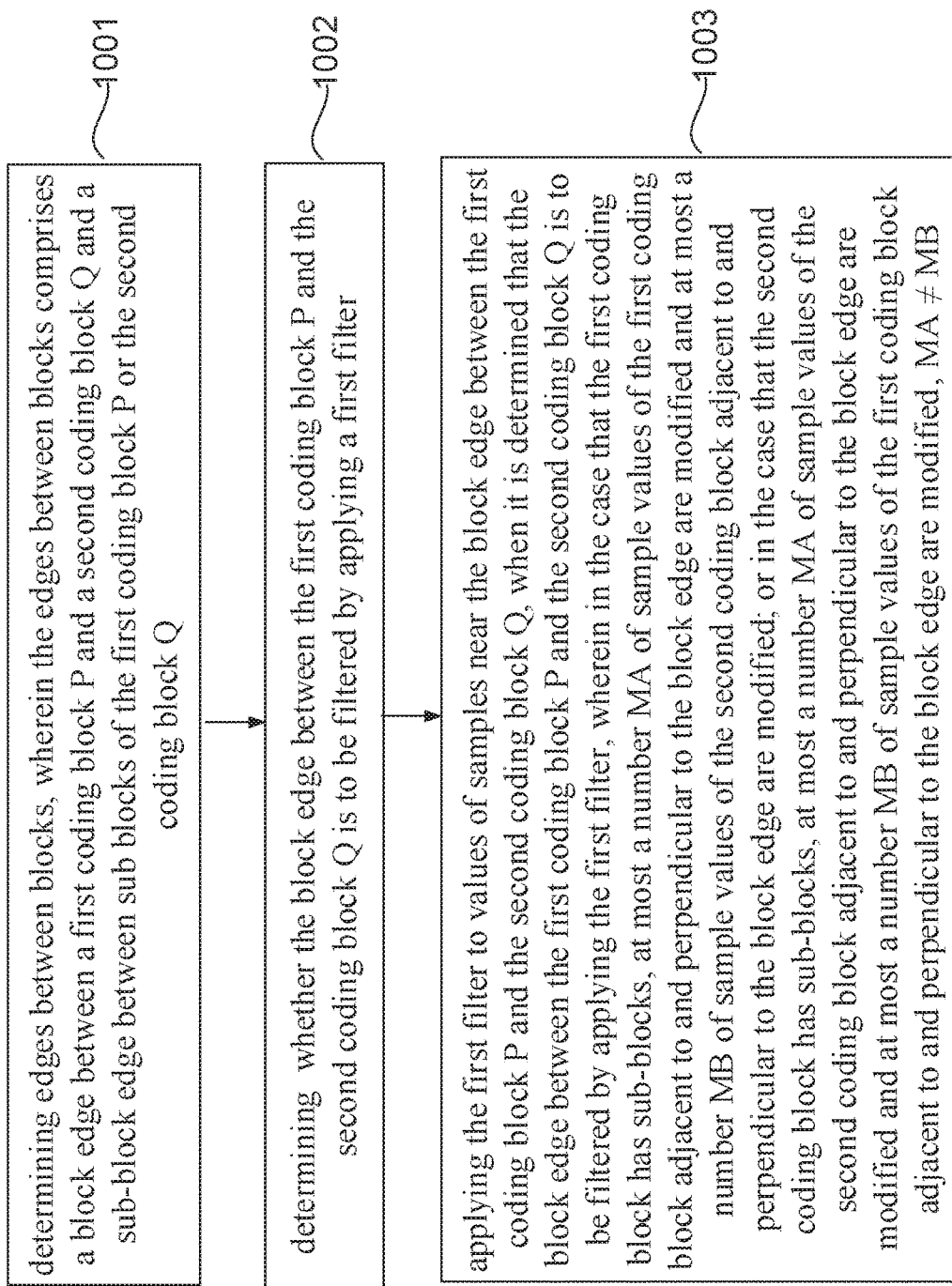
FIG. 10 shows a flow diagram depicting an exemplary process for increasing the efficiency of deblocking filtering.

FIG. 10 is a block diagram illustrating an exemplary deblocking method according to the techniques described in this disclosure (further details will be described below, e.g., based on FIGS. 7, 8).

In FIG. 10, an embodiment of the deblocking method is shown.

In a first step 1001, edges between blocks are determined, wherein the edges between blocks comprises a block edge between a first coding block and a second coding block and a sub-block edge between sub blocks of the first coding block or the second coding block (e.g. the first coding block or the second coding block has sub-blocks, or the first coding block or the second coding block has sub-block tools), wherein the first coding block has a block size being M×N or N×M, the second coding block has a block size being L×T or T×L and N or T being an even integer $2^n$ larger than a threshold (e.g. 8 or 16, etc);

In a second step 1002, it is determined whether the block edge between the first coding block and the second coding block is to be filtered by applying a first filter (a longer tap filter or an asymmetric filter or an asymmetric tap filter or an asymmetric long filter); in other words, it is determined whether the block edge between the first coding block and the second coding block is enabled for deblocking by applying a first filter (i.e. a longer tap filter or an asymmetric filter or an asymmetric tap filter or an asymmetric long filter);

In a second step 1003, the first filter (a longer tap filter or an asymmetric filter or an asymmetric tap filter or an asymmetric longer tap filter) is applied to values of samples (i.e. input pixels) near the block edge between the first coding block and the second coding block, when it is determined that the block edge between the first coding block and the second coding block is to be filtered by applying the first filter, wherein in the case that the first coding block has sub-blocks (or the first coding block has sub-block tools, the first coding block is a current block and the second coding block is a neighboring block of the current block), at most a number MA of sample values of the first coding block adjacent to (i.e. perpendicular to) the block edge per line are modified and at most a number MB of sample values of the second coding block adjacent to (i.e. perpendicular to) the block edge per line are modified; or in the case that the second coding block has sub-blocks (or the second coding block has sub-block tools, the second coding block is a current block and the first coding block is a neighboring block of the current block), at most a number MA of sample values of the second coding block adjacent to (i.e. perpendicular to) the block edge per line are modified and at most a number MB of sample values of the first coding block adjacent to (i.e. perpendicular to) the block edge per line are modified, MA≠MB, particularly MA<MB, e.g. MA<MB=7.

For example, MA=3 and MB=7,
MA=4 and MB=7, or
MA=5 and MB=7.

It can be understood that in the scenario in which the current block has sub-block tools, MA and MB may be determined based on the block size, in other words, MA and MB depend from the block size of the respective block. In an implementation manner, for large blocks, i.e. the block size >=32, the maximum number of samples modified may be 7 (corresponds to a long filter).

The input pixels correspond to the pixel values or sample values used for filtering, and the output pixels correspond to the modified sample values. It should be noted that the input pixels may be consecutive pixels perpendicular to the block edge beginning at the block edge. Also, the output pixels may be consecutive pixels perpendicular to the block edge, beginning at the block edge.

The previously disclosed details of the deblocking method may be made reference and not repeated here.

Figure 11A:
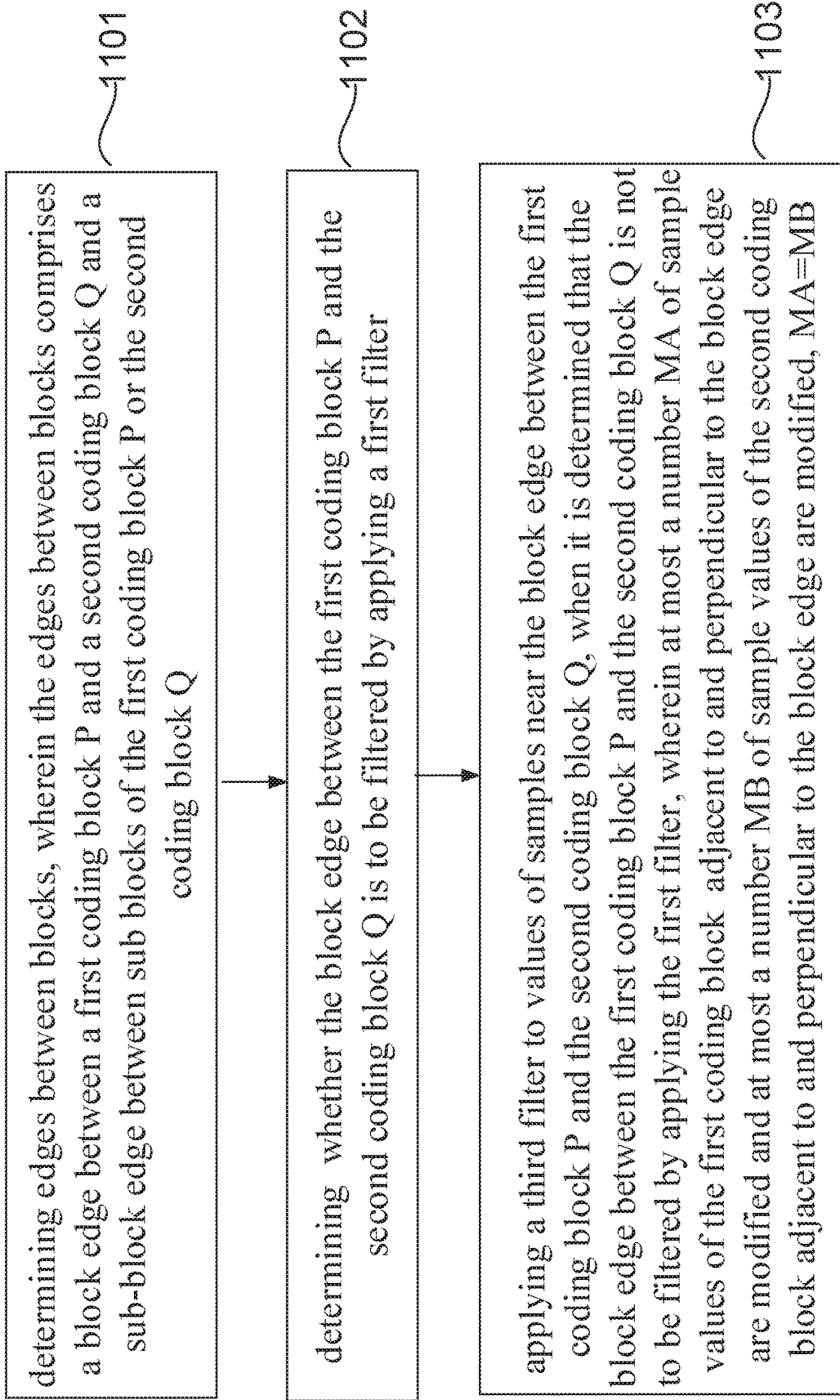
FIG. 11A shows a flow diagram depicting an exemplary process for increasing the efficiency of deblocking filtering.

FIG. 11A is a block diagram illustrating another exemplary deblocking method according to the techniques described in this disclosure (further details will be described below, e.g., based on FIGS. 7, 8).

In FIG. 11A, another embodiment of the deblocking method is shown.

In a first step 1101, edges between blocks are determined, wherein the edges between blocks comprises the block edge between the first coding block and the second coding block and a sub-block edge between sub blocks of the first coding block or the second coding block, wherein the first coding block has a block size being M×N or N×M, the second coding block has a block size being L×T or T×L and N or T being an even integer $2^n$ larger than a threshold (e.g. 8 or 16, etc);

In a second step 1102, it is determined whether the block edge between the first coding block and the second coding block is to be filtered by applying a first filter (a longer tap filter or an asymmetric filter or an asymmetric tap filter or an asymmetric long filter); in other words, it is determined whether the block edge between the first coding block and the second coding block is enabled for deblocking by applying a first filter (a longer tap filter or an asymmetric filter or an asymmetric tap filter or an asymmetric long filter);

In a second step 1103, a third filter is applied to values of samples (i.e. input pixels) near the block edge between the first coding block and the second coding block, when it is determined that the block edge between the first coding block and the second coding block is not to be filtered by applying the first filter, wherein at most a number MA of sample values of the first coding block adjacent to (i.e. perpendicular to) the block edge per line are modified and at most a number MB of sample values of the second coding block adjacent to (i.e. perpendicular to) the block edge per line are modified, MA=MB, for example, MA=MB=4.

It can be understood that the first coding block is a current block and the second coding block is a neighboring block of the current block, or the second coding block is a current block and the first coding block is a neighboring block of the current block.

The input pixels correspond to the pixel values or sample values used for filtering, and the output pixels correspond to the modified sample values. It should be noted that the input pixels may be consecutive pixels perpendicular to the block edge beginning at the block edge. Also, the output pixels may be consecutive pixels perpendicular to the block edge, beginning at the block edge.

The previously disclosed details of the exemplary deblocking method may be made reference and not repeated here.

Figure 11B:
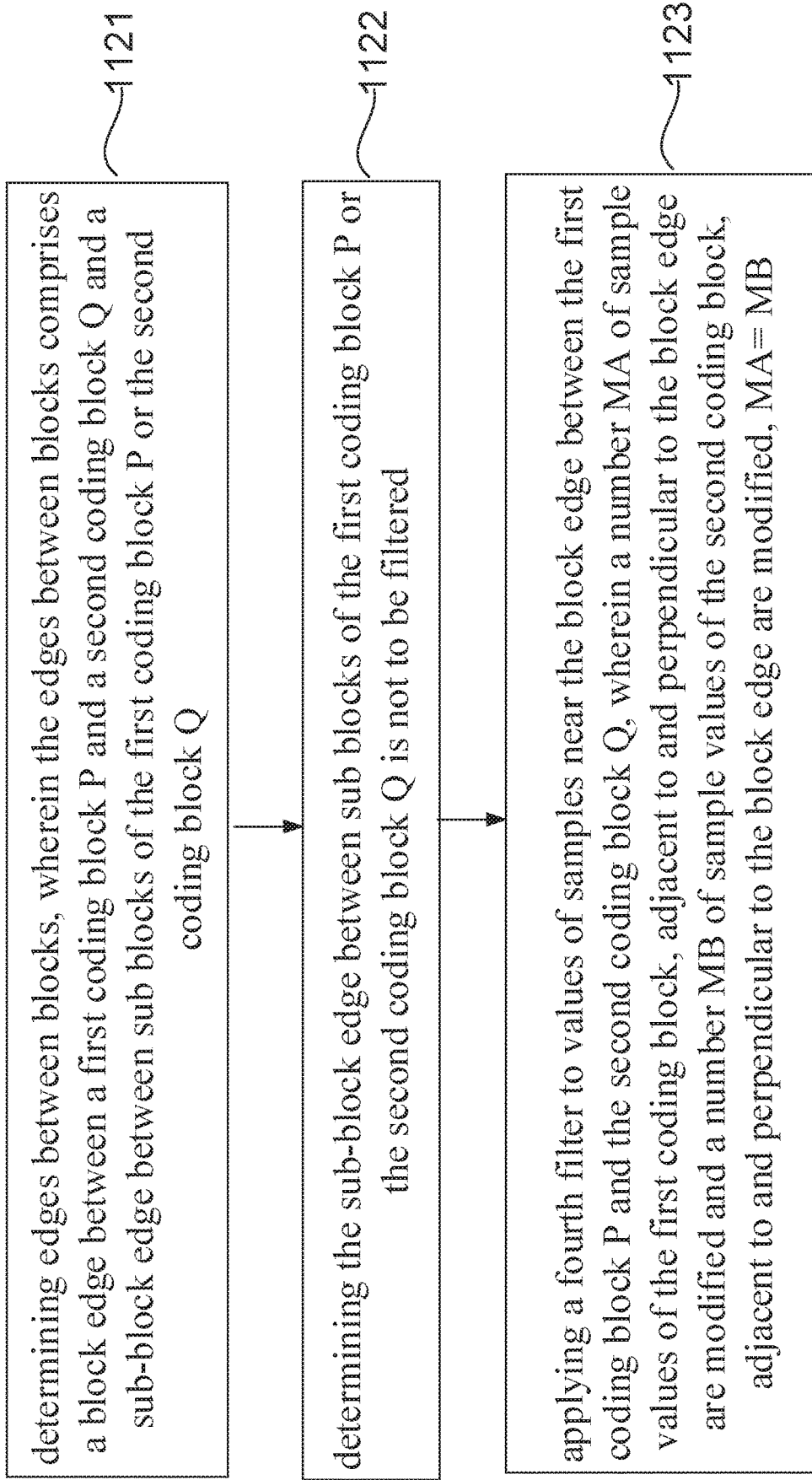
FIG. 11B shows a flow diagram depicting an exemplary process for increasing the efficiency of deblocking filtering.

FIG. 11B is a block diagram illustrating another exemplary deblocking method according to the techniques described in this disclosure (further details will be described below, e.g., based on FIGS. 7, 8).

In FIG. 11B, another embodiment of the deblocking method is shown.

In a first step 1121, edges between blocks are determined, wherein the edges between blocks comprises the block edge between the first coding block P and the second coding block Q and a sub-block edge between sub blocks of the first coding block P or the second coding block Q, wherein the first coding block P has a block size being M×N or N×M, the second coding block Q has a block size being L×T or T×L and N or T being an even integer $2^n$ larger than a threshold (e.g. 8 or 16, etc);

In a second step 1122, it is determined that the sub-block edge between sub blocks of the first coding block P or the second coding block Q is not to be filtered; in other words, it is determined that the sub-block edge between sub blocks of the first coding block P or the second coding block Q is disabled for deblocking;

In a second step 1123, a fourth filter (e.g. a normal longer tap filter) is applied to values of samples (i.e. input pixels) near the block edge between the first coding block P and the second coding block Q, wherein a number MA of sample values of the first coding block, adjacent to (i.e. perpendicular to) the block edge are modified and a number MB of sample values of the second coding block, adjacent to (i.e. perpendicular to) the block edge are modified, MA=MB=7.

It can be understood that the first coding block is a current block and the second coding block is a neighboring block of the current block, or the second coding block is a current block and the first coding block is a neighboring block of the current block.

The input pixels correspond to the pixel values or sample values used for filtering, and the output pixels correspond to the modified sample values. It should be noted that the input pixels may be consecutive pixels perpendicular to the block edge beginning at the block edge. Also, the output pixels may be consecutive pixels perpendicular to the block edge, beginning at the block edge.

Figure 12:
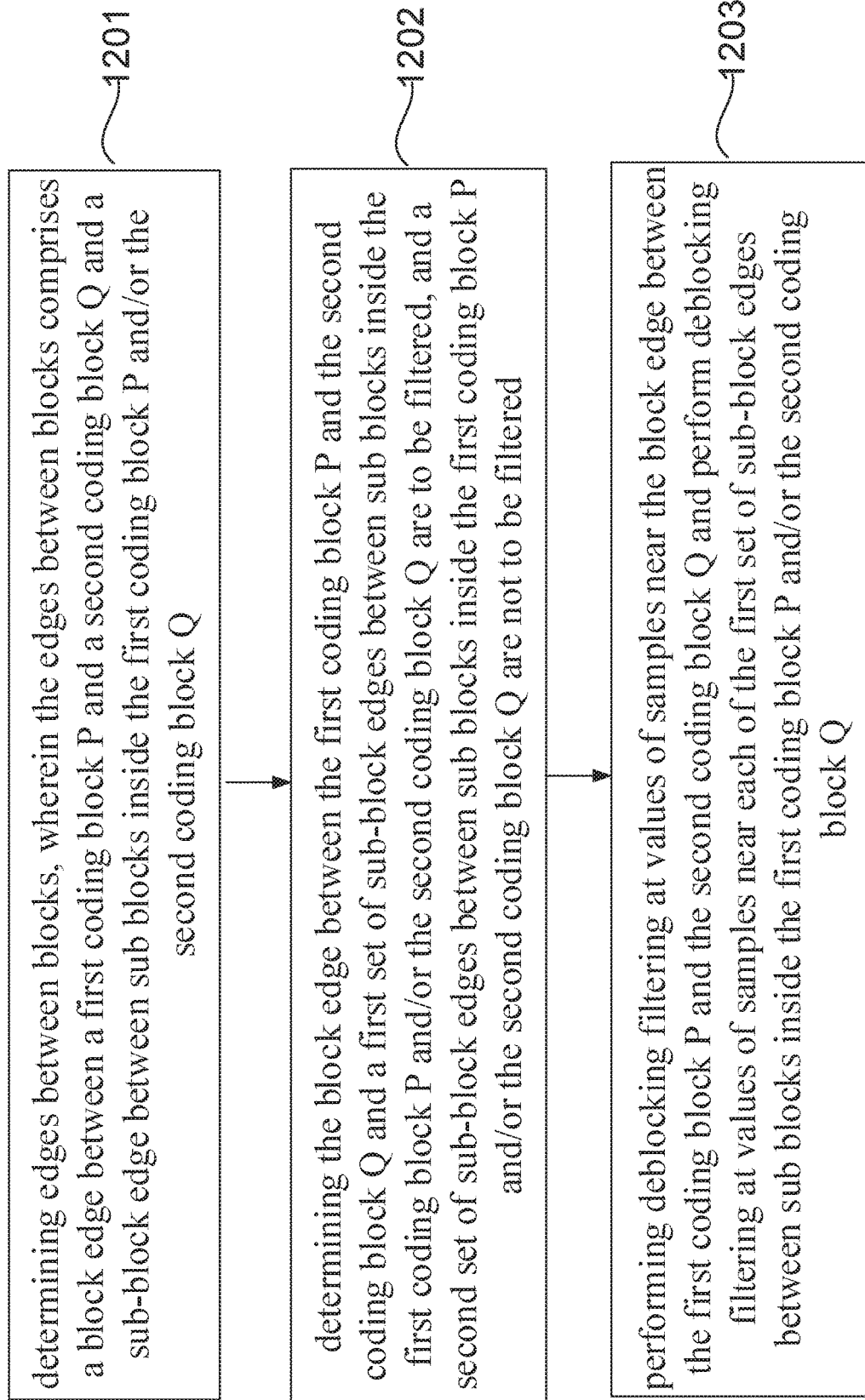
FIG. 12 shows a flow diagram depicting an exemplary process for increasing the efficiency of deblocking filtering.

FIG. 12 is a block diagram illustrating another exemplary deblocking method according to the techniques described in this disclosure (further details will be described below, e.g., based on FIGS. 7, 8, 10, 11A, 11B, 12, and FIGS. 15, 16).

In FIG. 12, another embodiment of the deblocking method is shown.

In a first step 1201, edges between blocks, wherein the edges between blocks comprises a block edge between a first coding block P and a second coding block Q and a sub-block edge between sub blocks inside the first coding block P and/or the second coding block Q are determined, wherein the first coding block P has a block size being M×N or N×M, the second coding block Q has a block size being L×T or T×L, for example, N or T being an even integer $2^n$ larger than a threshold (e.g. 8 or 16, etc);

In a second step 1202, it is determined that the block edge between the first coding block P and the second coding block Q and a first set of sub-block edges between sub blocks inside the first coding block P and/or the second coding block Q are to be filtered, and a second set of sub-block edges between sub blocks inside the first coding block P and/or the second coding block Q are not to be filtered; and In a second step 1203, deblocking filtering is performed at values of samples near the block edge between the first coding block P and the second coding block Q and deblocking filtering is performed at values of samples near each of the first set of sub-block edges between sub blocks inside the first coding block P and/or the second coding block Q.

It can be understood that the first coding block is a current block and the second coding block is a neighboring block of the current block, or the second coding block is a current block and the first coding block is a neighboring block of the current block.

The input pixels correspond to the pixel values or sample values used for filtering, and the output pixels correspond to the modified sample values. It should be noted that the input pixels may be consecutive pixels perpendicular to the block edge beginning at the block edge. Also, the output pixels may be consecutive pixels perpendicular to the block edge, beginning at the block edge.

As shown in FIG. 16, the first set of sub-block edges between sub blocks inside the first coding block and/or the second coding block comprises (consist of) a plurality of sub-block edges except the first sub-block edge and the last sub-block edge between sub blocks inside the first coding block P and/or the second coding block Q, wherein the first sub-block edge is closest to one of the first coding block P and the second coding block Q, and the last sub-block edge is closest to the other one of the first coding block P and the second coding block Q;

the second set of sub-block edges between sub blocks inside the first coding block and/or the second coding block consist of the first sub-block edge and the last sub-block edge between sub blocks inside the first coding block P and/or the second coding block Q, wherein the first sub-block edge is closest to one of the first coding block P and the second coding block Q, and the last sub-block edge is closest to the other one of the first coding block P and the second coding block Q.

In a second step 1203, the step of performing deblocking filtering at values of samples near each of the first set of sub-block edges between sub blocks of the first coding block P and/or the second coding block Q, comprises:

applying a fifth filter to values of samples near each of the first set of sub-block edges inside the first coding block P and/or the second coding block Q, wherein at most a number NA of sample values at one side of the respective one of the first set of sub-block edges are modified inside the first coding block P and/or the second coding block Q and at most a number NB of sample values at the other side of the respective one of the first set of sub-block edges are modified, NA=NB=4.

if no sub-block edge between sub blocks exists inside the first coding block P, and a plurality of sub-block edge between sub blocks exists inside the second coding block Q, in a second step 1203, the step of performing deblocking filtering at values of samples near each of the first set of sub-block edges between sub blocks inside the first coding block P and/or the second coding block Q, comprises:

determining the filtered sample value $q'_i$ of the corresponding sample of the current row or column of samples at the respective side of the vertical or horizontal sub-block edge inside the second coding block Q on the basis of the following equation when the fifth filter being the HEVC deblocking filtering is decided to be applied:

$$q'_0 = (1 \cdot q_2 + 2 \cdot q_1 + 2 \cdot q_0 + 2 \cdot p_0 + p_1 + 4) >> 3$$

$$q'_1 = (q_2 + q_1 + p_0 + p_1 + 4) >> 3$$

$$q'_2 = (2*q_3 + 3*q_2 + q_1 + q_0 + p_0 + 4) >> 3$$

wherein $p_i$ represent a corresponding sample value of a part of the current row or column of samples of the first coding block P, and $q_j$ represent a corresponding sample value of a part of the current row or column of samples of the second coding block Q, i=0, 1, j=0, 1 . . . 3.

As shown in FIG. 15, wherein the first set of sub-block edges between sub blocks inside the first coding block and/or the second coding block comprises (consist of) one or more sub-block edges which overlap with a 16×16 grid between sub blocks inside the first coding block P and/or the second coding block Q;

the second set of sub-block edges between sub blocks inside the first or second coding block comprises (consist of) one or more sub-block edges except the sub-block edges which overlap with a 16×16 grid between sub blocks inside the first coding block P and/or the second coding block Q.

Correspondingly, in a second step 1203, the step of performing deblocking filtering at values of samples near each of the first set of sub-block edges between sub blocks of the first coding block P and/or the second coding block Q, comprises:

applying a sixth filter to values of samples near each of the first set of sub-block edges inside the first coding block P and/or the second coding block Q, wherein at most a number NA' of sample values at one side of the respective one of the first set of sub-block edges are modified inside the first coding block P or the second coding block Q and at most a number NB' of sample values at the other side of the respective one of the first set of sub-block edges are modified, NA'=NB'=7.

if no sub-block edge between sub blocks exists inside the first coding block P, and a plurality of sub-block edges between sub blocks exist inside the second coding block Q (such as if the first coding block P has no sub-blocks but the second coding block Q has sub-blocks), Correspondingly, in a second step 1203, the step of performing deblocking filtering at values of samples near each of the first set of sub-block edges between sub blocks inside the first coding block P and/or the second coding block Q, comprises:

determining the filtered sample value $q'_i$ of the corresponding sample of the current row or column of samples at the respective side of the vertical or horizontal sub-block edge inside the second coding block Q on the basis of the following equation:

$$q'_0=(0 \cdot p_7+1 \cdot p_6+1 \cdot p_5+1 \cdot p_4+1 \cdot p_3+1 \cdot p_2+1 \cdot p_1+1 \cdot p_0+2 \cdot q_0+1 \cdot q_1+1 \cdot q_2+1 \cdot q_3+1 \cdot q_4+1 \cdot q_5+1 \cdot q_6+1 \cdot q_7+8)/16; \text{ and/or}$$

$$q'_1=(0 \cdot p_7+0 \cdot p_6+1 \cdot p_5+1 \cdot p_4+1 \cdot p_3+1 \cdot p_2+1 \cdot p_1+1 \cdot p_0+1 \cdot q_0+3 \cdot q_1+1 \cdot q_2+1 \cdot q_3+1 \cdot q_4+1 \cdot q_5+1 \cdot q_6+1 \cdot q_7+8)/16; \text{ and/or}$$

$$q'_2=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+1 \cdot q_1+3 \cdot q_2+1 \cdot q_3+1 \cdot q_4+1 \cdot q_5+1 \cdot q_6+2 \cdot q_7+8)/16; \text{ and/or}$$

$$q'_3=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+1 \cdot q_1+1 \cdot q_2+3 \cdot q_3+1 \cdot q_4+1 \cdot q_5+1 \cdot q_6+3 \cdot q_7+8)/16; \text{ and/or}$$

$$q'_4=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+1 \cdot q_1+1 \cdot q_2+1 \cdot q_3+3 \cdot q_4+1 \cdot q_5+1 \cdot q_6+4 \cdot q_7+8)/16; \text{ and/or}$$

$$q'_5=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+1 \cdot q_1+1 \cdot q_2+1 \cdot q_3+1 \cdot q_4+3 \cdot q_5+1 \cdot q_6+5 \cdot q_7+8)/16; \text{ and/or}$$

$$q'_6=(0 \cdot p_7+0 \cdot p_6+0 \cdot p_5+0 \cdot p_4+0 \cdot p_3+0 \cdot p_2+0 \cdot p_1+1 \cdot p_0+1 \cdot q_0+1 \cdot q_1+1 \cdot q_2+1 \cdot q_3+1 \cdot q_4+1 \cdot q_5+3 \cdot q_6+6 \cdot q_7+8)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

In the case that a plurality of sub-block edge between sub blocks exists inside the first coding block P and a plurality of sub-block edge between sub blocks exists inside the second coding block Q, in a second step 1203, the step of performing deblocking filtering at values of samples near each of the first set of sub-block edges between sub blocks inside the first coding block P and/or the second coding block Q, comprises:

determining the filtered sample value $q'_1$ and $p'_i$ of the corresponding sample of the current row or column of samples at the respective side of the vertical or horizontal sub-block edge inside the second coding block Q and the first coding block P respectively on the basis of the following equation:

$$q'_0=(0 \cdot p_7+1 \cdot p_6+1 \cdot p_5+1 \cdot p_4+1 \cdot p_3+1 \cdot p_2+1 \cdot p_1+1 \cdot p_0+2 \cdot q_0+1 \cdot q_1+1 \cdot q_2+1 \cdot q_3+1 \cdot q_4+1 \cdot q_5+1 \cdot q_6+1 \cdot q_7+8)/16 \text{ and/or}$$

$$q'_1=(0 \cdot p_7+1 \cdot p_6+1 \cdot p_5+1 \cdot p_4+1 \cdot p_3+1 \cdot p_2+1 \cdot p_1+1 \cdot p_0+1 \cdot q_0+3 \cdot q_1+1 \cdot q_2+1 \cdot q_3+1 \cdot q_4+1 \cdot q_5+1 \cdot q_6+1 \cdot q_7+8)/16 \text{ and/or}$$

$$q'_2=(0 \cdot p_7+0 \cdot p_6+1 \cdot p_5+1 \cdot p_4+1 \cdot p_3+1 \cdot p_2+1 \cdot p_1+1 \cdot p_0+1 \cdot q_0+3 \cdot q_1+1 \cdot q_2+1 \cdot q_3+1 \cdot q_4+1 \cdot q_5+1 \cdot q_6+1 \cdot q_7+8)/16 \text{ and/or}$$

$$q'_3=(0 \cdot p_7+0 \cdot p_6+0 \cdot p_5+1 \cdot p_4+1 \cdot p_3+1 \cdot p_2+1 \cdot p_1+1 \cdot p_0+1 \cdot q_0+1 \cdot q_1+3 \cdot q_2+1 \cdot q_3+1 \cdot q_4+1 \cdot q_5+1 \cdot q_6+3 \cdot q_7+8)/16 \text{ and/or}$$

$$q'_4=(0 \cdot p_7+0 \cdot p_6+0 \cdot p_5+0 \cdot p_4+1 \cdot p_3+1 \cdot p_2+1 \cdot p_1+1 \cdot p_0+1 \cdot q_0+1 \cdot q_1+1 \cdot q_2+1 \cdot q_3+3 \cdot q_4+1 \cdot q_5+1 \cdot q_6+4 \cdot q_7+8)/16 \text{ and/or}$$

$$q'_5=(0 \cdot p_7+0 \cdot p_6+0 \cdot p_5+0 \cdot p_4+0 \cdot p_3+1 \cdot p_2+1 \cdot p_1+1 \cdot p_0+1 \cdot q_0+1 \cdot q_1+1 \cdot q_2+1 \cdot q_3+1 \cdot q_4+3 \cdot q_5+1 \cdot q_6+5 \cdot q_7+8)/16 \text{ and/or}$$

$$q'_6=(0 \cdot p_7+0 \cdot p_6+0 \cdot p_5+0 \cdot p_4+0 \cdot p_3+0 \cdot p_2+1 \cdot p_1+1 \cdot p_0+1 \cdot q_0+1 \cdot q_1+1 \cdot q_2+1 \cdot q_3+1 \cdot q_4+1 \cdot q_5+3 \cdot q_6+6 \cdot q_7+8)/16 \text{ and/or}$$

$$p'_0=(0 \cdot q_7+1 \cdot q_6+1 \cdot q_5+1 \cdot q_4+1 \cdot q_3+1 \cdot q_2+1 \cdot q_1+1 \cdot q_0+2 \cdot p_0+1 \cdot p_1+1 \cdot p_2+1 \cdot p_3+1 \cdot p_4+1 \cdot p_5+1 \cdot p_6+1 \cdot p_7+8)/16 \text{ and/or}$$

$$p'_1=(0 \cdot q_7+0 \cdot q_6+1 \cdot q_5+1 \cdot q_4+1 \cdot q_3+1 \cdot q_2+1 \cdot q_1+1 \cdot q_0+1 \cdot p_0+3 \cdot p_1+1 \cdot p_2+1 \cdot p_3+1 \cdot p_4+1 \cdot p_5+1 \cdot p_6+1 \cdot p_7+8)/16 \text{ and/or}$$

$$p'_2=(0 \cdot q_7+0 \cdot q_6+0 \cdot q_5+1 \cdot q_4+1 \cdot q_3+1 \cdot q_2+1 \cdot q_1+1 \cdot q_0+1 \cdot p_0+1 \cdot p_1+3 \cdot p_2+1 \cdot p_3+1 \cdot p_4+1 \cdot p_5+1 \cdot p_6+2 \cdot p_7+8)/16 \text{ and/or}$$

$$p'_3=(0 \cdot q_7+0 \cdot q_6+0 \cdot q_5+0 \cdot q_4+1 \cdot q_3+1 \cdot q_2+1 \cdot q_1+1 \cdot q_0+1 \cdot p_0+1 \cdot p_1+1 \cdot p_2+3 \cdot p_3+1 \cdot p_4+1 \cdot p_5+1 \cdot p_6+3 \cdot p_7+8)/16 \text{ and/or}$$

$$p'_4=(0 \cdot q_7+0 \cdot q_6+0 \cdot q_5+0 \cdot q_4+0 \cdot q_3+1 \cdot q_2+1 \cdot q_1+1 \cdot q_0+1 \cdot p_0+1 \cdot p_1+1 \cdot p_2+1 \cdot p_3+3 \cdot p_4+1 \cdot p_5+1 \cdot p_6+4 \cdot p_7+8)/16 \text{ and/or}$$

$$p'_5=(0 \cdot q_7+0 \cdot q_6+0 \cdot q_5+0 \cdot q_4+0 \cdot q_3+0 \cdot q_2+1 \cdot q_1+1 \cdot q_0+1 \cdot p_0+1 \cdot p_1+1 \cdot p_2+1 \cdot p_3+1 \cdot p_4+3 \cdot p_5+1 \cdot p_6+5 \cdot p_7+8)/16 \text{ and/or}$$

$$p'_6=(0 \cdot q_7+0 \cdot q_6+0 \cdot q_5+0 \cdot q_4+0 \cdot q_3+0 \cdot q_2+0 \cdot q_1+1 \cdot q_0+1 \cdot p_0+1 \cdot p_1+1 \cdot p_2+1 \cdot p_3+1 \cdot p_4+1 \cdot p_5+3 \cdot p_6+6 \cdot p_7+8)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

The deblocking method according to embodiments further comprises:

it is determined whether the block edge between the first coding block P and the second coding block Q is to be filtered by applying a first filter; and the first filter is applied to values of samples near the block edge between the first coding block P and the second coding block Q, when it is determined that the block edge between the first coding block P and the second coding block Q is to be filtered by applying the first filter, wherein at most a number MA of sample values of the first coding block adjacent to the block edge per line are modified and at most a number MB of sample values of the second coding block adjacent to the block edge per line are modified; or at most a number MA of sample values of the second coding block adjacent to the block edge per line are modified and at most a number MB of sample values of the first coding block adjacent to the block edge per line are modified, MA≠MB, particularly MA<MB, for example, MA=3 and MB=7, or MA=4 and MB=7, or MA=5 and MB=7.

In the case that a plurality of sub-block edge between sub blocks exists inside the first coding block and a plurality of sub-block edge between sub blocks exists inside the second coding block, the method further comprising:

it is determined the block edge between the first coding block and the second coding block is to be filtered by applying a second filter; and the second filter is applied to values of samples near the block edge, when it is determined that the block edge between the first coding block and the second coding block is to be filtered by applying a second filter, wherein a number MA' of sample values of the first coding block adjacent to the block edge are modified and a number MB' of sample values of the second coding block adjacent to the block edge are modified, MA'=3 and MB'=3.

When no sub-block edge between sub blocks exists inside the second coding block, at most a number MA of sample values of the first coding block adjacent to the block edge per line are modified and at most a number MB of sample values of the second coding block adjacent to the block edge per line are modified, MA=3 and m MB=7, or MA=4 and MB=7, or MA=5 and MB=7;

or when no sub-block edge between sub blocks exists inside the first coding block, at most a number MA of sample values of the second coding block adjacent to the block edge per line are modified and at most a number MB of sample values of the first coding block adjacent to the block edge per line are modified, MA=3 and MB=7, or MA=4 and MB=7, or MA=5 and MB=7.

The method further comprising: determining whether the block edge between the first coding block and the second coding block is to be filtered by applying the first filter based upon at most a number DA of sample values of the first coding block, adjacent to the block edge, as first filter decision values, DA=4 and at most a number DB of sample values of the second coding block, adjacent to the block edge, as second filter decision values, DB=4.

If a plurality of sub-block edges between sub blocks exists inside the second coding block Q, the method further comprises: determining whether a first condition defined by the following first equation is satisfied:

$$(|q_3 - q_2 - q_1 + q_0| + |p_0 - p_3 - p_4 + p_7|) < \frac{3*\beta}{32} \;\&\&$$

$$(|q_3 - q_2 - q_1 + q_0| + |p_0 - p_2 - p_3 + p_5|) < \frac{3*\beta}{32}$$

wherein $\beta$ denotes a threshold parameter and $q_i$ represent the sample values of the second coding block Q, i=0, 1, 2, 3 and $p_j$ represent the sample values of the first coding block P, j=0, 3, 4, 7 or j=0, 2, 3, 5.

If a plurality of sub-block edges between sub blocks exists inside the first coding block P, the method further comprises: determining whether a second condition defined by the following second equation is satisfied:

$$(|p_3 - p_2 - p_1 + p_0| + |q_0 - q_3 - q_4 + q_7|) < \frac{3*\beta}{32} \;\&\&$$

$$(|p_3 - p_2 - p_1 + p_0| + |q_0 - q_2 - q_3 + q_5|) < \frac{3*\beta}{32}$$

wherein $\beta$ denotes a threshold parameter and $p_i$ represent the sample values of the first coding block P, i=0, 1, 2, 3 and $q_j$ represent the sample values of the second coding block Q, j=0, 3, 4, 7 or j=0, 2, 3, 5.

The threshold parameter $\beta$ is determined on the basis of a quantization parameter, QP, associated with a quantization step size of the plurality of samples, or the threshold parameter $\beta$ is determined on the basis of the quantization parameter, QP, using a look-up table.

If no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $q'_0$ of the first sample of the current row or column of samples to the right or bottom of the vertical or horizontal edge between the first and the second sample block on the basis of the following equation:

$$q'_0 = (0 \cdot q_7 + 0 \cdot q_6 + 0 \cdot q_5 + 0 \cdot q_4 + 5 \cdot q_3 + 1 \cdot q_2 + 1 \cdot q_1 + 2 \cdot q_0 + 1 \cdot p_0 + 1 \cdot p_1 + 1 \cdot p_2 + 1 \cdot p_3 + 1 \cdot p_4 + 1 \cdot p_5 + 1 \cdot p_6 + 0 \cdot p_7)/16; \text{ or,}$$

$$q'_1 = (0 \cdot q_7 + 0 \cdot q_6 + 0 \cdot q_5 + 0 \cdot q_4 + 0 \cdot q_3 + 2 \cdot q_2 + 4 \cdot q_1 + 4 \cdot q_0 + 4 \cdot p_0 + 2 \cdot p_1 + 0 \cdot p_2 + 0 \cdot p_3 + 0 \cdot p_4 + 0 \cdot p_5 + 0 \cdot p_6 + 0 \cdot p_7)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

If no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $q'_1$ of the second sample of the current row or column of samples to the right or bottom of the vertical or horizontal edge between the first and the second sample block on the basis of the following equation:

$$q'_1 = (0 \cdot q_7 + 0 \cdot q_6 + 0 \cdot q_5 + 0 \cdot q_4 + 5 \cdot q_3 + 1 \cdot q_2 + 3 \cdot q_1 + 1 \cdot q_0 + 1 \cdot p_0 + 1 \cdot p_1 + 1 \cdot p_2 + 1 \cdot p_3 + 1 \cdot p_4 + 1 \cdot p_5 + 0 \cdot p_6 + 0 \cdot p_7)/16; \text{ or,}$$

$$q'_1 = (0 \cdot q_7 + 0 \cdot q_6 + 0 \cdot q_5 + 0 \cdot q_4 + 0 \cdot q_3 + 4 \cdot q_2 + 4 \cdot q_1 + 4 \cdot q_0 + 4 \cdot p_0 + 0 \cdot p_1 + 0 \cdot p_2 + 0 \cdot p_3 + 0 \cdot p_4 + 0 \cdot p_5 + 0 \cdot p_6 + 0 \cdot p_7)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

If no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $q'_2$ of the third sample of the current row or column of samples to the right or bottom of the vertical or horizontal edge between the first and the second sample block on the basis of the following equation:

$$q'_2 = (0 \cdot q_7 + 0 \cdot q_6 + 0 \cdot q_5 + 0 \cdot q_4 + 6 \cdot q_3 + 3 \cdot q_2 + 1 \cdot q_1 + 1 \cdot q_0 + 1 \cdot p_0 + 1 \cdot p_1 + 1 \cdot p_2 + 1 \cdot p_3 + 1 \cdot p_4 + 0 \cdot p_5 + 0 \cdot p_6 + 0 \cdot p_7)/16; \text{ or,}$$

$$q'_2 = (0 \cdot q_7 + 0 \cdot q_6 + 0 \cdot q_5 + 0 \cdot q_4 + 4 \cdot q_3 + 6 \cdot q_2 + 2 \cdot q_1 + 2 \cdot q_0 + 2 \cdot p_0 + 0 \cdot p_1 + 0 \cdot p_2 + 0 \cdot p_3 + 0 \cdot p_4 + 0 \cdot p_5 + 0 \cdot p_6 + 0 \cdot p_7)/16;$$

wherein $p_i$ represent a corresponding sample value of a part of the current row or column of samples of the first coding block P, and $q_j$ represent a corresponding sample value of a part of the current row or column of samples of the second coding block Q, i, j=0, 1 . . . 7.

If no sub-block edge between sub blocks exists inside the first coding block P, and a sub-block edge between sub blocks exists inside the second coding block Q, the step of performing deblocking filtering at values of samples near the block edge between the first coding block P and the second coding block Q comprises:

determining the filtered sample value $p'_i$ of the corresponding sample of the current row or column of samples to the left or upper of the vertical or horizontal edge between the first and the second coding block on the basis of the following equation:

$$p'_0 = (0 \cdot q_7 + 0 \cdot q_6 + 0 \cdot q_5 + 0 \cdot q_4 + 4 \cdot q_3 + 1 \cdot q_2 + 1 \cdot q_1 + 1 \cdot q_0 + 2 \cdot p_0 +$$
$$1 \cdot p_1 + 1 \cdot p_2 + 1 \cdot p_3 + 1 \cdot p_4 + 1 \cdot p_5 + 1 \cdot p_6 + 1 \cdot p_7)/16,$$

$$p'_1 = (0 \cdot q_7 + 0 \cdot q_6 + 0 \cdot q_5 + 0 \cdot q_4 + 3 \cdot q_3 + 1 \cdot q_2 + 1 \cdot q_1 + 1 \cdot q_0 +$$
$$1 \cdot p_0 + 3 \cdot p_1 + 1 \cdot p_2 + 1 \cdot p_3 + 1 \cdot p_4 + 1 \cdot p_5 + 1 \cdot p_6 + 1 \cdot p_7)/16,$$

$$p'_2 = (0 \cdot q_7 + 0 \cdot q_6 + 0 \cdot q_5 + 0 \cdot q_4 + 2 \cdot q_3 + 1 \cdot q_2 + 1 \cdot q_1 + 1 \cdot q_0 +$$
$$1 \cdot p_0 + 1 \cdot p_1 + 3 \cdot p_2 + 1 \cdot p_3 + 1 \cdot p_4 + 1 \cdot p_5 + 1 \cdot p_6 + 2 \cdot p_7)/16,$$

$$p'_3 = (0 \cdot q_7 + 0 \cdot q_6 + 0 \cdot q_5 + 0 \cdot q_4 + 1 \cdot q_3 + 1 \cdot q_2 + 1 \cdot q_1 + 1 \cdot q_0 +$$
$$1 \cdot p_0 + 1 \cdot p_1 + 1 \cdot p_2 + 3 \cdot p_3 + 1 \cdot p_4 + 1 \cdot p_5 + 1 \cdot p_6 + 3 \cdot p_7)/16,$$

$$p'_4 = (0 \cdot q_7 + 0 \cdot q_6 + 0 \cdot q_5 + 0 \cdot q_4 + 0 \cdot q_3 + 1 \cdot q_2 + 1 \cdot q_1 + 1 \cdot q_0 +$$
$$1 \cdot p_0 + 1 \cdot p_1 + 1 \cdot p_2 + 1 \cdot p_3 + 3 \cdot p_4 + 1 \cdot p_5 + 1 \cdot p_6 + 4 \cdot p_7)/16,$$

$$p'_5 = (0 \cdot q_7 + 0 \cdot q_6 + 0 \cdot q_5 + 0 \cdot q_4 + 0 \cdot q_3 + 0 \cdot q_2 + 1 \cdot q_1 + 1 \cdot q_0 +$$
$$1 \cdot p_0 + 1 \cdot p_1 + 1 \cdot p_2 + 1 \cdot p_3 + 1 \cdot p_4 + 3 \cdot p_5 + 1 \cdot p_6 + 5 \cdot p_7)/16,$$

$$p'_6 = (0 \cdot q_7 + 0 \cdot q_6 + 0 \cdot q_5 + 0 \cdot q_4 + 0 \cdot q_3 + 0 \cdot q_2 + 0 \cdot q_1 + 1 \cdot q_0 +$$
$$1 \cdot p_0 + 1 \cdot p_1 + 1 \cdot p_2 + 1 \cdot p_3 + 1 \cdot p_4 + 1 \cdot p_5 + 3 \cdot p_6 + 6 \cdot p_7)/16,$$

wherein $p_i$ represent a corresponding sample value of a part of the current row or column of samples of the first coding block P, and $q_j$ represent a corresponding sample value of a part of the current row or column of samples of the second coding block Q, j=0, 1 . . . 7.

The de-blocking method according to embodiments further comprises:

it is determined whether the block edge between the first coding block P and the second coding block Q is to be filtered by applying a first filter; and a third filter is applied to values of samples near the block edge between the first coding block P and the second coding block Q, when it is determined that the block edge between the first coding block P and the second coding block Q is not to be filtered by applying the first filter, wherein at most a number MA of sample values of the first coding block adjacent to the block edge per line are modified and at most a number MB of sample values of the second coding block adjacent to the block edge per line are modified, MA=MB=4.

It can be understood that the first filter, the second filter, the third filter, the fourth filter, the fifth filter and the sixth filter correspond to filtering differently the block edge. In other words, All the different filters use as input and output samples: the samples which are perpendicular and adjacent to a given block edge. Moreover, the different filters use different number of maximum filtering samples as input and also modify a different number of maximum samples as filter output.

Figure 13:
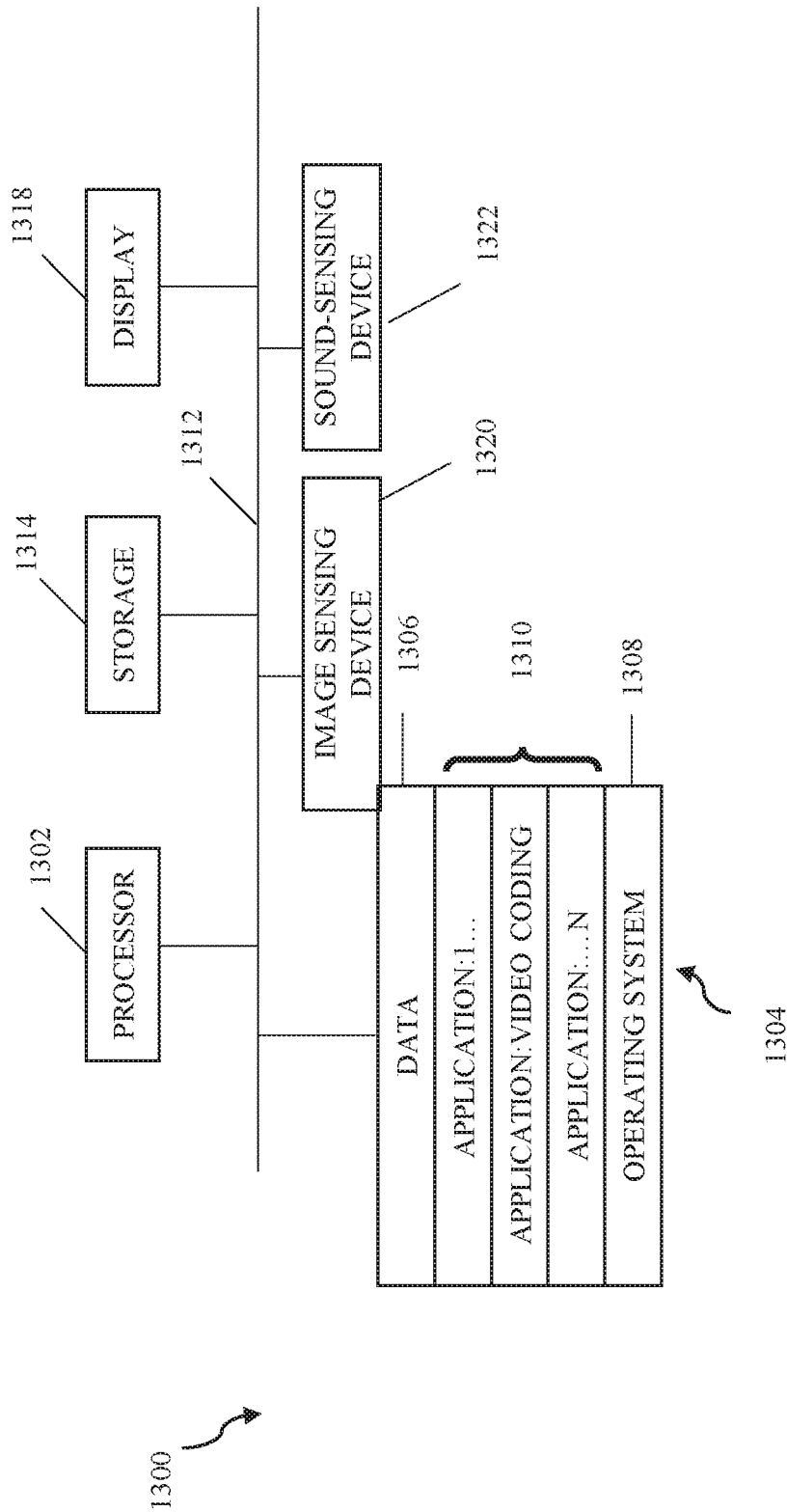
FIG. 13 shows a simplified block diagram of an apparatus 1300 that may be used as either or both of the source device 310 and the destination device 320 from FIG. 3 according to an exemplary embodiment.

FIG. 13 is a simplified block diagram of an apparatus 1300 that may be used as either or both of the source device 310 and the destination device 320 from FIG. 3 according to an exemplary embodiment. Apparatus 1300 can implement techniques of this present application. Apparatus 1300 can be in the form of a computing system including multiple computing devices, or in the form of a single computing device, for example, a mobile phone, a tablet computer, a laptop computer, a notebook computer, a desktop computer, and the like.

Processor 1302 of apparatus 1300 can be a central processing unit. Alternatively, processor 1302 can be any other type of device, or multiple devices, capable of manipulating or processing information now-existing or hereafter developed. Although the disclosed implementations can be practiced with a single processor as shown, e.g., processor 1302, advantages in speed and efficiency can be achieved using more than one processor.

Memory 1304 in the apparatus 1300 can be a read only memory (ROM) device or a random access memory (RAM) device in an implementation. Any other suitable type of storage device can be used as memory 1304. Memory 1304 may be used to store code and/or data 1306 that is accessed by processor 1302 using bus 1312. Memory 1304 can further be used to store operating system 1308 and application programs 1310. Application programs 1310 may include at least one program that permits processor 1302 to perform the methods described here. For example, application programs 1310 can include applications 1 through N, and further include a video coding application that performs the methods described here. Apparatus 1300 can also include additional memory in the form of secondary storage 1314, which can, for example, be a memory card used with a mobile computing device. Because the video communication sessions may contain a significant amount of information, they can be stored in whole or in part in storage 1314 and loaded into memory 1304 as needed for processing.

Apparatus 1300 can also include one or more output devices, such as display 1318. Display 1318 may be, in one example, a touch sensitive display that combines a display with a touch sensitive element operable to sense touch inputs. Display 1318 can be coupled to processor 1302 via bus 1312. Other output devices that permit a user to program or otherwise use apparatus 1300 can be provided in addition to or as an alternative to display 1318. When the output device is or includes a display, the display can be implemented in various ways, including by a liquid crystal display (LCD), a cathode-ray tube (CRT) display, a plasma display or light emitting diode (LED) display, such as an organic LED (OLED) display.

Apparatus 1300 can also include or be in communication with image-sensing device 1320, for example a camera, or any other image-sensing device 1320 now existing or hereafter developed that can sense an image such as the image of a user operating apparatus 1300. Image-sensing device 1320 can be positioned such that it is directed toward the user operating apparatus 1300. In an example, the position and optical axis of image-sensing device 1320 can be configured such that the field of vision includes an area that is directly adjacent to display 1318 and from which display 1318 is visible.

Apparatus 1300 can also include or be in communication with sound-sensing device 1322, for example a microphone, or any other sound-sensing device now existing or hereafter developed that can sense sounds near apparatus 1300. Sound-sensing device 1322 can be positioned such that it is directed toward the user operating apparatus 1300 and can be configured to receive sounds, for example, speech or other utterances, made by the user while the user operates apparatus 1300.

Although FIG. 13 depicts processor 1302 and memory 1304 of apparatus 1300 as being integrated into a single device, other configurations can be utilized. The operations of processor 1302 can be distributed across multiple machines (each machine having one or more of processors) that can be coupled directly or across a local area or other network. Memory 1304 can be distributed across multiple machines such as a network-based memory or memory in multiple machines performing the operations of apparatus 1300. Although depicted here as a single bus, bus 1312 of apparatus 1300 may comprise multiple buses. Further, secondary storage 1314 can be directly coupled to the other components of apparatus 1300 or can be accessed via a network and can comprise a single integrated unit such as a memory card or multiple units such as multiple memory cards. Apparatus 1300 can thus be implemented in a wide variety of configurations.

Figure 14:
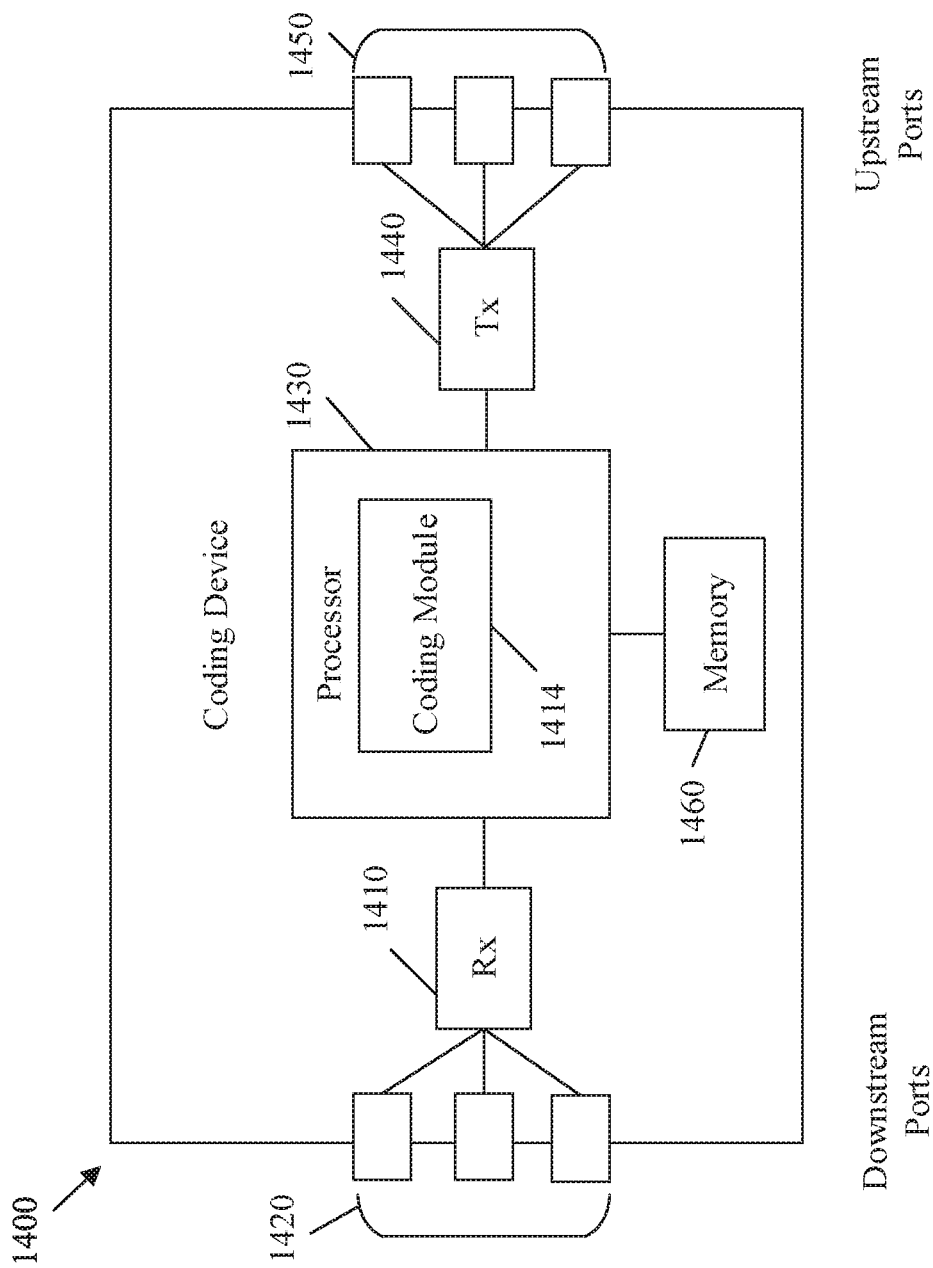
FIG. 14 shows a schematic diagram of a device for video coding.

FIG. 14 is a schematic diagram of an example coding device 1400 for video coding according to an embodiment of the disclosure. The coding device 1400 is suitable for implementing the disclosed embodiments as described herein. In an embodiment, the coding device 1400 may be a decoder such as video decoder 200 of FIG. 2 or an encoder such as video encoder 100 of FIG. 1. In an embodiment, the coding device 1400 may be one or more components of the video decoder 200 of FIG. 2 or the video encoder 100 of FIG. 1 as described above.

The coding device 1400 comprises ingress ports 1420 and receiver units (Rx) 1410 for receiving data; a processor, logic unit, or central processing unit (CPU) 1430 to process the data; transmitter units (Tx) 1440 and egress ports 1450 for transmitting the data; a memory 1460 for storing the data. The coding device 1400 may also comprise optical-to-electrical (OE) components and electrical-to-optical (EO) components coupled to the ingress ports 1420, the receiver units 1410, the transmitter units 1440, and the egress ports 1450 for egress or ingress of optical or electrical signals. The coding device 1400 may also include wireless transmitters and/or receivers in some examples.

The processor 1430 is implemented by hardware and software. The processor 1430 may be implemented as one or more CPU chips, cores (e.g., as a multi-core processor), field-programmable gate arrays (FPGAs), application specific integrated circuits (ASICs), and digital signal processors (DSPs). The processor 1430 is in communication with the ingress ports 1420, receiver units 1410, transmitter units 1440, egress ports 1450, and memory 1460. The processor 1430 comprises a coding module 1414. The coding module 1414 implements the disclosed embodiments described above. For instance, the coding module 1414 implements, processes, prepares, or provides the various coding operations. The inclusion of the coding module 1414 therefore provides a substantial improvement to the functionality of the coding device 1400 and effects a transformation of the coding device 1400 to a different state. Alternatively, the coding module 1414 is implemented as instructions stored in the memory 1460 and executed by the processor 1430 (e.g., as a computer program product stored on a non-transitory medium).

The memory 1460 comprises one or more disks, tape drives, and solid-state drives and may be used as an overflow data storage device, to store programs when such programs are selected for execution, and to store instructions and data that are read during program execution. The memory 1460 may be volatile and/or non-volatile and may be read-only memory (ROM), random access memory (RAM), ternary content-addressable memory (TCAM), and/or static random-access memory (SRAM). The coding device 1400 may also input/output (I/O) device for interacting with an end user. For example, the coding device 1400 may include a display, such as a monitor, for visual output, speakers for audio output, and a keyboard/mouse/trackball, etc. for user input.

The invention has been described in conjunction with various embodiments herein. However, other variations to the disclosed embodiments can be understood and effected by those skilled in the art in practicing the claimed invention, from a study of the drawings, the disclosure and the appended claims. In the claims, the word "comprising" does not exclude other elements or steps and the indefinite article "a" or "an" does not exclude a plurality. A single processor or other unit may fulfill the functions of several items recited in the claims. The mere fact that certain measures are recited in usually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless communication systems.

Wherever embodiments and the description refer to the term "memory", the term "memory" shall be understood and/or shall comprise [listing of all possible memories] a magnetic disk, an optical disc, a read-only memory (Read-Only Memory, ROM), or a random access memory (Random Access Memory, RAM), . . . , unless explicitly stated otherwise.

Wherever embodiments and the description refer to the term "network", the term "network" shall be understood and/or shall comprise [listing of all possible memories] . . . , unless explicitly stated otherwise.

The person skilled in the art will understand that the "blocks" ("units") of the various figures (method and apparatus) represent or describe functionalities of embodiments of the invention (rather than necessarily individual "units" in hardware or software) and thus describe equally functions or features of apparatus embodiments as well as method embodiments (unit=step).

The terminology of "units" is merely used for illustrative purposes of the functionality of embodiments of the encoder/decoder and is not intended to limiting the disclosure.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

Embodiments of the invention may further comprise an apparatus, e.g. encoder and/or decoder, which comprises a processing circuitry configured to perform any of the methods and/or processes described herein.

Embodiments may be implemented as hardware, firmware, software or any combination thereof. For example, the functionality of the encoder/encoding or decoder/decoding may be performed by a processing circuitry with or without firmware or software, e.g. a processor, a microcontroller, a digital signal processor (DSP), a field programmable gate array (FPGA), an application-specific integrated circuit (ASIC), or the like.

The functionality of the encoder 100 (and corresponding encoding method 100) and/or decoder 200 (and corresponding decoding method 200) may be implemented by program instructions stored on a computer readable medium. The program instructions, when executed, cause a processing circuitry, computer, processor or the like, to perform the steps of the encoding and/or decoding methods. The computer readable medium can be any medium, including non-transitory storage media, on which the program is stored such as a Bluray disc, DVD, CD, USB (flash) drive, hard disc, server storage available via a network, etc.

An embodiment of the invention comprises a computer program comprising program code for performing any of the methods described herein, when executed on a computer.

An embodiment of the invention comprises or is a computer readable medium comprising a program code that, when executed by a processor, causes a computer system to perform any of the methods described herein.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A deblocking filter apparatus for use in an image encoder or an image decoder, for deblocking a block edge between a first image block and a second image block,
   wherein the first image block has a block size of M*N or N*M, and M and N represent the width and height of the first image block respectively, or N and M represent the width and height of the first image block respectively;
   wherein the second image block has a block size of L*T or T*L, and L and T represent the width and height of the second image block respectively, or T and L represent the width and height of the second image block respectively, and
   wherein the deblocking filter apparatus comprises:
   a memory storing instructions; and
   a processor in communication with the memory and upon execution of the instructions, is configured to:

determine a value MA as a positive integer equal to or less than 5 based on T being an even integer $2^n$ larger than 16 in the case that one of the first image block and the second image block includes sub-blocks and the one image block including the sub-blocks is the second image block, wherein n is a positive integer;

determine a value MB as a positive integer equal to 7 based on N being an even integer $2^n$ larger than 16;

modify values of at most MA samples of the second image block as first output values, wherein the at most MA samples are in a line perpendicular to and adjacent to the block edge; and modify values of at most MB samples of the first image block as second output values, wherein the at most MB samples are in a line perpendicular to and adjacent to the block edge.

2. The deblocking filter apparatus of claim 1, wherein if N and T are even integers $2^n$ larger than 16,
MA=3 and MB=7, or
MA=4 and MB=7, or
MA=5 and MB=7.

3. The deblocking filter apparatus of claim 1, wherein if N is an even integer $2^n$ larger than 16, and T is an even integer $2^n$ equal to or less than 16,
MA=3 and MB=7.

4. The deblocking filter apparatus of claim 1, wherein upon execution of the instructions, the processor is further configured to:

determine a value MA' as a positive integer less than 7 based on N being an even integer $2^n$ larger than 16 in the case that the first image block includes sub-blocks;

determine a value MB' as a positive integer less than 7 based on T being an even integer $2^n$ larger than 16 in the case that the second image block includes sub-blocks;

modify values of at most MA' samples of the first image block as third output values, wherein the at most MA' samples are in a line perpendicular to and adjacent to the block edge, and modify values of at most MB' samples of the second image block as fourth output values, wherein the at most MB' samples are in a line perpendicular to and adjacent to the block edge, wherein MA'=MB'.

5. The deblocking filter apparatus of claim 4, wherein MA'=MB'=3 or MA'=MB'=5.

6. The deblocking filter apparatus of claim 1,
wherein upon execution of the instructions, the processor is further configured to;

determine one or more of whether the block edge is to be filtered or whether an asymmetric long filtering is to be performed, based upon values of at most DA samples of the first image block that are adjacent to the block edge, as first decision values, and values of at most DB samples of the second image block that are adjacent to the block edge, as second decision values, wherein DA and DB are integer numbers.

7. The deblocking filter apparatus of claim 6, wherein DA=MA+1 and DB=MB+1.

8. The deblocking filter apparatus of claim 1, wherein if the block edge is a horizontal block edge, the direction along the height N of the first image block is perpendicular to the block edge, and the direction along the height T of the second image block is perpendicular to the block edge, wherein both of the heights of the first and second image blocks are an even integer $2^n$ larger than 16; or if the block edge is a vertical block edge, the direction along the width N of the first image block is perpendicular to the block edge, and the direction along the width T of the second image block is perpendicular to the block edge, wherein both of the widths of the first and second image blocks are an even integer $2^n$ larger than 16.

9. The deblocking filter apparatus of claim 1, wherein the second image block is a current block and the first image block is a neighboring block of the current block.

10. The deblocking filter apparatus of claim 9, wherein the first image block is left to the second image block.

11. The deblocking filter apparatus of claim 1, wherein the first image block and the second image block are transform blocks; or the first image block and the second image block are coding blocks.

12. A deblocking method, for deblocking a block edge between a first image block and a second image block in image encoding or image decoding, wherein the first image block has a block size of M*N or N*M, and M and N represent the width and height of the first image block respectively, or N and M represent the width and height of the first image block respectively;

wherein the second image block has a block size of L*T or T*L, and L and T represent the width and height of the second image block respectively, or T and L represent the width and height of the second image block respectively, the deblocking method comprising:

determining a value MA as a positive integer equal to or less than 5 based on T being an even integer $2^n$ larger than 16 in the case that one of the first image block and the second image block includes sub-blocks and the one image block including the sub-blocks is the second image block, wherein n is a positive integer;

determining a value MB as a positive integer equal to 7 based on N being an even integer $2^n$ larger than 16;

modifying values of at most MA samples of the second image block as first output values, wherein the at most MA samples are in a line perpendicular to and adjacent to the block edge; and modifying values of at most MB samples of the first image block as second output values, wherein the at most MB values of the samples are in a line perpendicular to and adjacent to the block edge.

13. The deblocking method of claim 12, wherein if N and T are even integers $2^n$ larger than 16,
MA=3 and MB=7, or
MA=4 and MB=7, or
MA=5 and MB=7.

14. The deblocking method of claim 12, wherein if N is an even integer $2^n$ larger than 16, and T is an even integer $2^n$ equal to or less than 16,
MA=3 and MB=7.

15. The deblocking method of claim 12, further comprising:

determining a value MA' as a positive integer less than 7 based on N being an even integer $2^n$ larger than 16 in the case that the first image block includes sub-blocks;

determining a value MB' as a positive integer less than 7 based on T being an even integer $2^n$ larger than 16 in the case that the second image block includes sub-blocks;

modifying values of at most MA' samples of the first image block as third output values, wherein the at most MA' samples are in a line perpendicular to and adjacent to the block edge; and modifying values of at most MB' samples of the second image block as fourth output values, wherein the at most MB' samples are in a line perpendicular to and adjacent to the block edge, wherein MA'=MB'.

16. The deblocking method of claim 15, wherein MA'=MB'=3 or MA'=MB'=5.

17. The deblocking method of claim 12, further comprising:
determining one or more of whether the block edge is to be filtered or whether an asymmetric long filtering is to be performed, based upon:
values of at most DA samples of the first image block that are adjacent to the block edge as first decision values, and
values of at most DB samples of the second image block that are adjacent to the block edge as second decision values, wherein DA and DB are integer numbers.

18. The deblocking method of claim 17, wherein DA=MA+1 and DB=MB+1.

19. The deblocking method of claim 12, wherein
if the block edge is a horizontal block edge, the direction along the height N of the first image block is perpendicular to the block edge, and the direction along the height T of the second image block is perpendicular to the block edge, wherein both of the heights of the first and second image blocks are an even integer $2^n$ larger than 16; or
if the block edge is a vertical block edge, the direction along the width N of the first image block is perpendicular to the block edge, and the direction along the width T of the second image block is perpendicular to the block edge, wherein both of the widths of the first and second image blocks are an even integer $2^n$ larger than 16.

20. The deblocking method of claim 12, wherein the second image block is a current block and the first image block is a neighboring block of the current block.

21. The deblocking method of claim 20, wherein the first image block is left to the second image block.

22. The deblocking method of claim 12, wherein the first image block and the second image block are transform blocks; or the first image block and the second image block are coding blocks.

23. A deblocking filter apparatus for use in an image encoder or an image decoder, for deblocking a block edge between a first image block and a second image block,
wherein the first image block has a block size of M*N or N*M, and M and N represent the width and height of the first image block respectively, or N and M represent the width and height of the first image block respectively;
wherein the second image block has a block size of L*T or T*L, and L and T represent the width and height of the second image block respectively, or T and L represent the width and height of the second image block respectively,
wherein the deblocking filter apparatus comprises:
a memory storing instructions; and
a processor in communication with the memory and upon execution of the instructions, is configured to:
determine a maximum filter length MA as a positive integer equal to or less than 5 based on T being an even integer $2^n$ larger than 16 in the case that the second image block includes sub-blocks, wherein n is a positive integer;
determine a maximum filter length MB as a positive integer equal to 7 based on N being an even integer $2^n$ larger than 16;
modify, based, at least in part, upon the maximum filter length MA, values of samples of the second image block that are adjacent to the block edge; and
modify, based, at least in part, upon the maximum filter length MB, values of samples of the first image block that are adjacent to the block edge.

24. The deblocking filter apparatus of claim 23, wherein the maximum filter length MA is associated with the second image block and the maximum filter length MB is associated with the first image block.

25. The deblocking filter apparatus of claim 23,
wherein upon execution of the instructions, the processor is further configured to:
modify values of at most MA samples of the second image block and the at most MA samples are in a line perpendicular to and adjacent to the block edge; and
modify values of at most MB samples of the first image block and the at most MB samples are in a line perpendicular to and adjacent to the block edge.

26. A deblocking method, for deblocking a block edge between a first image block and a second image block, in image encoding or image decoding,
wherein the first image block has a block size of M*N or N*M, and M and N represent the width and height of the first image block respectively, or N and M represent the width and height of the first image block respectively;
wherein the second image block has a block size of L*T or T*L, and L and T represent the width and height of the second image block respectively, or T and L represent the width and height of the second image block respectively,
wherein the deblocking method comprises:
determining a maximum filter length MA as a positive integer equal to or less than 5 based on T being an even integer $2^n$ larger than 16 in the case that the second image block includes sub-blocks, wherein n is a positive integer;
determining a maximum filter length MB as a positive integer equal to 7 based on N being an even integer $2^n$ larger than 16;
modifying, based, at least in part, upon the maximum filter length MA, values of samples of the second image block that are adjacent to the block edge; and
modifying, based, at least in part, upon the maximum filter length MB, values of samples of the first image block that are adjacent to the block edge.

27. The deblocking method of claim 26, wherein the maximum filter length MA is associated with the second image block and the maximum filter length MB is associated with the first image block.

28. The deblocking method of claim 26, wherein the modifying, based at least in part upon a maximum filter length MA, values of samples of the second image block that are adjacent to the block edge comprises:
modifying values of at most MA samples of the second image block and the at most MA samples are in a line perpendicular to and adjacent to the block edge; and
wherein the modifying, based at least in part upon a maximum filter length MB, values of samples of the first image block that are adjacent to the block edge comprises:

modifying values of at most MB samples of the first image block and the at most MB samples are in a line perpendicular to and adjacent to the block edge.

29. A non-transitory computer-readable medium storing computer instructions that, when executed by one or more processors, cause the one or more processors to perform operations for deblocking a block edge between a first image block and a second image block in image encoding or image decoding, wherein the first image block has a block size of M*N or N*M, and M and N represent the width and height of the first image block respectively, or N and M represent the width and height of the first image block respectively;

wherein the second image block has a block size of L*T or T*L, and L and T represent the width and height of the second image block respectively, or T and L represent the width and height of the second image block respectively, wherein the operations comprise:

determining a maximum filter length MA as a positive integer equal to or less than 5 based on T being an even integer $2^n$ larger than 16 in the case that the second image block includes sub-blocks, wherein n is a positive integer;

determining a maximum filter length MB as a positive integer equal to 7 based on N being an even integer $2^n$ larger than 16;

modifying, based at least in part upon the maximum filter length MA, values of samples of the second image block that are adjacent to the block edge; and modifying, based at least in part upon the maximum filter length MB, values of samples of the first image block that are adjacent to the block edge.

* * * * *